United States Patent

[11] 3,548,108

[72] Inventors Shigeki Yamato; Yasushi Maruyama; Shunji Tashiro, Tokyo, Japan

[21] Appl. No. 781,699

[22] Filed Nov. 29, 1968

Continuation of Ser. No. 530,270, Feb. 28, 1966, abandoned

[45] Patented Dec. 15, 1970

[73] Assignee Nippon Electric Company Limited Tokyo, Japan a corporation of Japan

[32] Priority Feb. 27, 1965

[33] Japan

[31] No. 40/11269

[54] TELEGRAPH AND TELEPHONE SWITCHING SYSTEM UTILIZING A STATIONARY SATELLITE

5 Claims, 36 Drawing Figs.

[52] U.S. Cl. .......... 179/15; 325/4; 343/100

[51] Int. Cl. .......... H04b 7/20

[50] Field of Search .......... 179/15 Sig., 15; 244/155; 325/4, 14 SAT, 53; 343/100 SAT

[56] References Cited

UNITED STATES PATENTS 3,110,773 11/1963 Miller .......... 325/4(X)

3,261,922 7/1966 Edson .......... 179/15(Sig.)

3,320,611 5/1967 Sekimoto .......... 325/4(UX)

*Primary Examiner*—Ralph D. Blakeslee

*Attorney*—Hopgood and Calimafde

ABSTRACT: A multiaccess satellite communication system comprising a stationary satellite relay station having a transponder mounted therein, and a central station and a plurality of earth stations both located within the service area of the relay station is provided. The transponder has a capacity corresponding to a plurality of channels, which are divided into communication channels and control channels, the communication channels being shared by the earth stations and the control channels being individually assigned to the respective earth stations for their control data communication with the central station. An address signal from one of the earth stations indicating the need of communication with another station is transmitted in its associated control channel to the central station, and in response thereto the central station specifies one of the communication channels on the basis of stored data concerning the condition of use of the communication channels and transmits this instruction to the earth stations involved through the control channels. The earth station then effects communication with said another earth station in one of the communication channels specified by the central station.

INVENTORS.
SHIGEKI YAMATO
YASUSHI MARUYAMA
SHUNJI TASHIRO
BY
Hopgood & Calimafde
ATTORNEYS INVENTORS
SHIGEKI YAMATO
YASUSHI MARUYAMA
SHUNJI TASHIRO
BY
Hopgood & Calimafde
ATTORNEYS INVENTORS
SHIGEKI YAMATO
YASUSHI MARUYAMA
SHUNJI TASHIRO
BY
Hopgood & Calimafde
ATTORNEYS

PATENTED DEC 15 1970 3,548,108

INVENTORS
SHIGEKI YAMATO
YASUSHI MARUYAMA
SHUNJI TASHIRO

BY Hopgood & Calimafde
ATTORNEYS

INVENTORS
SHIGEKI YAMATO
YASUSHI MARUYAMA
BY SHUNJI TASHIRO

Hopgood & Calimafde
ATTORNEYS

INVENTORS
SHIGEKI YAMATO
YASUSHI MARUYAMA
SHUNJI TASHIRO
BY
Hopgood & Calimafde
ATTORNEYS INVENTORS
SHIGEKI YAMATO
YASUSHI MARUYAMA
BY SHUNJI TASHIRO
Hopgood & Calimafde
ATTORNEYS.

PATENTED DEC 15 1970 3,548,108

SHEET 08 OF 22

INVENTORS
SHIGEKI YAMATO
YASUSHI MARUYAMA
BY SHUNJI TASHIRO

Hopgood & Calimafde
ATTORNEYS

INVENTORS
SHIGEKI YAMATO
YASUSHI MARUYAMA
SHUNJI TASHIRO
BY
Hopgood & Calimafde
ATTORNEYS INVENTORS
SHIGEKI YAMATO
YASUSHI MARUYAMA
SHUNJI TASHIRO
BY
Hopgood & Calimafde
ATTORNEYS

INVENTORS
SHIGEKI YAMATO
YASUSHI MARUYAMA
SHUNJI TASHIRO

BY Hopgood & Calimafde
ATTORNEYS

INVENTORS
SHIGEKI YAMATO
YASUSHI MARUYAMA
SHUNJI TASHIRO
BY Hopgood & Calimafde
ATTORNEYS INVENTORS
SHIGEKI YAMATO
YASUSHI MARUYAMA
SHUNJI TASHIRO
BY
Hopgood & Calimafde
ATTORNEYS

INVENTORS
SHIGEKI YAMATO
YASUSHI MARUYAMA
BY SHUNJI TASHIRO

Hopgood & Calimafde
ATTORNEYS

INVENTORS
SHIGEKI YAMATO
YASUSHI MARUYAMA
BY SHUNJI TASHIRO

Hopgood & Calimafde
ATTORNEYS

INVENTORS
SHIGEKI YAMATO
YASUSHI MARUYAMA
SHUNJI TASHIRO
BY
Hopgood & Calimafde
ATTORNEYS INVENTORS
SHIGEKI YAMATO
YASUSHI MARUYAMA
SHUNJI TASHIRO
BY
Hopgood & Calimafde
ATTORNEYS INVENTORS
SHIGEKI YAMATO
YASUSHI MARUYAMA
BY SHUNJI TASHIRO
Hopgood & Calimafde
ATTORNEYS

2619

INVENTORS
SHIGEKI YAMATO
YASUSHI MARUYAMA
SHUNJI TASHIRO
BY Hopgood & Calimafde
ATTORNEYS

INVENTORS
SHIGEKI YAMATO
YASUSHI MARUYAMA
BY SHUNJI TASHIRO

Hopgood & Calimafde
ATTORNEYS

INVENTORS.
SHIGEKI YAMATO
YASUSHI MARUYAMA
SHUNJI TASHIRO
BY
Hopgood & Calimafde
ATTORNEYS INVENTORS
SHIGEKI YAMATO
YASUSHI MARUYAMA
SHUNJI TASHIRO
BY
Hopgood & Calimafde
ATTORNEYS

TELEGRAPH AND TELEPHONE SWITCHING SYSTEM UTILIZING A STATIONARY SATELLITE

This application is a continuation of application U.S. 530,270, filed Feb.28, 1966, now abandoned This invention relates to a communication system to be used in conjunction with an artificial satellite, and, in particular, to a telegraph and telephone exchange system and its associated apparatuses utilizing a stationary satellite.

Various communication techniques are known for the transmission of information between two points on the earth's surface. If the two points are separated by an ocean and located on different continents, wireless shortwave is generally utilized because of its economy. In this case, however, seasonal or daily changes in ionospheric conditions and their sporadic variations due to the solar activities have made it difficult to achieve reliable communication between such points. In addition, the assigned frequency bands are now so overcrowded it is utterly hopeless to provide a worldwide telecommunication network by such communication systems.

While transoceanic cables offer greater reliability, a worldwide mesh of such cables would be prohibitively expensive in view of the per mile cost and the peak load variations (requiring a large overload factor).

Furthermore, in the above-described network, the ideal plan would be such that the transit exchange stations would have to be located at the most suitable points, calculated from the quantity of traffic at each point, thus effecting a hierarchical network for the whole or part of the intercontinental communication network. However, by reason of the geographical condition, this plan is further complicated by the fact that the total length of the cables to the locations where the transit exchange stations may practically be located will be considerably longer than the total length of the cables in the ideal plan. Even in such cases where the telephone exchange is nearly ideal, the above-mentioned drawbacks would be somewhat lessened but not obviated. Moreover, political intervention and tariffs in third party exchange or servicing countries will also prove to be a hazard.

Accordingly, it is the object of this invention to overcome the foregoing disadvantages of conventional systems and provide a quickly establishable communication path between any pair of stations, widely distributed over the earth's surface by utilizing a large number of stable and superior quality channels obtained via an artificial communication satellite of the stationary type interconnecting all of these widely distributed stations.

It is a further object of this invention to provide such a system with the capability of supplementing peak load area channels from existing overall capabilities.

Briefly, the invention is predicated upon the concept of providing a telegraph and telephone switching system utilizing a stationary satellite; installing a plurality of earth stations and one central earth located control station, all within a region visible from said stationary satellite; providing a large number of communication paths by dividing the frequency band assigned to the satellite, the earth stations and the central control station into a plurality of channels and, if necessary, further effecting time division whereby, upon each call from each of the earth stations, the central control station which stores the status of all communication paths being used, assigns an idle communication path so that a communication can be established between said calling and said called earth stations.

The telegraph and telephone exchange system according to this invention comprises a stationary satellite including a transponder unit, a plurality of earth stations, each adapted to process a group of originating calls emanating via surface communication networks, and a central control station. Each of the earth stations includes a detecting device for detecting the origination of calls, to analyze informations contained in the calls for determining transmission lines leading to the destinations and to detect the progress and termination of the calls, means for sending and receiving the control information to and from the central control unit through the communication path provided by the satellite, a transmitter unit to transmit signals to the satellite, a receiver to receive the signal sent back from the satellite and a modulator-demodulator to connect the surface networks with the communication path through the satellite which is assigned by the central control unit. The central control unit has sending and receiving equipments for the control information and also transmitting and receiving units similar to the earth stations. It further includes a memory unit for memorizing the working status of all of the communication paths provided by the satellite and a control information processing unit to produce the control information to be sent out to the earth stations for the assignment of paths, the judgment being made from the stored information in the memory unit and the control information arriving from the earth stations.

More particularly, the present invention contemplates a telegraph and telephone switching device utilizing a stationary satellite characterized in that said device includes an artificial stationary satellite having a transponder unit; a plurality of modulator-transmitters, each of which radiates an electromagnetic wave modulated by information being transmitted to said satellite through one of the communication paths obtained by dividing the pass band of said transponder into a plurality of channels and, if necessary, by time-dividing them; receiver-demodulators, each of which extracts communication information from the electromagnetic wave transmitted from the satellite through said one of said communication paths; detectors, each of which detects the arrival of a demand for an information transmission, the destination of said information and the termination of the transmission of said information; a plurality of memories, each of which stores the status of all the communication paths, the modulator-transmitters in use and the receiver-demodulators being used; a data processor which assigns a communication path for each demand for each demand for transmitting information according to the contents of the memory unit and which initiates the memorizing of the status of the communication paths being used or erases the same; a plurality of control data links, each of which transmits information detected by the detector to the data processor; and other control data links, each of which transmits the designation of a communication path being used from the data processor to said modulator-transmitter and to the receiver-demodulator; whereby a communication path is provided, through the satellite, between an originating point connected to one of the modulator-transmitters and a terminating point connected to one of the receiver-demodulators so that a plurality of information-originating points and a plurality of information-terminating points can be connected on demand.

A stationary satellite as defined herein is an artificial or natural satellite which is stationary relative to the earth surface, but not necessarily stationary on an absolute scale. The satellite includes an amplifying transponder which converts the frequency of the electromagnetic waves emitted from the earth stations and the central control station. The earth station is constructed similar to an international telegraph or telephone exchange office and comprises a modulator-transmitter unit which emits the electromagnetic wave modulated by the information to be transmitted to the satellite, a receiver-demodulator unit for receiving and extracting information from the signal reemitted from the satellite and a detecting unit for detecting the origination of the demand for the transmission of information, the destination of the information, and the termination of the transmission of information. The central control station includes a modulator-transmitter unit and a receiver-demodulator unit similar to the earth station, and also includes a memory unit for storing the working status of all communication paths between the satellite, earth stations and the central control station, and also the working status of the modulator-transmitter and the receiver-demodulator. An information-processing unit in the central stations scans these memories, assigns a communication path responsive to each demand for the transmission of information and at the same time controls the storing and erasing in these memories. Control information paths exit for the transmitting control signals from the detecting devices of the earth stations to the information-processing unit, and other control information paths exit for the transmission of informations about the assigned channels, from the information-processing unit to the modulator-transmitter units of the earth stations and also information about the receiving channels, from said information-processing unit to said receiver-demodulator unit of the earth stations.

The above-mentioned and other features and objects of this invention and the manner of attaining them will best be understood by reference to the following description of embodiments of the invention taken in conjunction with the accompanying drawings wherein:

FIGS. 2, 3, 4 and 5 being joined to the right side of each preceding FIG.

FIGS. 12, 13, and 14 being joined on the right side of each preceding FIG.

Figure 15:
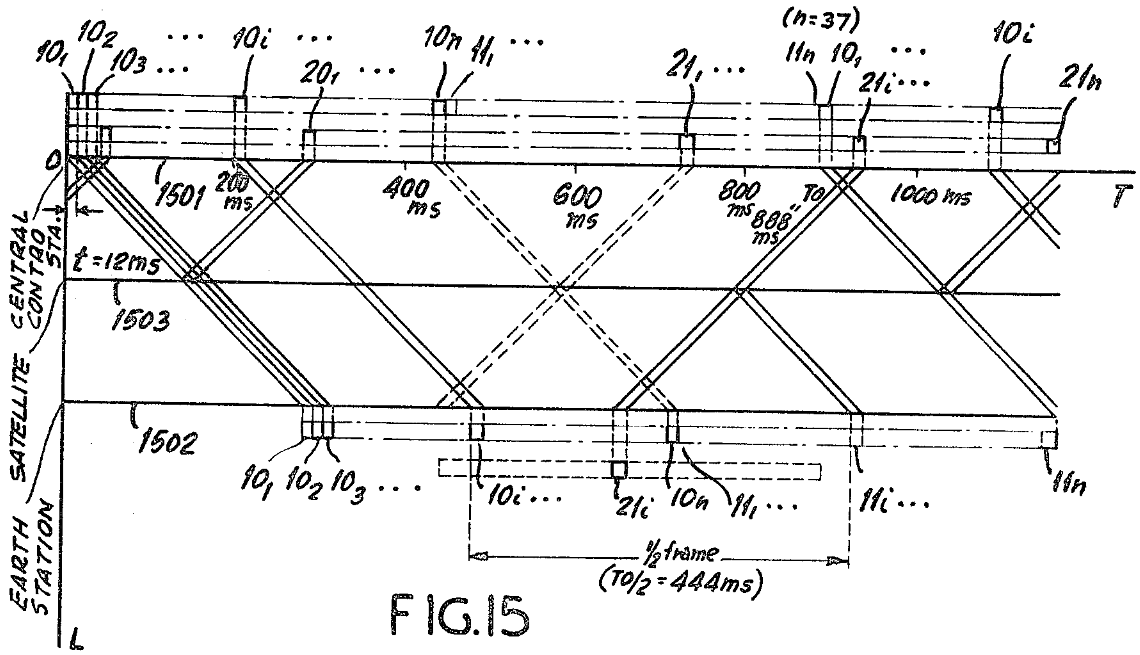
FIGS. 15 through 24 and FIG. 36 are block diagrams to be used for explaining the time division multiplex communication paths for transmitting control data, and for explaining a control data terminal unit for controlling these multiplex communication paths.

In particular, FIG. 15 graphically indicates the constitution of the time slots in the time division multiplex communication path for the transmission of the control informations.

Figure 16:
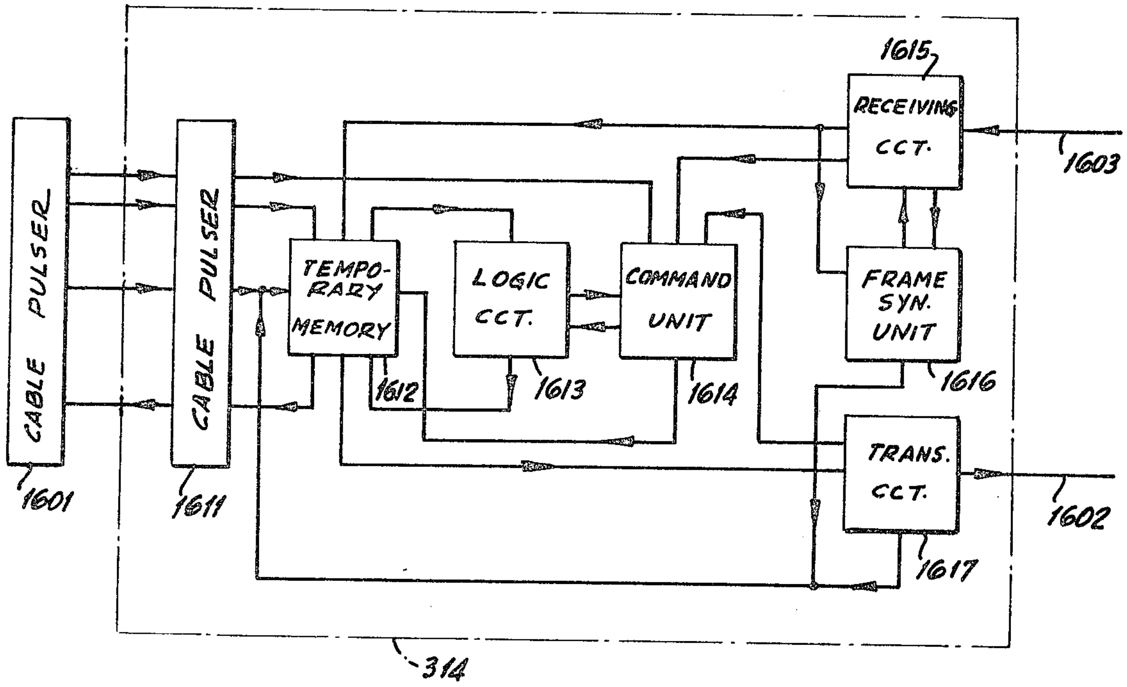

FIG. 16 is a block diagram of the control data transmission terminal unit in the central control station.

Figure 17:
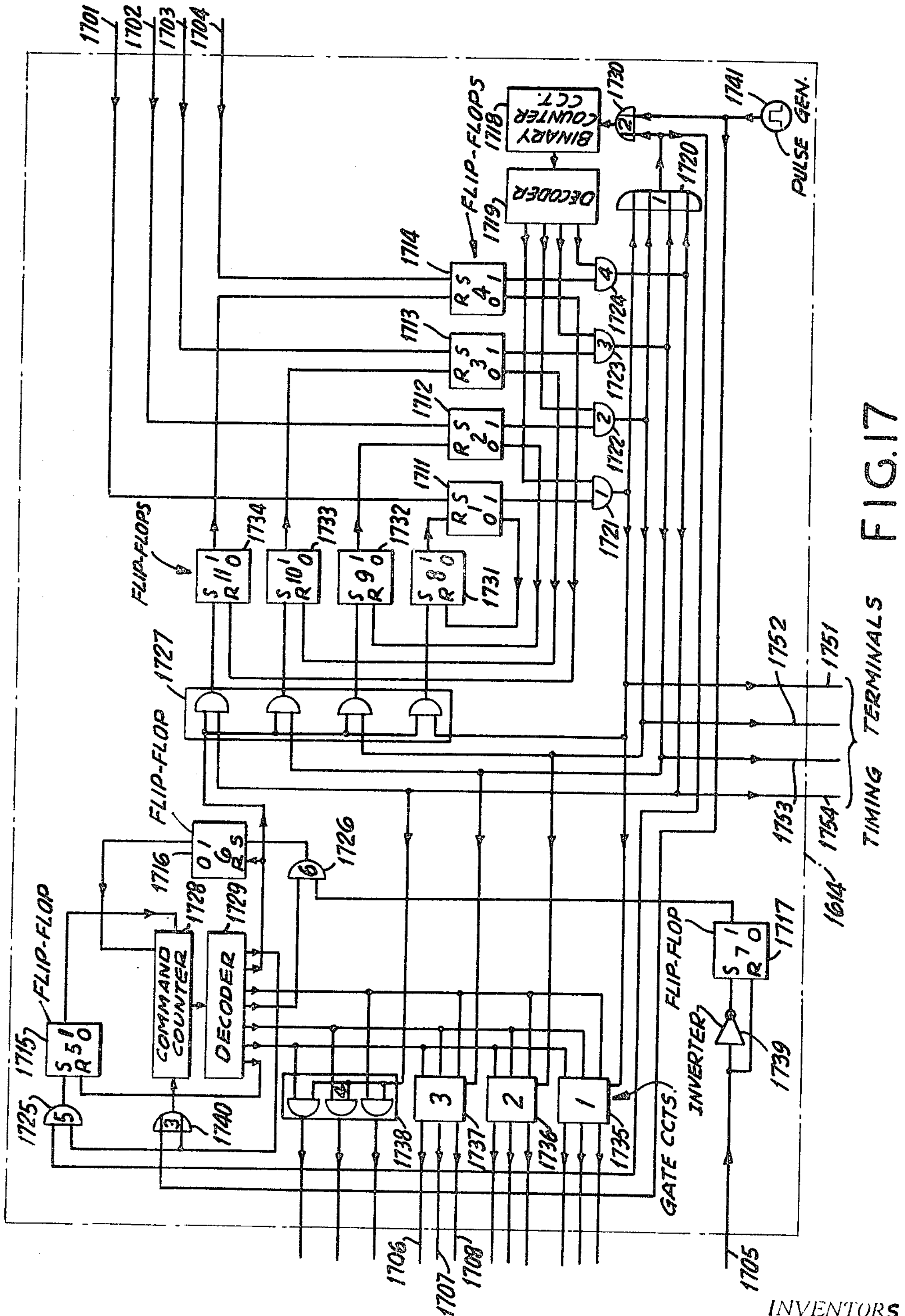

FIG. 17 is an order equipment constituting one part of the control data transmission terminal unit.

Figure 18:
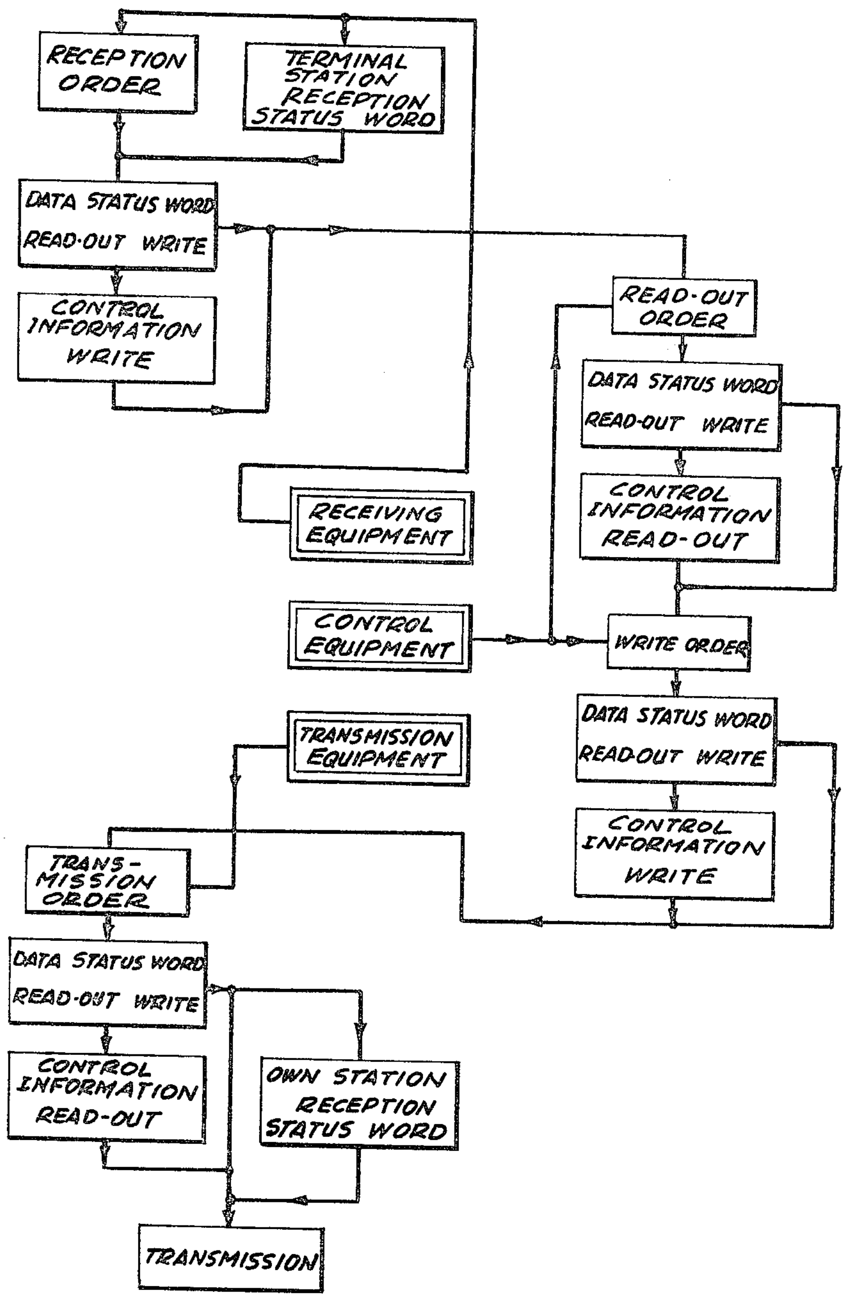

FIG. 18 is a function flow chart showing the operation of the control data transmission terminal unit.

Figure 19:
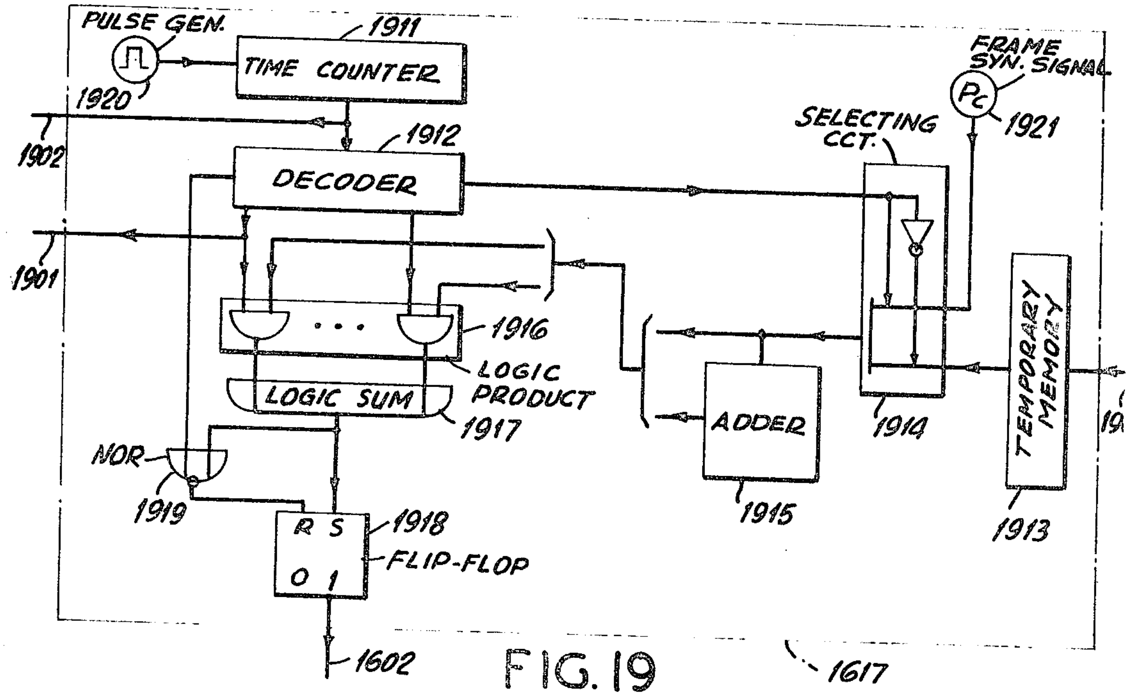

FIG. 19 shows a data transmission device in the control data transmission terminal unit.

Figure 20:
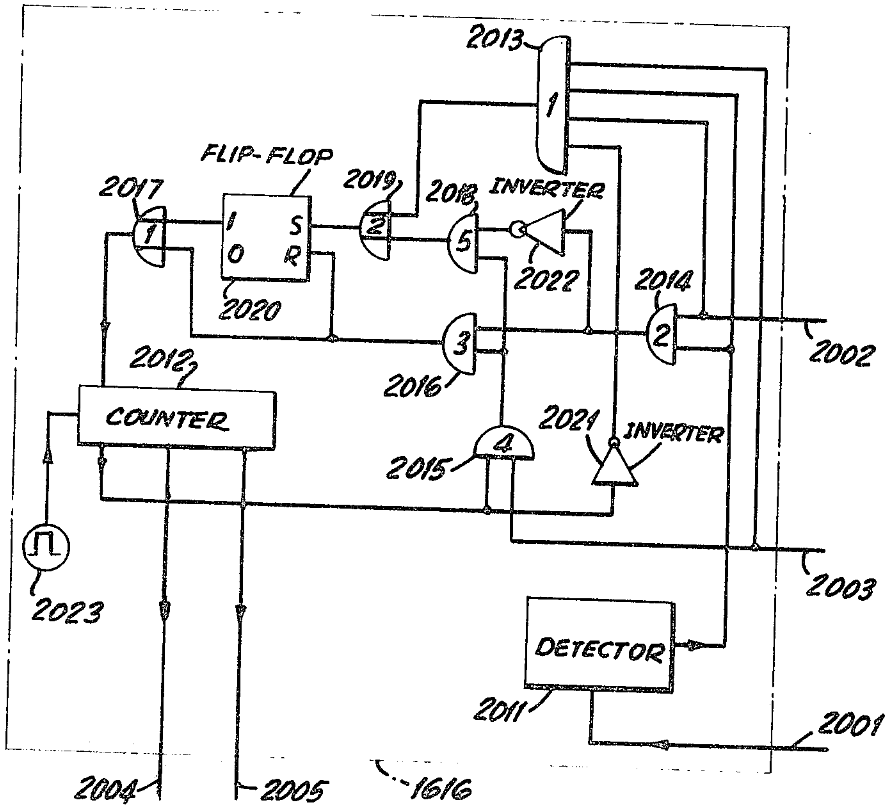

FIG. 20 shows a receiving frame-synchronizing circuit in the data terminal unit.

Figures 21, 35:
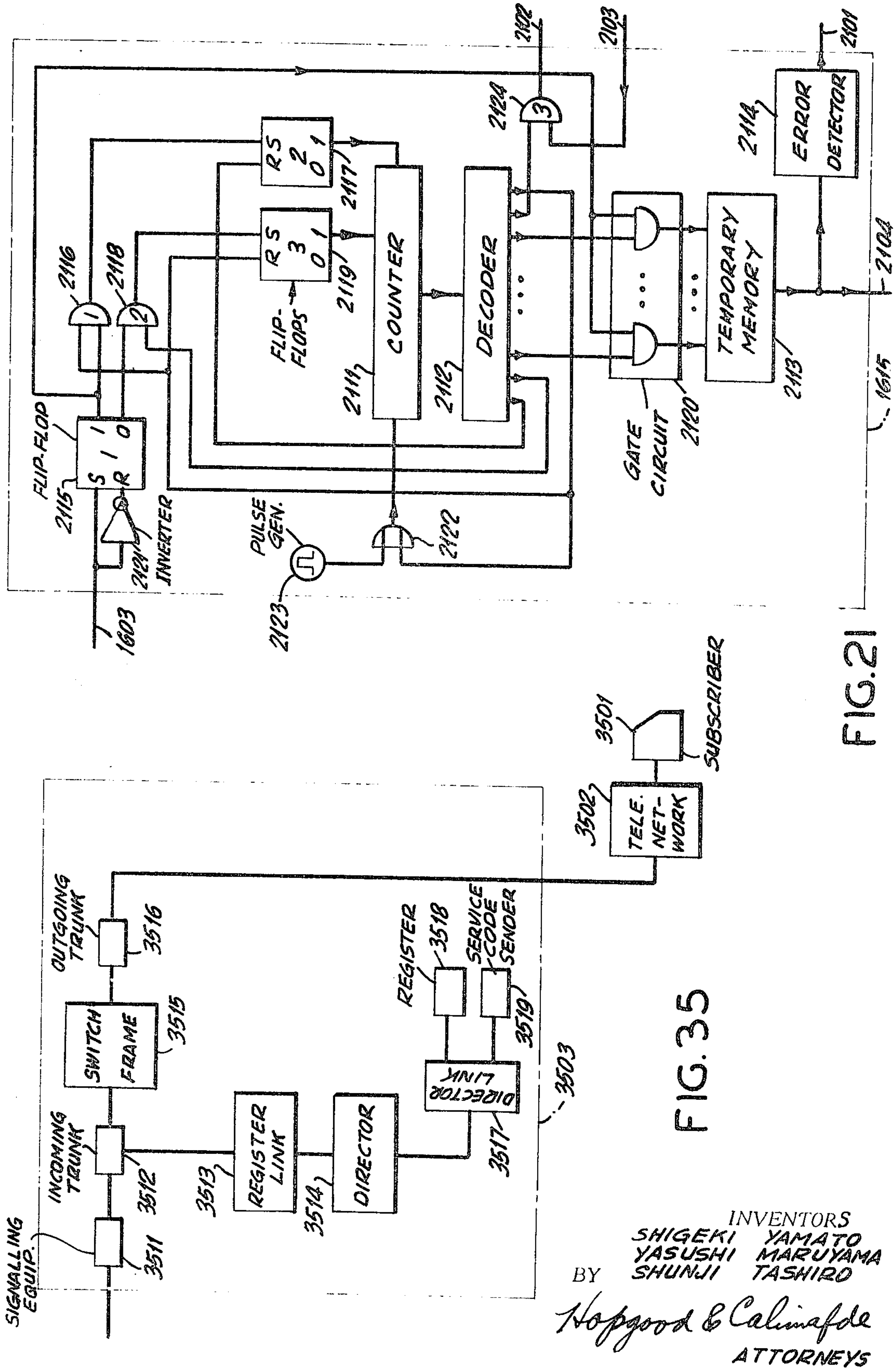

FIG. 21 illustrates a receiving device of the data terminal unit.

Figure 22:
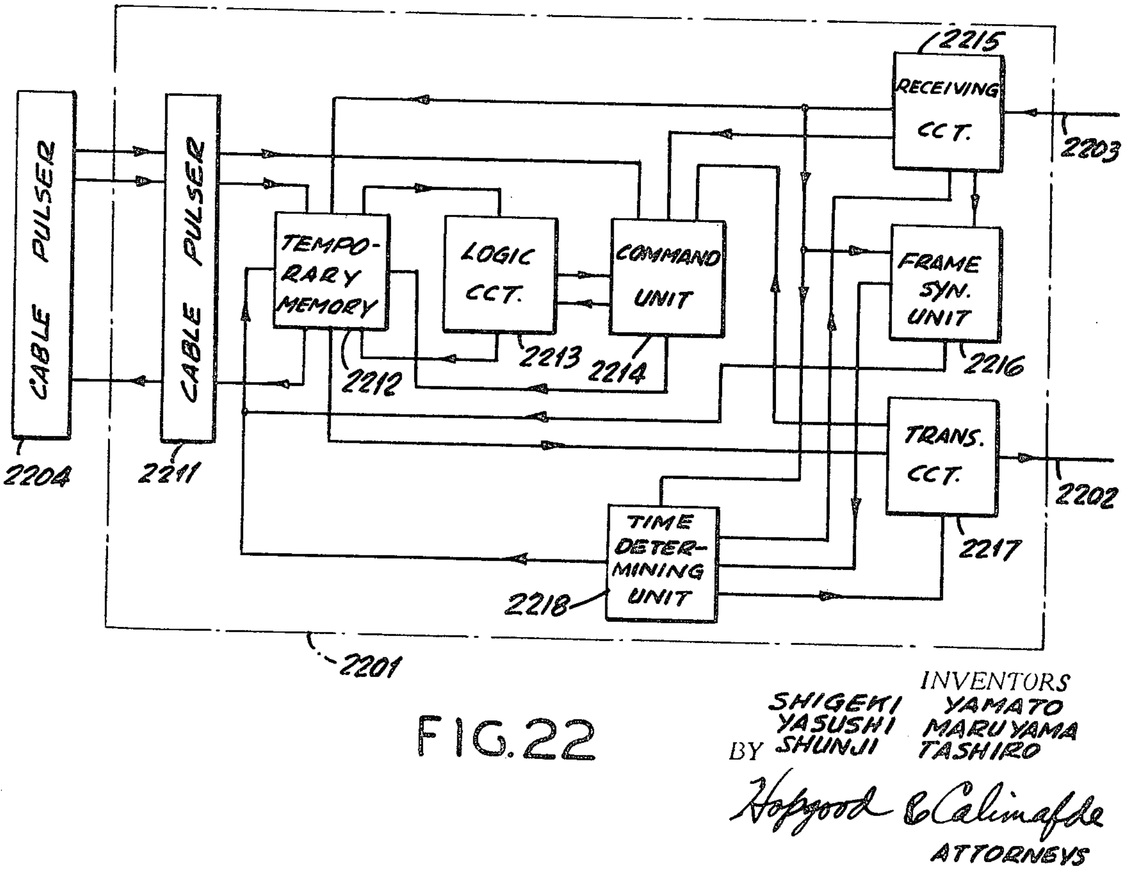

FIG. 22 illustrates in block diagrammatic form the control data transmission terminal unit in an earth station.

Figure 23:
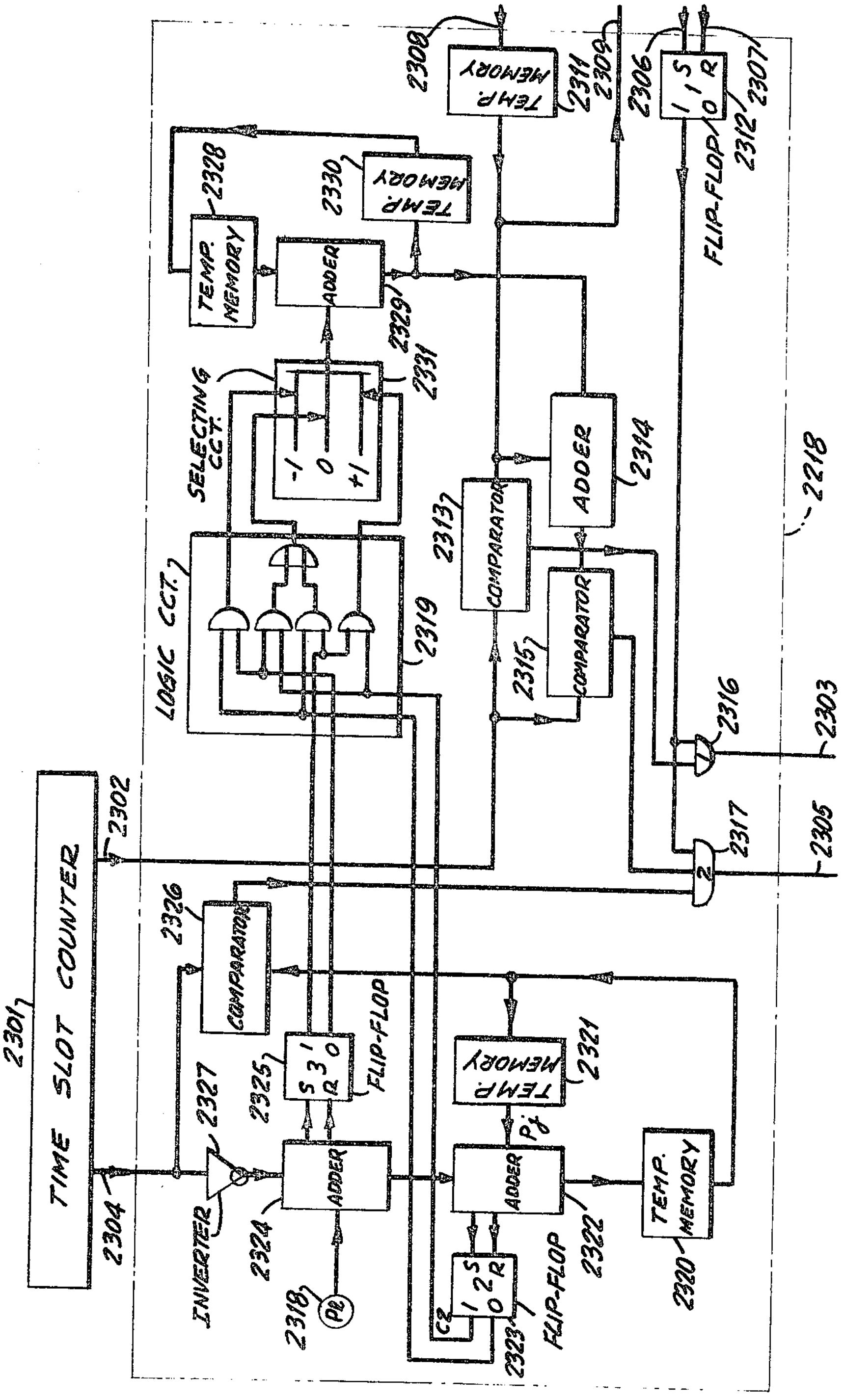

FIG. 23 shows a transmission time control circuit used in the part of the data terminal unit in the earth station.

Figure 24:
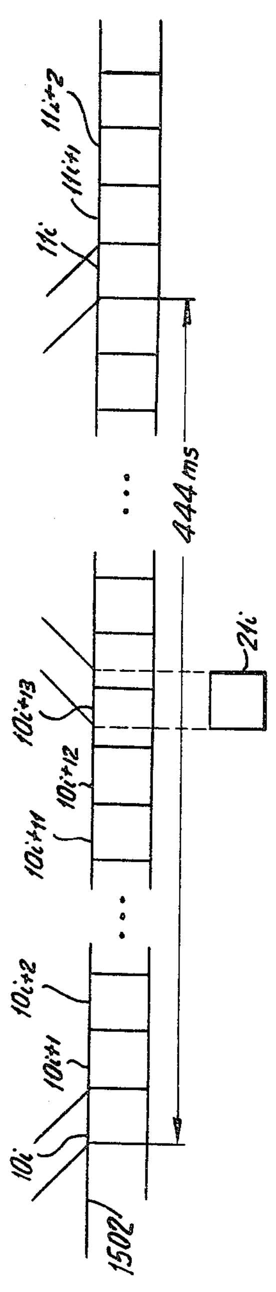

FIG. 24 indicates time slots of the transmission time control circuit in the earth station in FIG. 23.

Figure 25:
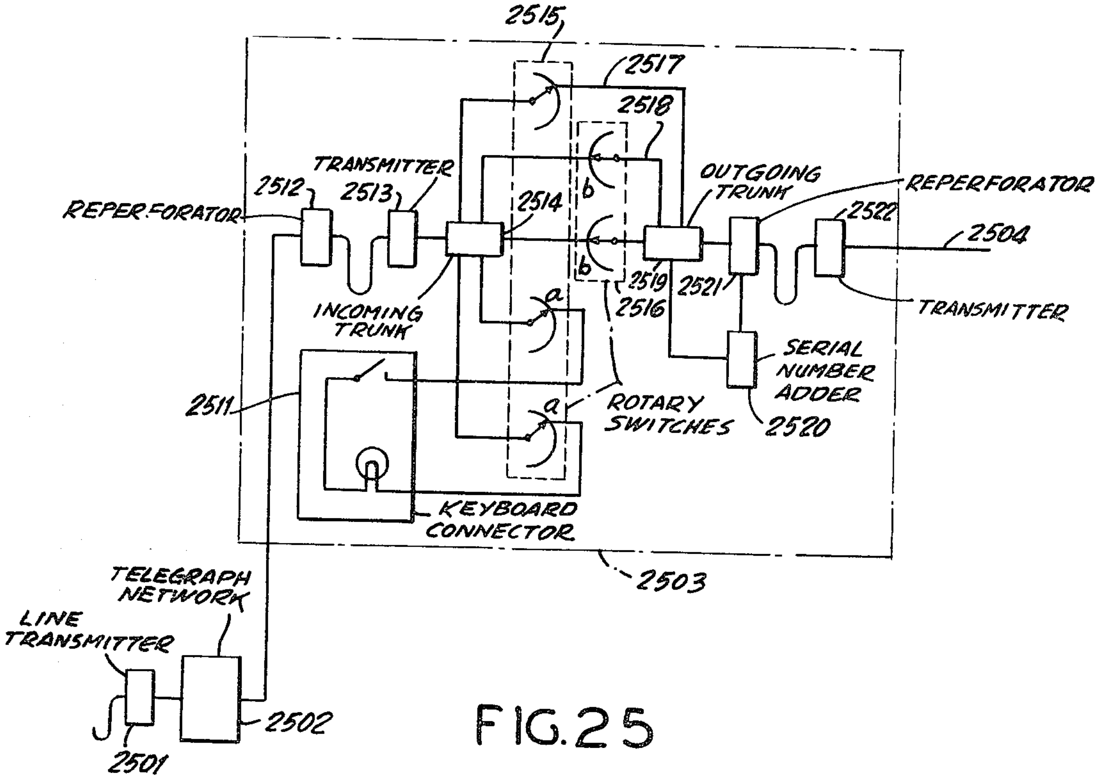
Figure 26:
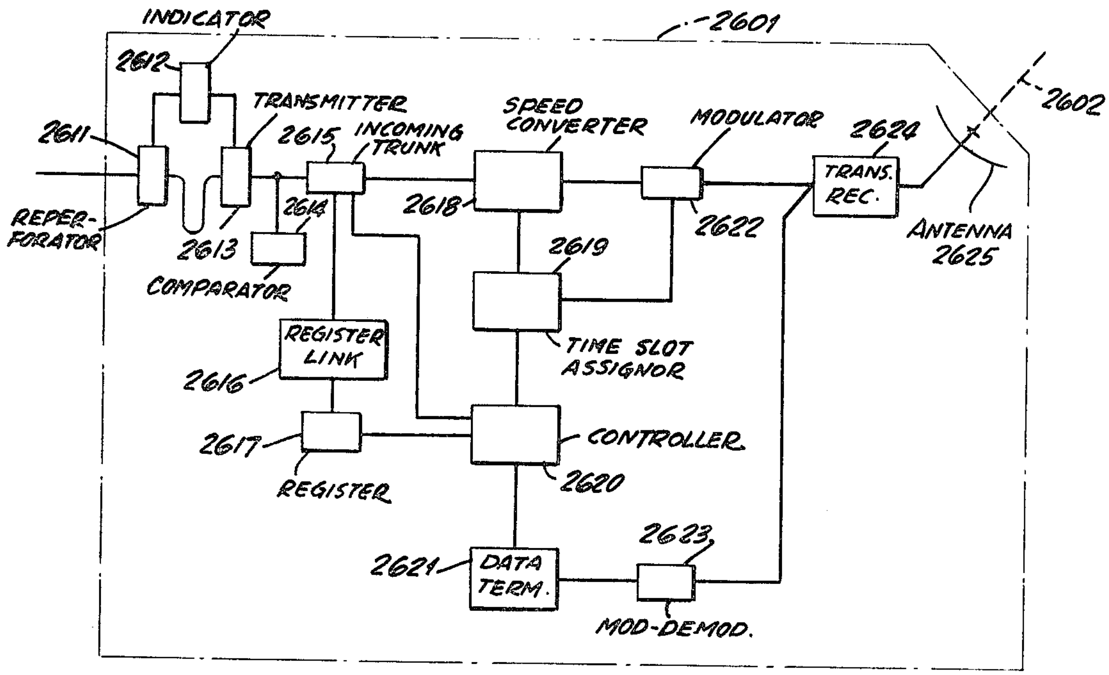
Figure 27:
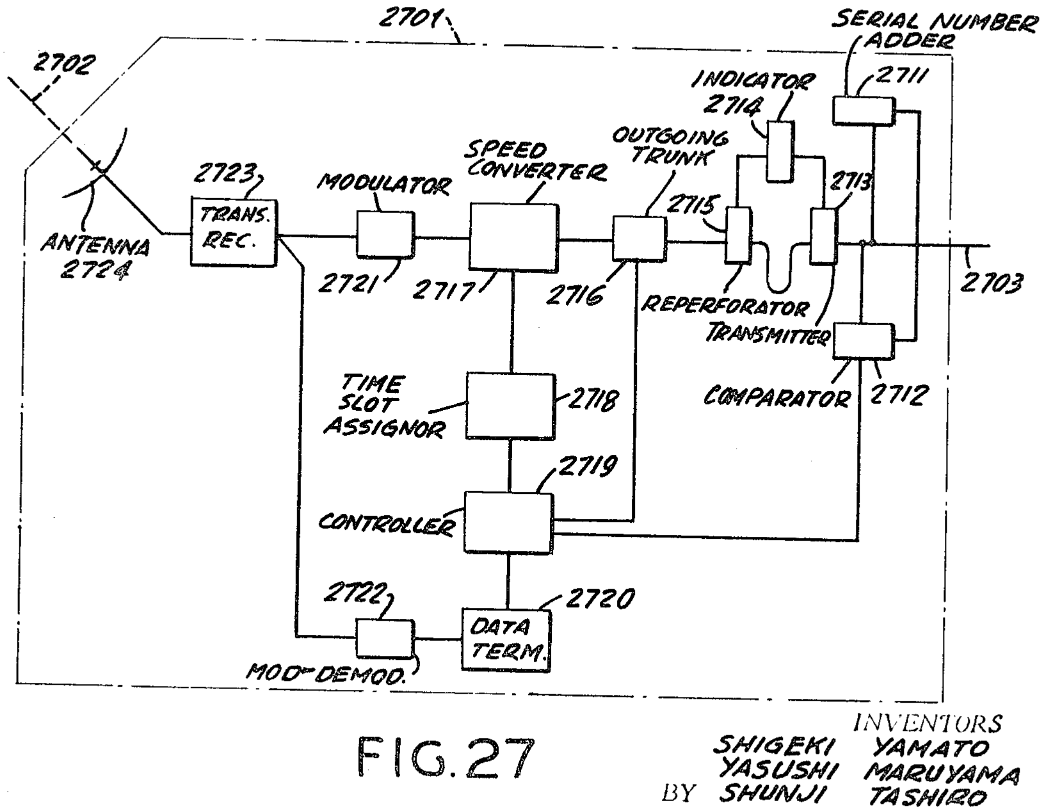

FIGS. 25, 26 and 27 are block diagrams of a telegraphic exchange system utilizing the time division multiplex communication paths of another embodiment of this invention; the drawings are to be joined on the right side of each preceding FIG.

Figure 28:
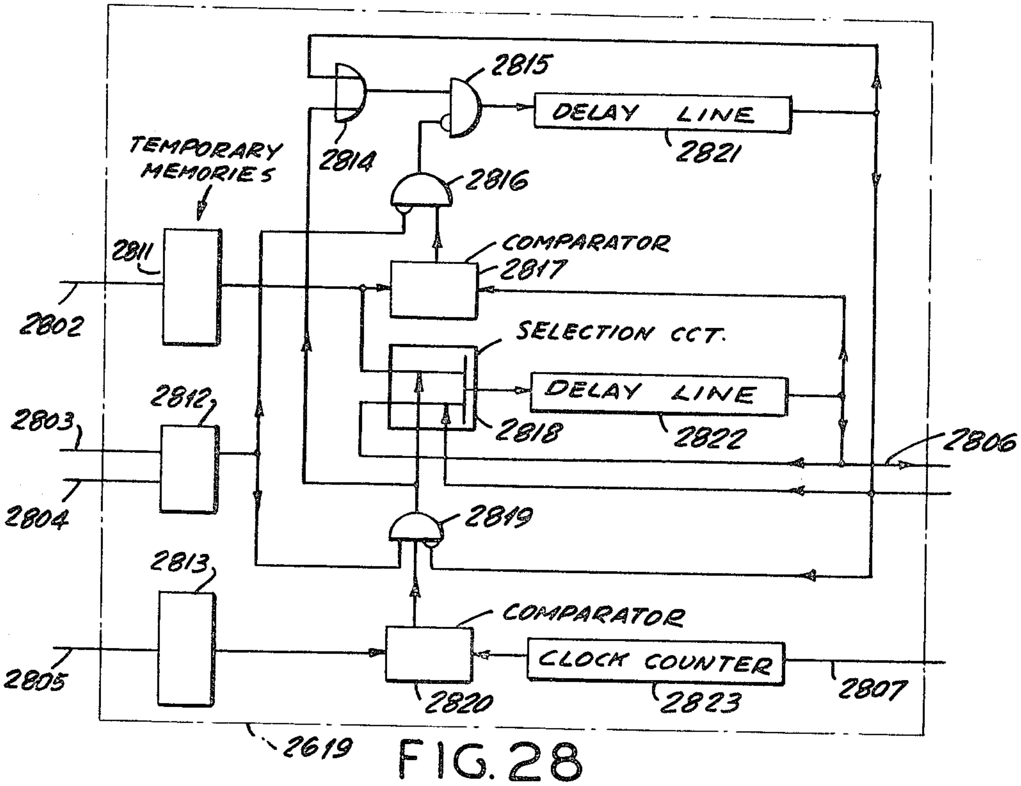

FIG. 28 is a circuit diagram of a time slot assigning device in the earth station.

Figure 29:
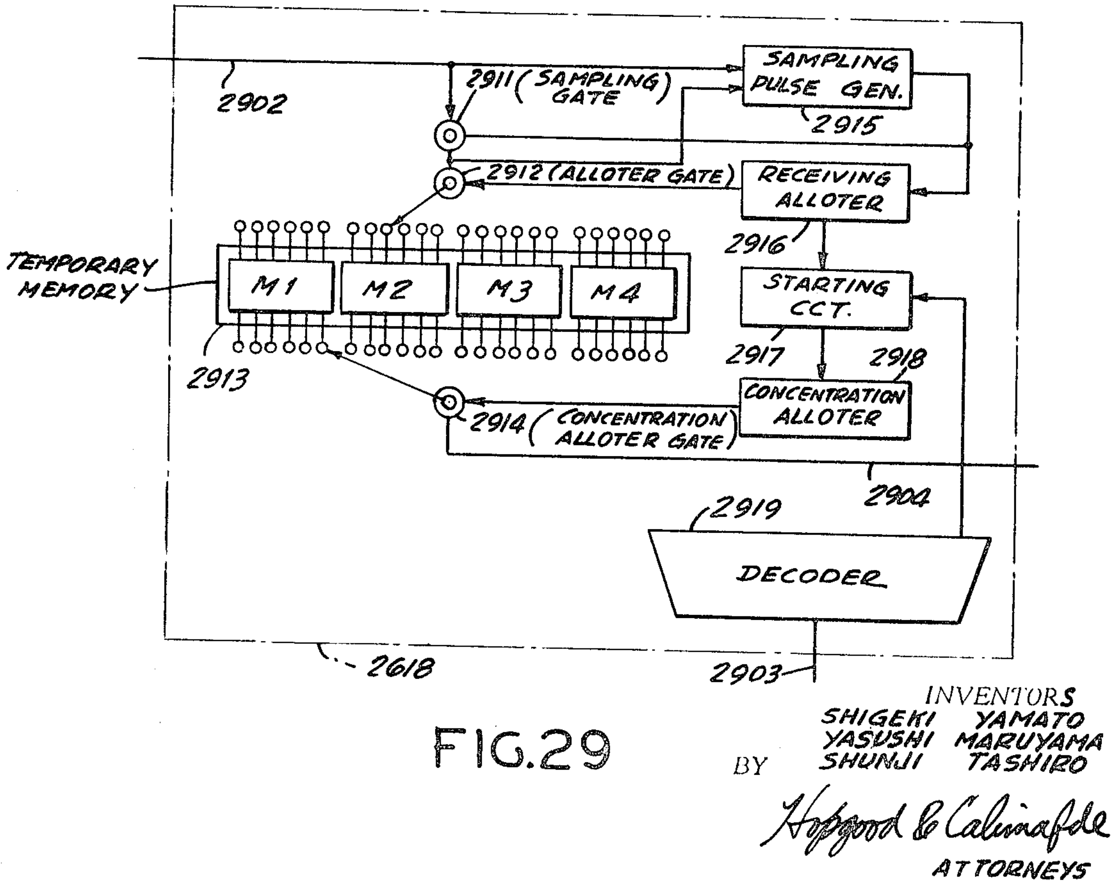

FIG. 29 is a circuit diagram of a multiplex speed converter also in the earth station.

Figure 30:
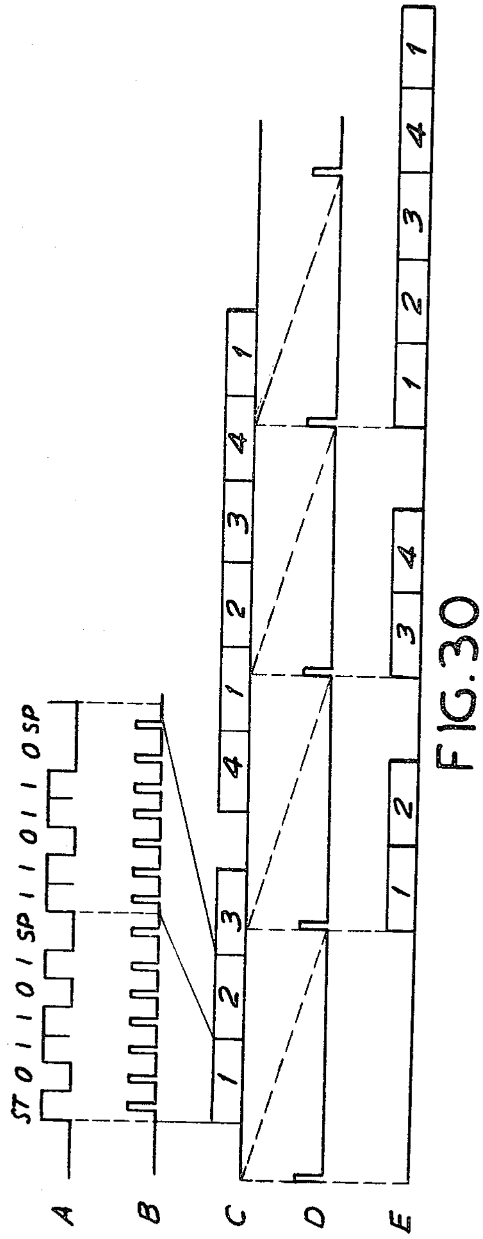

FIG. 30 indicates the signal waveform to be used in explaining the multiplex speed converter.

Figure 31:
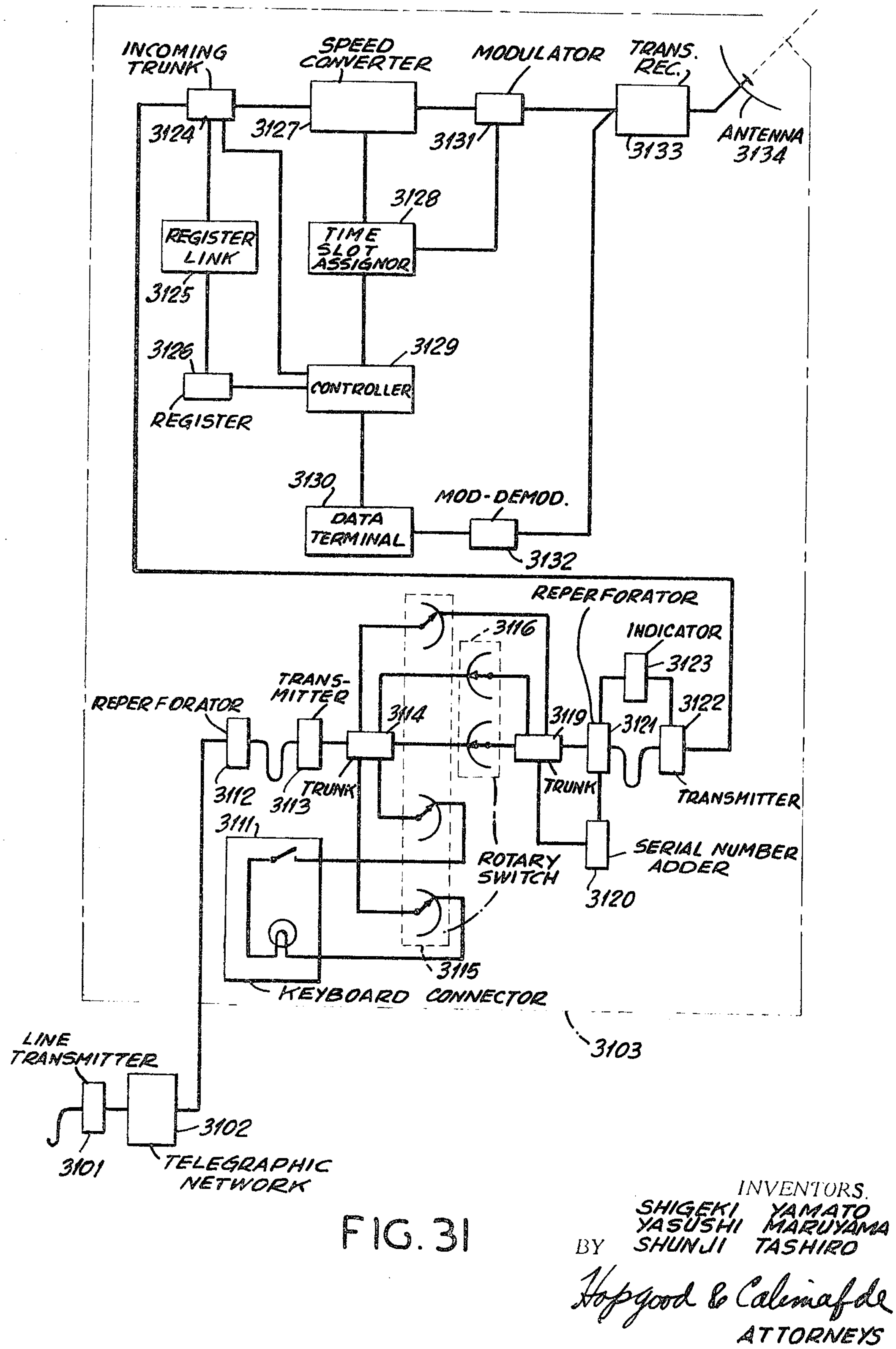

FIG. 31 is a block diagram for the case of the gateway station being joined to an earth station.

FIGS. 32 through 35 are block diagrams of still another embodiment of this invention employing a multiplex time division Telex switching system; each drawing is joined to the right side of the preceding drawing.

Figure 36:
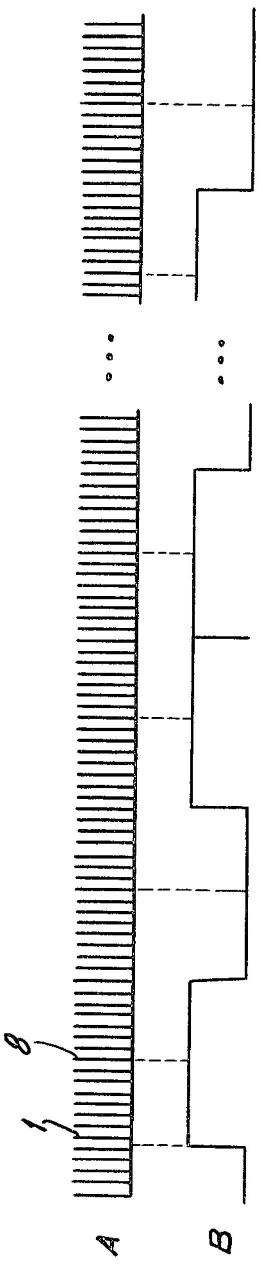

FIG. 36 indicates wave forms of the receiving device of FIG. 21.

Turning now to FIGS. 1 through 5 in first embodiment of this invention will be described. For simplicity the explanation is limited to telephone exchanges. FIGS. 11 through 14 are detailed circuits of the apparatuses shown in these FIGS.

Figure 1:
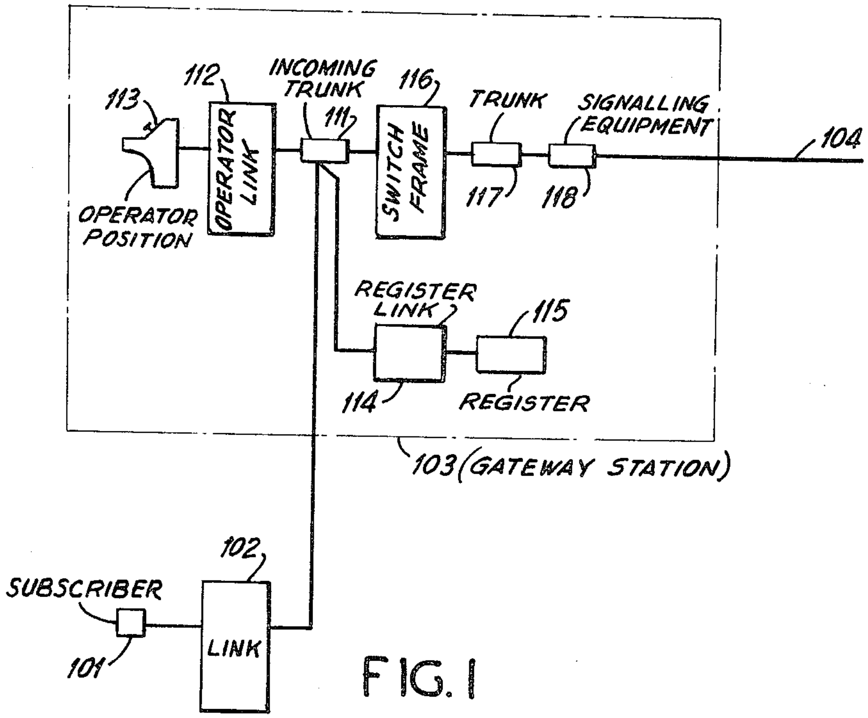
FIGS. 1 through 5 illustrate in block form the first embodiment of this invention.

In FIG. 1, a typical example of a telephone network is shown and only the components necessary for explanation of the invention are illustrated. These components and their interconnections are all well known and do not constitute any part of this invention.

Assume that a subscriber (calling) 101 wants to call some other subscriber (called) somewhere on the earth through the telephone exchange system according to this invention. And it is also supposed that the system is of the type so called semiautomatic where an operator of the international switch board controls the connection. By dialing a certain number (access code to the international board), the calling subscriber is connected through the domestic telephone exchange system to an incoming trunk 111 in the international gateway station (hereinafter originating gateway station) 103, and through the operator link 112 to an idle international operator position 113. The operator of the position 113 connects the line as required by the calling subscriber 101. That is, for instance, by activating a proper key set the incoming trunk 111 is connected, through the register link 114, with an idle register 115 where the dialed information (international and national number of called subscriber and language digit) are dialed in and memorized. When it is considered that the call is to be connected through the telephone exchange system according to this invention, the incoming trunk 111 is connected with an idle outgoing trunk 117 through a switch frame 116. The outgoing trunk 117 operates the signalling equipment 118 and transmits a seizure signal on the interoffice trunk line 104 which informs to a next switching point that a call is originated on the trunk line 104.

Figure 2:
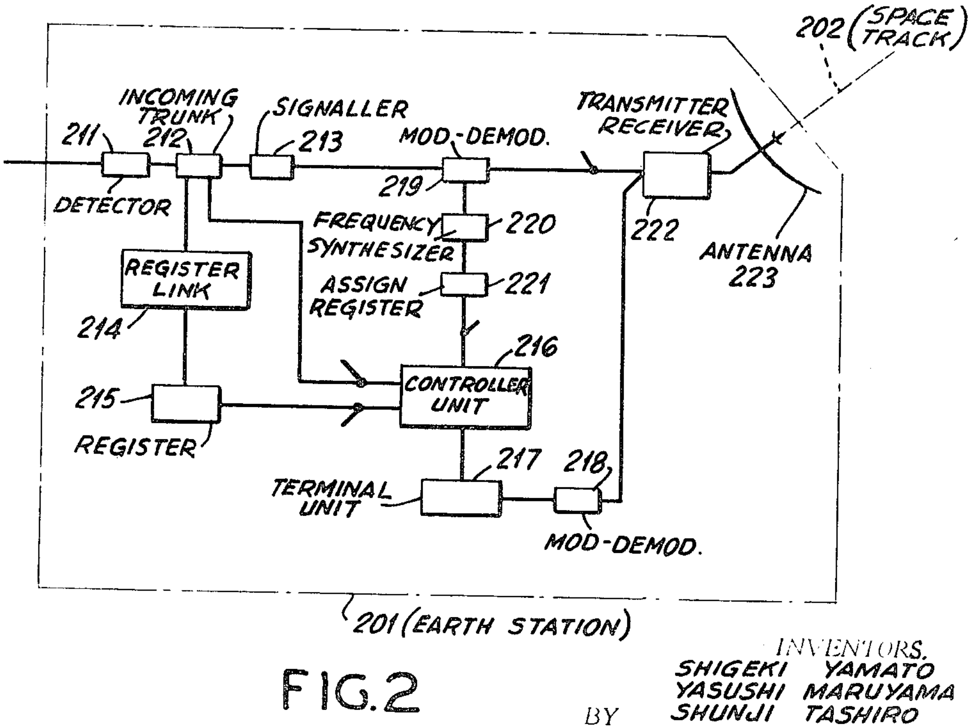

Referring to FIGS. 1 and 2, an earth station 201 (hereinafter originating earth station) which is constituting one component of this invention has been connected with said originating gateway station 103 through the interoffice trunk line 104, and the call originated on the interoffice trunk line 104 constitutes an input to the exchange system according to this invention. Therefore, it is to be understood that the exchanges and connections as described above starting from a calling subscriber 101, through the interoffice trunk line 104, to the originating earth station 201 are only exemplary and other type of exchanges and connections can also be made without any influence in the operation of exchange system according to this invention.

Referring to FIGS. 1 and 2 again, at the originating earth station 201, the first signalling equipment 211 detects the seizure signal from the former switching point or the originating gateway station 103 and controls the incoming trunk 212 so that it is connected to an idle register 215 through a register link 214. Thereafter, the incoming trunk 212 controls the first signalling equipment 211 and let it send back a "proceed-to-send" signal on the interoffice trunk line 104. At the originating gateway station 103, the signalling equipment 118 receiving this "proceed-to-send" signal activates the register 115 through the outgoing trunk 117 and the incoming trunk 111 so that the stored dialed information in the register 115 are sent out to the next switching point. At the originating earth station 201, the dialed information sent out from the former switching point are received and stored in the register 215 which has been connected with the incoming trunk 212. The internal circuits of the apparatuses associated with these operations can be realized by familiar circuits utilized in the conventional telephone exchange system. During these receiving and storing operations, when the register 215 receives enough informations to identify a terminating earth station through which the call is transmitted (in ordinary case the international code), while continuing the reception of rest of the dialed information, activates the incoming trunk 212 through the register link 214 and make it supply a predetermined amount of voltage to one of the control lines connecting this incoming trunk 212 and a control unit 216. The controller 216 always scanning this voltage appears on the control lines connected with each of the incoming trunk such as 212, knows from the voltage and position of the control line the exact register 215 which is in the aforementioned operational state and also the equipment number of the incoming trunk in which the call arrives, and activates the register 215 through another control line connecting between the controller 216 and incoming trunk 212, the trunk 212 and the register link 214, and receives the already stored dialed information in the register 215 through an information line connecting between the register 215 and the controller 216. In addition to this incoming trunk number and arrived dialed information, the controller 216 supplements the station number of the originating earth station and a predetermined identification code and arranges these numbers in a predetermined information format (this is called "request for channel assignment" and gives this to the control data transmission terminal unit (this is called "originating data terminal") 217.

Figure 11:
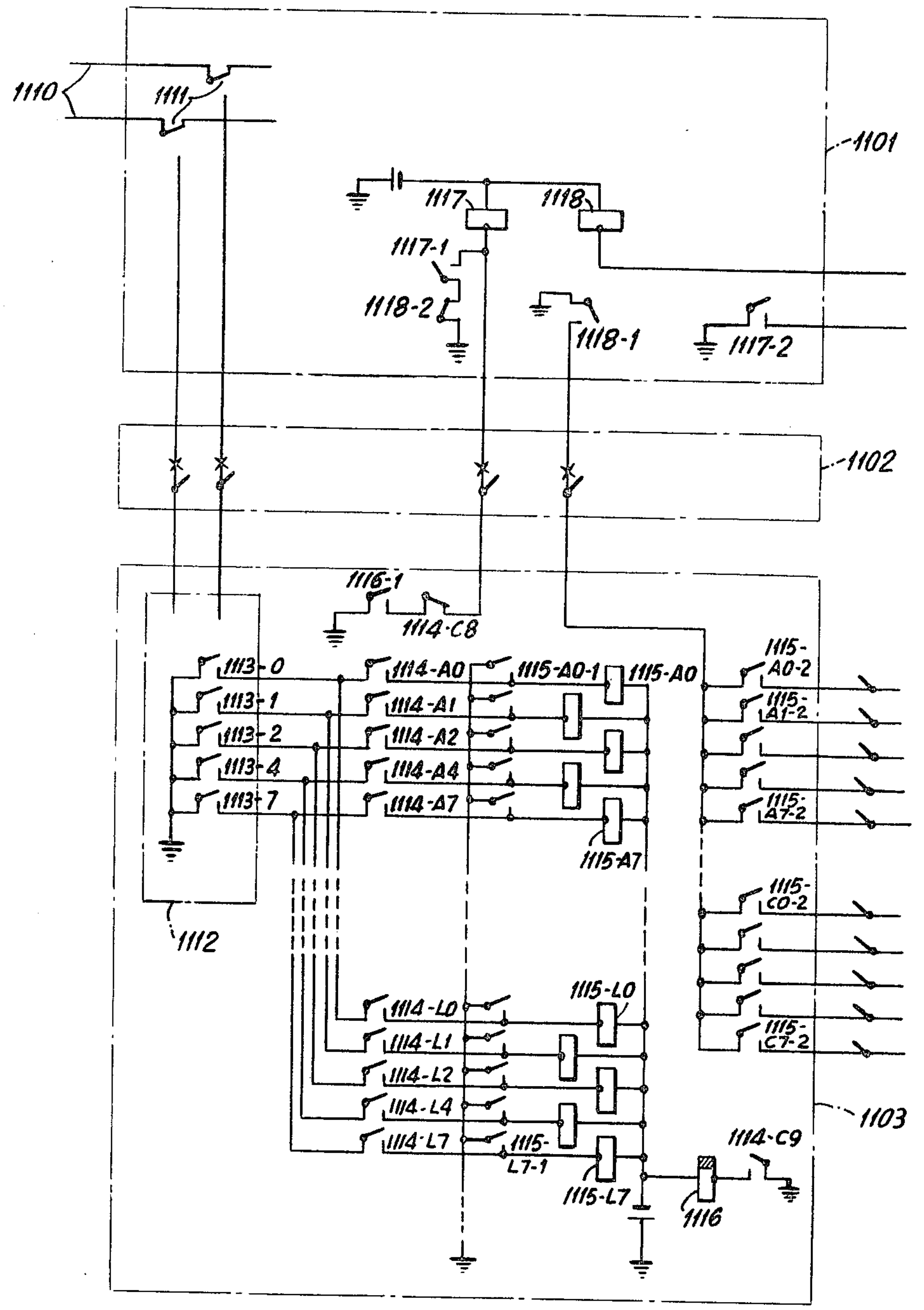
FIGS. 11 through 14 illustrate details of the internal circuits of the apparatuses shown in FIG. 2.
Figure 12:
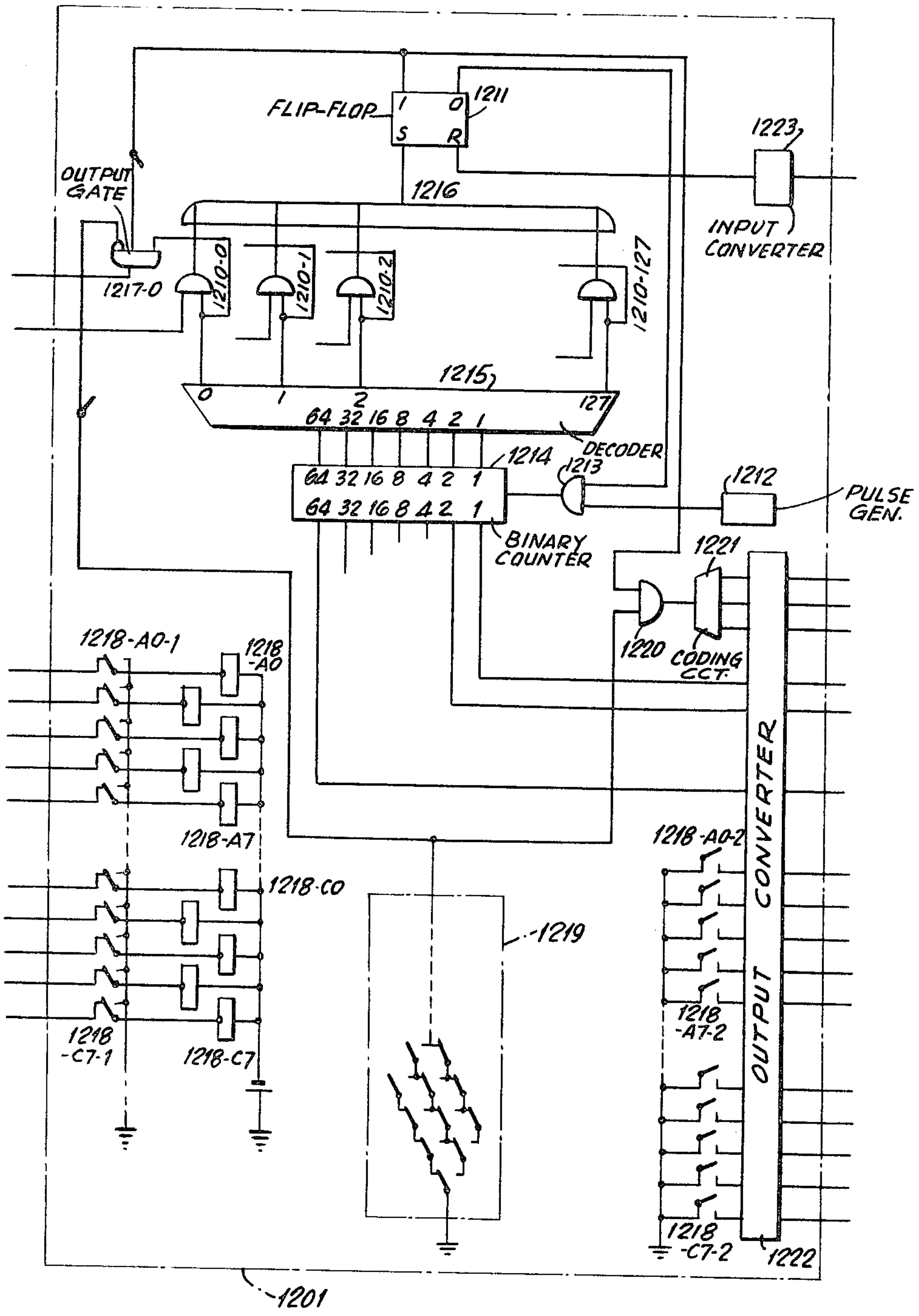

Referring now to FIGS. 11 and 12, together with FIG. 2, the internal circuits particular to this invention corresponding to the incoming trunk 212, register link 214, register 215 and controller 216 are illustrated by the numerals 1101, 1102, 1103 and 1201. The numerical signal on the speech path 1110 arriving from the originating gateway station are transmitted to a receiver 1112 in the register unit 1103 through the speech path splitting contacts 1111 in the incoming trunk 1101 and the register link 1102, and received and detected by the receiver 1112. Then the appropriate ones out of the output contacts 1113-0, 1113-1, 1113-2, 1113-4 and 1113-7 close, and each digit of the information respectively passing through the separate contacts 1114-AO, 1114-A1, .... 1114-A7 and contacts 1114-LO, 1114-L1, ...... 1114-L7, (indicates an example where the numerical signals for the called subscriber are 12 digits), operates the storing relays 1115-AO to 1115-A7 and 1115-L0 to 1115-L7 and these relays are held in operation through the self-holding contacts 1115-AO-1 to 1115-L7-1. These operations are familiar in the conventional exchange systems and well understood. During these operations immediately after the reception of enough numerical information (for instance 3 digits) to identify the terminating earth station, a relay 1117 in the incoming trunk 1101 is operated through the contacts 1114-C8, 1114-C9 and the slow-release relay 1116 including its contact 1116-1, and the relay 1117 is held operated through its own holding contact 1117-1. The operation of the relay 1117 grounds one of the input lines of the scanning gate 1210-0 corresponding to the incoming trunk 1101 through the grounding contact 1117-2, and gives the input line a signal "1." A flip-flop 1211 is normally in the reset condition, and when a pulse train from a pulse generator 1212 is given to a binary counter 1214 (7 digits counter is shown) through an AND gate 1213, the binary counter 1214 progresses in a step-by-step operation. The output (1, 2, 4, ..... 64) of the binary counter 1214 causes an output signal "1" on the corresponding output terminal (0, 1, 2, ..... 127) of a decoding circuit 1215. By this way, the conditions of all of the incoming trunk 1101 are repeatedly scanned. Supposing that all of the outputs from the binary counter 1214 are 0 and as the result a signal "1" is obtained on the output terminal (0) of the decoding circuit 1215, a signal "1" is also obtained at the output terminal of the scanning gate 1210-0 which is an AND gate in itself, and a signal "1" will also appear on the output of an OR gate 1216. When the output signal "1" is given to the "set" terminal (S) of the flip-flop 1211, causing it to operate and also to close the AND gate 1213, the binary counter 1214 is hereafter maintained in the same condition (in this instance at "zero" output). And at the same time the output gate 1217-0 corresponding to the incoming trunk 1101 within the other output gates 1217 is operated. The output gate 1217 containing an amplifier in itself in turn operates a relay 1118 in the incoming trunk 1101 connected with this gate, and through the closing contact 1118-1 of the relay 1118 and the register link 1102 grounds all of the contacts 1115-A0-2, to 1115-C7-2 of the storing relay from 1115-A0 to 1115-C7 in the register unit 1103. Grounding of these contacts through the contact 1118-1 as described above in turn operates one of the receiving relays from 1218-A0 to 1218-C7 inside of the control unit 1201, and the relays are self-held at the operating condition by their own contacts from 1218-A0-1 to 1218-C7-1. By these procedures, the numerical information stored in the register unit 1103 is transferred to the receiving relays 1218 in the controller 1201. When the receiving relays 1218 operate properly, the operation verification circuit 1219 which is composed of the combination of contacts of the receiving relays are closed and generates output signal "1" which in turn is given to an inhibit input terminal of the output gate 1217-0 and stops its operation. At the same time, the output signal "1" of the verification circuit 1219 is applied to an input terminal of AND gate 1220 and the output is sent to coding circuit 1221 where the input signal is converted to a predetermined code signal. This code signal, the number of the incoming trunk indicated by the output of the binary counter 1214 and the numerical information obtained from the contacts from 1218-A0-2 to 1218-C7-2 of the receiving relays are all given to the originating data terminal unit 217 through an output converter circuit 1222 which converts the input signals to that of a suitable signal level to be given to the terminal unit 217. When the signals are correctly received by said terminal unit 217 a reception signal is given to (R) terminal of the flip-flop 1211 through another input converter 1223 and resets the flip-flop 1211.

Referring to FIG. 2 again, an originating data terminal unit 217 is an ordinary type of data terminal unit and has functions to add some redundant digits to the "request for channel assignment" for the purpose of avoiding transmission errors and also to store this information in a condition to be prepared for the repetition demand coming from the receiving side. The information thus processed (generally called "control information") is transferred or modulated into a suitable wave to be sent in a preselected channel provided by the satellite by means of the first modulator-demodulator unit 218 and also by the transmitter-receiver unit 222, and sent out from an antenna 233 to the space track 202.

Figure 3:
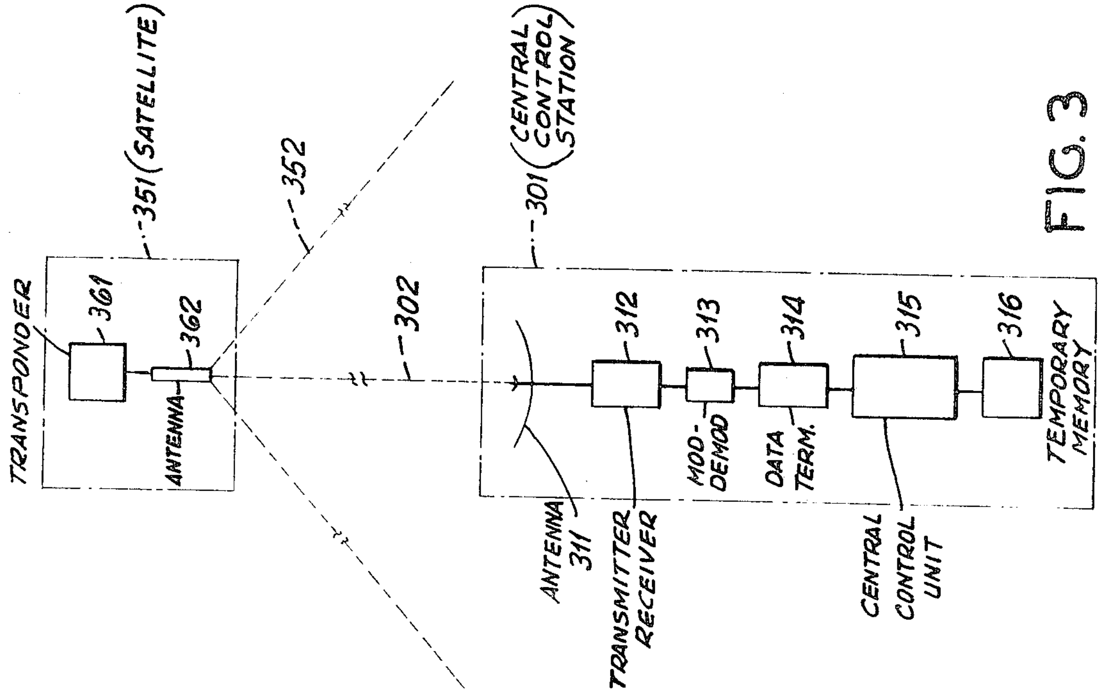
Figure 6:
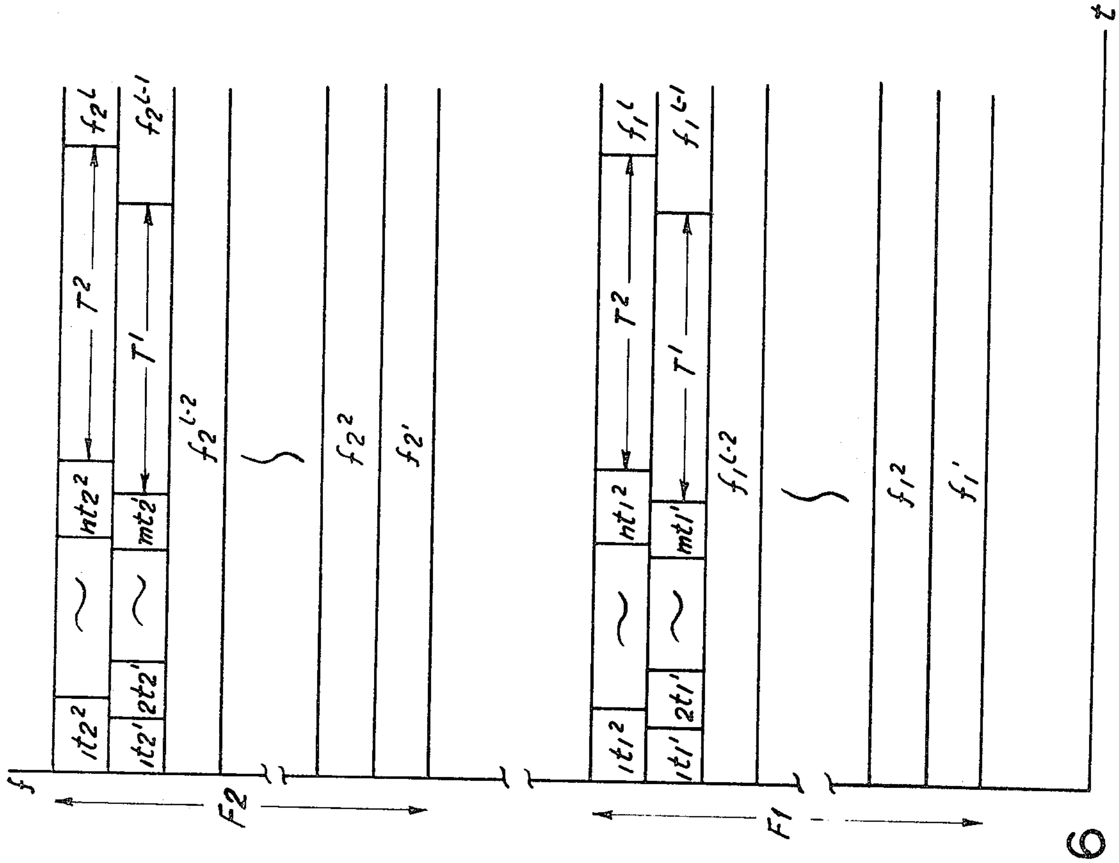
FIG. 6 is a frequency diagram to be used in explaining one method of constituting a multiplex communication path through the satellite.

Referring now to FIG. 6 together with FIG. 3, a typical practice to divide the channels provided by the satellite into numerous paths is described. As shown in FIG. 3, the satellite 351 has a transponder 361 and an antenna 362. Whenever the transponder 361 receives a wave having a frequency of $F_2$ (for instance 6000 megacycles with 120 megacycles bandwidth), the transponder converts this wave into another wave having a frequency of $F_1$ (for instance 4000 megacycles with a bandwidth, of 120 megacycles) and after being amplified, this wave is again emitted through the antenna 362.

In FIG. 6, the vertical axis $f$ represents frequency and the horizontal axis $t$ represents time. It is shown that the frequency bands $F_1$ and $F_2$ are respectively divided into $l$ ea. one-way channels as $f_1^1, f_1^2, ..... f_1^l$ and $f_2^1, f_2, ..... f_2^l$ and this procedure is quite the same as in the ordinary frequency division multiplex system. The band width of each channel or frequency division can be different between each other and decided by the type of the information to be transmitted through the channel (necessary band width to carry for instance in the case of telephone, 3000 c.p.s.; for telegram of 50 band, 120 c.p.s. through the satellite). But in this case $f_1^i$ and $f_2^i$ should have the same width. (1  $i$  $l$). The time division multiplex method in the conventional practice can also be applied in this case. This method is especially effective when the information to be transmitted is of digital type. In the present case, the ($l-1$)th frequency division of the frequency band is split into $m$ time slots: ${}_1t^1$, ${}_2t^1$, ${}_mt^1$ having the frame period $T^1$, and the $l$th division is split into n time slots: ${}_1t^2$, ${}_2t^2$, ..... ${}_nt^2$ having the frame period $T^2$.

Again referring to FIGS. 2 and 3, the control information from the originating data terminal 217 is fed through the first modulator-demodulator 218, transmitter-receiver 222, antenna 223 and sent out to the space track 202. The informations are thereafter relayed back through the antenna 362 and the transponder 361 of the satellite 351 into the space track 302 and received by the antenna 311, transmitter-receiver 312 of the central control station 301. The received information in the central control station is then demodulated by the modulator-demodulator 313 and fed to the control data transmission terminal unit (called central station data terminal) 314. The central station data terminal 314 is a similar apparatus as the originating data terminal 217 and here existence of errors are examined utilizing the redundant digits. When errors are found the central station data terminal 314 sends out a control information including repetition demanding signal through a predetermined path for sending control signals from the data terminal 314 to the data terminal 217 of the sending end. If no errors are found, the data terminal 314 removes the redundant digits and the resultant "request for channel assignment" are sent to the central control unit 315. The central control unit 315 is an ordinary type of data processor unit and connected with a temporary memory unit 316. The temporary memory unit 316 is also an ordinary type of large capacity memory unit such as a magnetic core memory and stores programs to control the operations of the central control unit 315 as in the case of digital computor controlled by its own stored programs. The central control unit 315 reads out these stored programs and performs the data processing operation as hereafter described. In the temporary memory unit, there are also stored informations about the conditions of all of all of the channels (the number of which in this instance is $l+m+n-2$), busy or idle, assigned stations of these channels, station numbers and trunk numbers of both originating and terminating side, progress of controls of the communications, tariff informations and also kinds of calls and about the conditions such as idle or busy of all of the incoming and outgoing trunks in each of the earth stations. These memories are stored in the addresses corresponding to the serial numbers given to these channels and trunks. Upon receipt of the "request for channel assignment" from the central data terminal 314, the central station control unit 315 translates the information and find out the type of the channel to be allocated to the call (in this instance 3000 c.p.s. bandwidth telephone channels) and successively reading out the addresses for this type of channels in the temporary memory unit 316 finds out two idle channels, and also judging the earth station (terminating earth station) and its associated gateway station (terminating gateway station) by which the call is exchanged from the numerical information about the called subscriber contained in the "request for channel assignment" finds out an idle outgoing trunk in the judged earth station within the stored memories in the temporary memory unit 316 by way of the same method utilized in finding above described channels. During the time, number of the digits of the numerical information required to establish the call line leading to the called subscriber at the terminating gateway station is decided—delete control—(for instance, when the called subscriber locates in the same country as the terminating gateway station, the international code is not required at the terminating gateway station. Necessary informations to judge this matter is memorized beforehand). Then the information about the selected channels, the memories about the condition of the outgoing repeater, namely, whether idle or bush and the combination status between the channels and the incoming and outgoing trunks, all in the temporary memory unit 316 are suitably rewritten.

Figure 4:
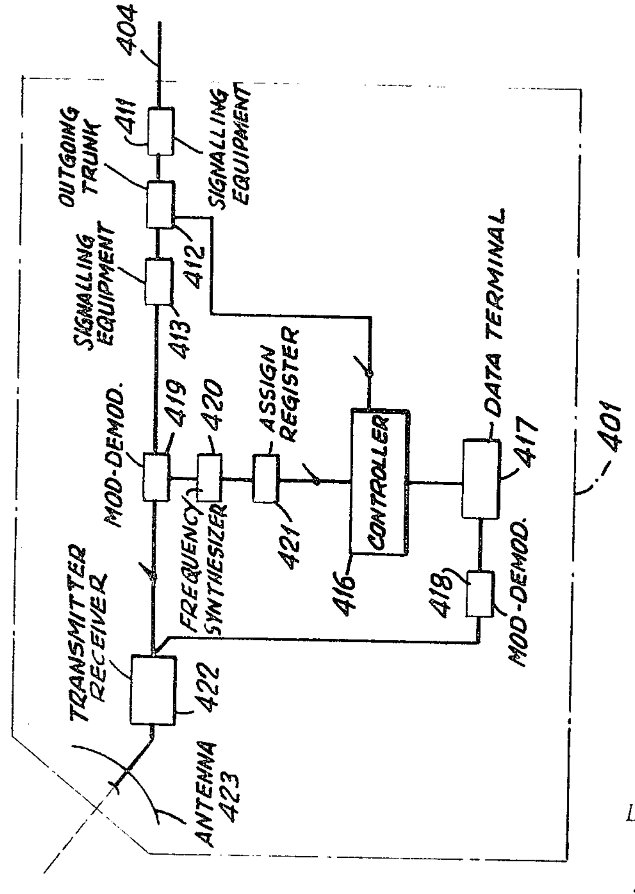

Referring now to FIGS. 2, 3 and 4, the central control station unit 315 arranges the number of the two channels ($f^i$ and $f^j$), the required digits of numerical informations to be sent to the terminating gateway station and also the equipment serial number of the incoming trunk which was received previously, together with the "request for channel assignment" in a predetermined information format (hereinafter channel assignment to the originating earth station). This information is as above described for "request for channel assignment" sent out in a channel assigned for this purpose within the space track 302 through the central station data terminal 314, modulator-demodulator 313, transmitter-receiver 312 and the antenna 311. Then the information travels through the stationary satellite 351 and the space track 202 in a channel assigned for this purpose, and arrives at the antenna 223 of the terminating earth station 201 and fed through the transmitter-receiver 222, the first modulator-demodulator 218 and the data terminal 217 to the controller 216. The controller 216 translating the arrived "channel assignment to the originating station" identifies the incoming trunk 212 and actuates the trunk 212 so that a seizure signal is issued from the second signalling equipment 213 through the connected control line, and at the same time, gives the register 215 connected to the incoming trunk 212 the number of digits to be sent to the terminating gateway station, and also gives the channel assignment register 221 corresponding to the incoming trunk 212 the assigned channel number (in this case, $i$ and $j$) and memorizes them in the circuit. The channel assignment register 221 can be realized from ordinary relays or flip-flop circuits, and from the stored memories within this circuit 221, the frequency synthesizer 220 connected with this register 221 is controlled. The frequency synthesizer 220 comprises a plurality of oscillators of different frequencies, one or more of the frequency mixers and a plurality of switches interconnecting these components in a manner as directed by the channel assignment register 221, whereby any one of the numerous kind of frequencies provided by the various combinations of these components can be obtained at the output. Therefore, together with the second modulator-demodulator 219, variable frequency transmitter-receiver circuits having variable frequency local oscillators can be constituted. Thus, a seizure signal issued from the second signalling equipment 213 modulates the carrier wave $f_2^i$ through the second modulator-demodulator 219 and the resultant wave is sent out through the transmitter-receiver 222, the antenna 223, the space track 202 and to the satellite 351 where the carrier wave frequency is changed to $f_1^i$ and again transmitted to the earth station 401 (hereinafter terminating earth station) through the space track 352.

Figure 13:
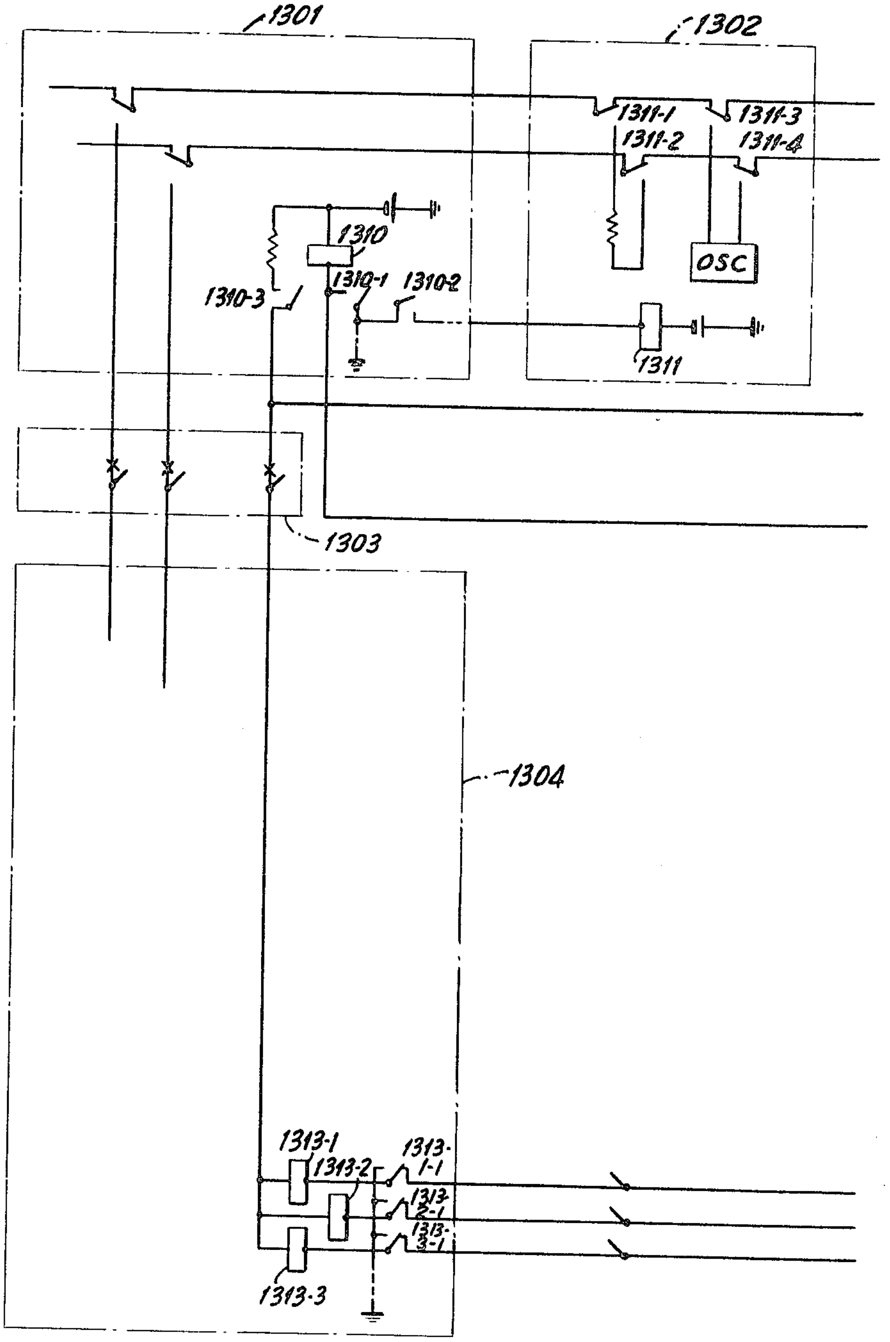
Figure 14:
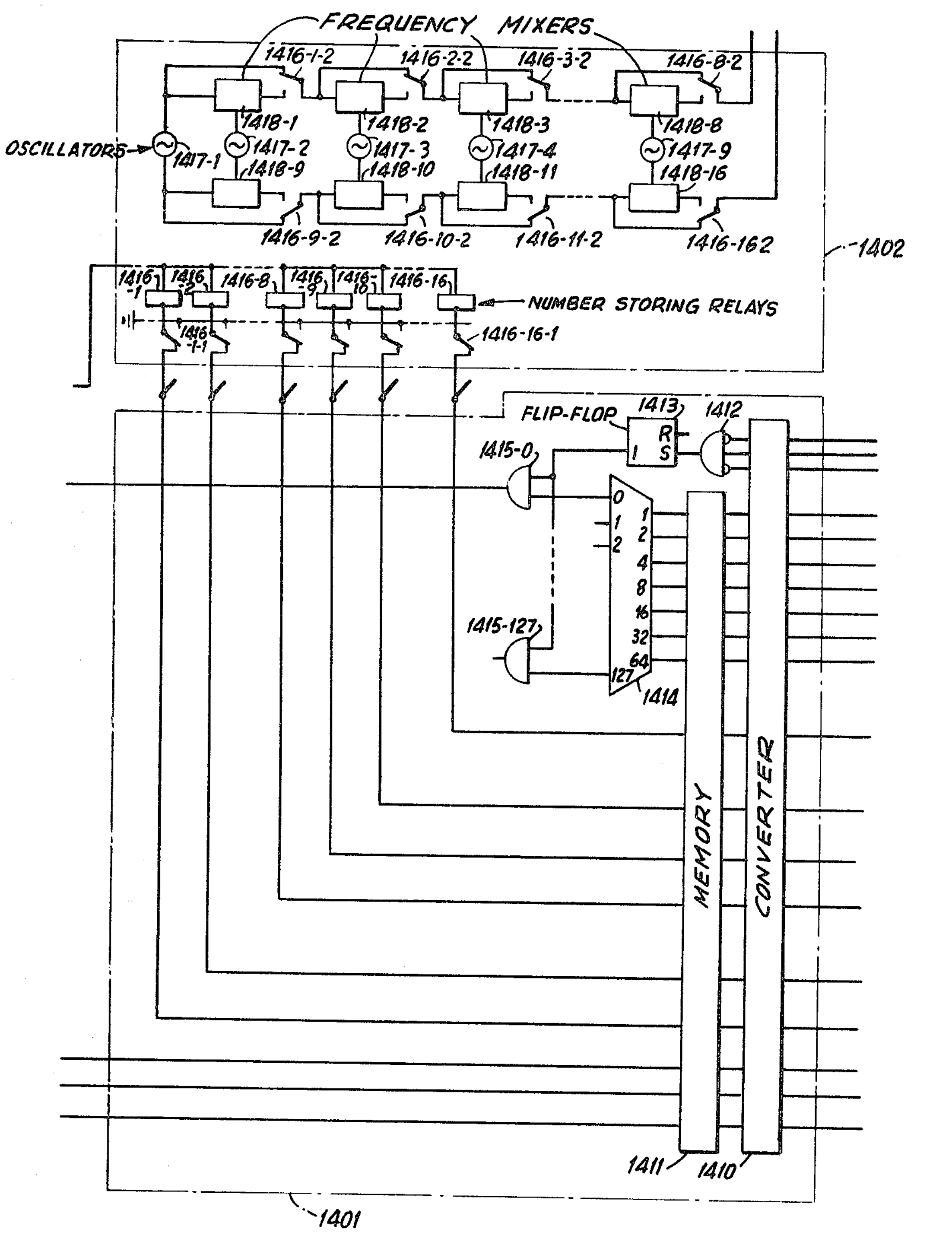

Referring to FIGS. 13 and 14, together with FIG. 2, the detailed internal circuits of those components and their interrelations particular to this invention are illustrated in those FIGS. where the unit 1301 corresponds to the incoming trunk 212, where unit 1302 corresponds to the second signalling equipment 213, where register link 1303 is equivalent with the register link 214, where unit 1204 is equivalent to the register unit 215, where unit 1401 is equal to the controller 216, and where unit 1402 is equal to both of the channel assignment register 221 and the frequency synthesizer 220. In FIG. 14, the channel assignment register 221 shown in FIG. 2 is included in the frequency synthesizer 1402 for the purpose of simplification of the drawing. The "channel assignment to the originating station" fed to the controller 1401 from the originating earth station data terminal 217 is transferred into a suitable signal level in a conversion circuit 1410 and stored in the memory circuit 1411. A coding signal indicating the channel assignment (in this case, indicated by "010") provides an output "1" at the output terminal of AND gate 1412 which acts as a discriminator and operates the flip-flop 1413. The number for the trunk included in the "channel assignment to the originating station" is converted to the signal "1" of the corresponding terminal of the decoding circuit 1414, which operates one of the output gates 1415 also corresponding to this number (in this instance 1415-0) and actuates the relay 1310 included in the incoming trunk 1301 connected with this output gate 1415-0. The relay 1310 is self-held through its own contact 1310-1 and the closing of other contact 1310-2 operates relay 1311 in the second signalling equipment 1302. The contacts 1311-1 through 1311-4 of the relay 1311 actuate oscillator 1312, which send out seizure signal to the next switching point. Another contact 1310-3 of the relay 1310 in the incoming trunk 1301 furnishes power to the channel number storing relay 1416-1 through 1416-16 (in this example, the number of channels is 256) and also power is fed to the delete control reception relays from 1313-1 to 1313-3 in the register 1304 unit through the register link 1303. Thus the number of the two channels and the assignment of digits number of the numerical information both included in the channel assignment and given from the control unit are received in these relays 1313-1 through 1313-3 and also 1416-1 through 1416-16, and these relays are self-held by their own contacts 1313-1-1 through 1313-3-1 and 1416-1-1 through 1416-16-1. The oscillators 1417-1 through 1417-9 in the frequency synthesizer 1402 and the frequency mixer circuits 1418-1 through 1418-16 are connected and combined, as indicated, through the contacts 1416-1-2 through 1416-16-2 of the channel number storing relay 1416-1 through 1416-16 and generate carrier frequencies obtained from any combination of frequencies of these oscillators 1417.

Returning to FIGS. 2, 3 and 4, the central control unit 315 arranges the numbers of the two channels and the number of the outgoing trunk in the terminating earth station in a predetermined manner similar to those described before (hereinafter channel assignment to the terminating earth station), and thus arranged information is sent through the preassigned channel for transmission of control informations to the antenna 423 of the terminating earth station 401, its transmitter-receiver unit 422, the first modulator-demodulator unit 418, the control data terminal equipment (hereinafter terminating data terminal) 417 and to the controller 416. The controller 416 selects the assigned outgoing trunk 412 and connects the second modulator-demodulator unit 419 connected with the outgoing trunk 412 to the interoffice trunk line 404, at the same time giving the assigned channel number to the channel assignment register 421 through the assigned outgoing trunk. Consequently, the seizure signal emitted from the originating earth station 201 is received by the antenna 423 and the transmitter-receiver 422 of the terminating earth station 401 and the carrier frequency $f_1^i$ is removed through the second modulator-demodulator unit 419 and the frequency synthesizer 420. The resultant seizure signal is detected by the second signalling equipment 413 but also sent out through the outgoing trunk 412 to the interoffice trunk line 404.

Figure 5:
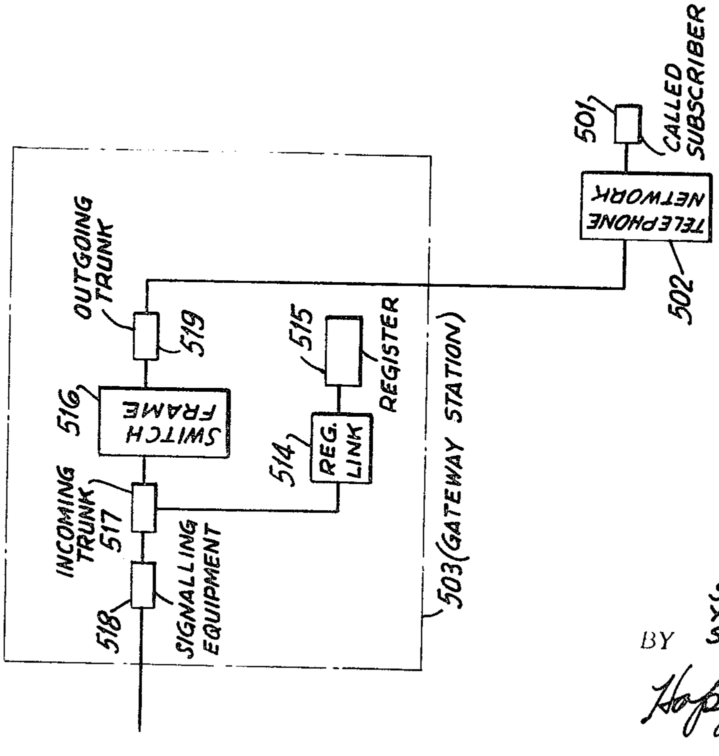

Referring now to FIGS. 2 and 4, together with FIGS. 5 and 1, the seizure signal generated from the second signalling equipment 213 in the originating earth station 201 and now sent out on the interoffice trunk line 404 between the terminating earth station 401 and the terminating gateway station 503, is detected by the signalling equipment 518 in the terminating gateway station 503 and activates incoming trunk 517. The incoming trunk 517 seizes an idle register 515 connected through the register link 514 and after the completion of seizing the register, operates the signalling equipment 518 and sends out "proceed-to-send" signal. This "proceed-to-send" signal is sent back to the terminating earth station 401 through the interoffice trunk line 404 and although it is detected by the first signalling equipment 411, it is also sent through the outgoing trunk, and at the second modulator-demodulator unit 419 the carrier frequency $f_2^i$ is modulated by the "proceed-to-send" signal from the outgoing trunk, the resultant modulated signal being sent out through the transmitter-receiver unit 422, antenna 423, space track 352 to the satellite 351. The satellite changes the carrier frequency from $f_2^j$ to $f_1^j$ which is received by the originating earth station 201, demodulated by the second modulator-demodulator 219 and detected by the second signalling equipment 213.

Summarizing the above descriptions, the telephone exchange system according to this invention has provided a four-wire speech path between the incoming trunk 212 in the originating earth station 201 and the incoming trunk 517 of the terminating gateway station 503 on demand. Thus when the second signalling equipment 213 in the originating earth station 201 receives the "proceed-to-send" signal from the terminating gateway station 503, the second signalling equipment 213 controls the register 215 through the register link 214 so that the register 215 sends out already stored numerical information about the called subscriber to the register 515 in the terminating gateway station 503 through said speech paths and then resets itself. In the terminating gateway station 503, according to the ordinary practices of the telephone exchange system, the incoming trunk 517 is connected through the switch frame 516 with the outgoing trunk 519 which in turn is connected with the called subscriber 501 through the domestic telephone network 502 of the terminating country. When the called subscriber 501 is being rung up and answers, the response is fed back through the domestic telephone network 502 and detected by the incoming trunk 517 in the terminating gateway station 503. The signalling equipment 518 sends back this response through the established speech path to the second signalling equipment 213 in the originating earth station 201 and this in turn sends back the response through the first signalling equipment 211, interoffice trunk line 104, a signalling equipment 118 in the originating gateway station 103, outgoing trunk 117, switch frame 116, incoming trunk 111, position link 112, to the operator position 113 where the answer is indicated to the operator in such a way as lighting of a lamp. At this time, a speech path is established between the operator and the called subscriber, and the operator talking with the called subscriber and confirming the correctness of the connection connects the waiting calling subscriber 101 with this newly established speech path leading to the called subscriber 501 by means of, for instance, activating the talk key. However, these operations are all familiar and conventional in ordinary international telephone exchange services and constitutes no part of this invention. During the progress of these exchanges, the operator in the originating gateway station can send "forward-transfer signal" to request assistance of auxiliary operator in the originating gateway station. These and other operations such as the transmission of the reset signal in the case of the called subscriber hanging up the telephone, are all similar to the ordinary operation of the international telephone services and have no relation to this invention. In other words, the substantial operation of the exchange system according to this invention is to establish a four-wire speech path between the originating and terminating gateway stations by means of operation of various apparatuses in the originating earth station 201 and the terminating earth station 401 under the control of the central control unit 315, and other operations such as to provide on the thus formed speech path any other control informations than those described above between the two gateway stations can easily be realized by ordinary telephone exchange techniques as will later be described.

Again referring to FIG. 1, when the calling subscriber 101 hangs up the telephone, connections in the domestic telephone networks 102 are generally disconnected from the former switching points consecutively, and the incoming trunk 111 in the originating gateway station 103, detecting this disconnection of the former switching positions, urges the operator to release the international circuit by an "OFF" lamp for instance. If the operator expresses her intention, for instance, by the operation of "reset" key, the reset signal is transmitted to the incoming trunk 212 through the incoming trunk 111, outgoing trunk 117 and interoffice trunk line 104. At the same time, the connections between and inside of the apparatuses in the originating gateway station 103 which are established for that call are all disconnected except the outgoing trunk 117 and are prepared for other calls. In this case the clear-forward signal issued on the interoffice trunk line 104 constitutes an input which caused disconnection of the telephone exchange system according to this invention, and the operations from the time the calling subscriber 101 hangs up the telephone until the time the clear-forward signal is issued on the interoffice trunk line 104 are only exemplary, indicating one of the most ordinary cases, and the operation of the telephone exchange system according to this invention is not influenced by any other ordinary practices of the same purpose.

Referring now to FIGS. 1, 2, 3 and 4, the clear-forward signal arriving on the interoffice trunk line 104 is detected by the first signalling equipment 211 in the originating earth station 201 and notified to the incoming trunk 212. The incoming trunk 212 controls the first signalling equipment 211 so that release-guard signal may be sent back continuously and also controls the second signalling equipment 213 to issue clear-forward signal, and then gives one of the control lines connecting the incoming trunk 212 with the controller 216 a predetermined voltage. The controller 216 is always scanning all of these lines and finds out the particular incoming trunk, such as 212, which is demanding to be reset from the position of the line on which the predetermined voltage appears. The controller 216, thus finding the particular incoming trunk demanding to be reset, at first resets the channel assignment register 221 associated with the incoming trunk 212, and resets the assigned channels for this call (in this case, sending out of the carrier wave $f_2$ and reception of $f_1{}^j$ are stopped). Then the control unit 216 commands the incoming trunk 212 to be reset through the control line. The incoming trunk 212 commanding to be reset, at first confirming that the related apparatuses in the originating gateway station 103 are all reset through the cessation of clear-forward signal from the originating gateway station 103, indicates the first signalling equipment 211 to stop sending back of the release-guard signal and then resets itself. The controller 216, after thus commanding to reset the incoming trunk 212, arranges the equipment number of said incoming trunk 212, the station number of the originating earth station, and a discrimination code to indicate that the information is concerned with reset of call, in a predetermined information format (hereinafter called request for channel cancel from the originating earth station), and sends out thus arranged information to the central control unit 315 through the same manner as described in relation to the channel assignment. On the other hand, the clear-forward signal issued by the second signalling equipment 213 in the terminating earth station 201 just before the reset of channel assignment register 221, is detected by the second signalling equipment 413 in the terminating earth station 401. The outgoing trunk 412 in the terminating earth station 401, thus knowing the reset of the former switching points, indicates the first signalling equipment 411 to issue clear-forward signal and at the same time furnishes a predetermined voltage on one of the control lines connecting the trunk 412 to the controller 416. The controller 416 always scanning these lines, finds out the particular outgoing trunk 412 demanding to be reset from the position of the line on which the predetermined voltage appears, and at first resets the channel assignment register 421 associated with the outgoing trunk 412 and resets the assigned channels for this call (in this case, sending out of the carrier wave $f_2{}^j$ and reception of $f_1{}^i$ are stopped), and then commands the outgoing trunk 412 to reset through the control line. The outgoing trunk 412 thus commanded to be reset, stops sending out of clear-forward signal to the next switching point or the terminating gateway station 503. At the same time, the controller 416 arranges a request for channel cancel from the terminating earth station indicating the reset of the earth station 401 in the same manner as described in the reset of the originating earth station and sends this to the central control unit 315. The central controller 315, knowing from both of the requests for channel cancel from the originating and terminating earth stations that the call is reset, erases out memories about the two channels which are written in the temporary store 316, preparing it to be used for other calls. As for the memories about the incoming and outgoing trunks in the originating and terminating earth stations, they are also erased after certain guard timing required for resetting of themselves and of their relays to be used for other calls.

Referring now to FIGS. 4 and 5, the clear-forward signal sent out from the first signalling equipment 411 in the terminating earth station 401 is detected by the signalling equipment unit 518 in the terminating gateway station 503 and the incoming trunk 517, thereby knowing the reset of the former switching points, actuates the signalling equipment 518 to send back release-guard signal continuously and at the same time resets all of the connections inclusive of the switch frame 516, outgoing trunk 519, domestic telephone network 502 in the terminating country leading to the called subscriber 501, and the trunk 517 after knowing of completion of resets of all the apparatuses related to the call in the terminating earth station by the cessation of clear-foward signal which arrives on the interoffice trunk line 404, directs the signalling equipment 518 to stop the release-guard signal and resets itself. These resetting operations herein described within the switching points from the incoming trunk 517 in the terminating gateway stations 503 to the called subscriber 501 are all exemplary and it is clear that any other type of ordinary resetting operations can be utilized without any influence upon the exchange system according to this invention.

Referring now to FIGS. 1 to 5, inclusive, in the case where connection cannot be obtained for some reason in the terminating country, for instance, all of the outgoing trunks 519 in the terminating gateway station 503 are busy, the incoming trunk 517 operates the signalling equipment 518 to send back a busy signal. When the first signalling equipment 411 of the originating earth station 401 detects the busy signal from the gateway station, the outgoing trunk 412 operates the first signalling equipment 411 to send out the clear-forward signal which urges the next switching points to be reset, and at the same time operates the second signalling equipment 413 to send back the busy signal and demands of the controller 416 a reset operation. Operations hereafter are the same as already explained in the case that the call is reset from the originating earth station, hence further explanation will be omitted. In the originating earth station 201, the incoming trunk 212, which has detected the busy signal by the second signalling equipment 213, operates the first signalling equipment 211 to send out the busy signal and demands the controller 216 to reset itself. The operation hereafter is quite the same as explained, in case the call is reset from the originating earth station. The operations in this case in the originating gateway station 103 are quite the same as in the ordinary telephone exchange, and one example of these operations are outlined as follows. When the busy signal is detected by the signalling equipment 118, the outgoing trunk 117 and the switch frame 116 are reset and the incoming trunk 111, knowing that the reset is caused by the busy signal from the next switching point, notifies the operator position 113 of it, for instance, by turning on the indicator lamp. The operator, then, tells the calling subscriber 101 to hang up the telephone and wait until the operator calls back the subscriber 101, and releases the connection. The operator tries the connection again a certain time later.

Referring now to FIGS. 2 and 3, when the central controller 315 finds out in the temporary memory 316 that the speech paths of the kind demanded in the request for channel assignment are all occupied by other calls, or when it is found that the outgoing trunks in the designated terminating earth station are all occupied, the central controller 315 arranges the equipment number of the incoming trunk which is included in the request for channel assignment and a discrimination code indicating that the demanded connections cannot be established, into a predetermined information format and sends back to the controller 216 in the originating earth station 201 through the method described several times for other control information. The controller 216 operates incoming trunk 212 which in turn operates the first signalling equipment 211 and sends back a busy signal. The operations thereafter of the incoming trunk 212 and the related equipments in the originating gateway station and also of the former switching points are quite the same as those already explained with regard to the busy signal.

As is clear from the above explanations, the telephone exchange system of this invention, composed as herein described, including the satellite station, can provide a perfectly symmetrical transit switching network between the international gateway stations, each connected with earth stations according to this invention, and also can provide a communication path between two points widely distributed on the earth surface and connected through respective telephone networks with each of the earth stations located within the visible range from the satellite (in this case, the stationary satellite covers an area of about one-third of the whole surface of the earth). With this invention, the traffic between each of those gateway stations and the amount of calls sent out or received in the gateway stations, are not to be considered from an individual basis, but should be considered from the total sum basis of traffic between all of those gateway stations, considering the local time differences, etc. The equipments, to have enough capacities to cope with the peak traffic, are: the incoming and outgoing trunks leading to the earth stations, the signalling equipment, terminals on the switch frames and the register in the gateway station; comparatively short interoffice trunk lines between the gateway station and the earth stations; the incoming and outgoing trunk, signalling equipment, the modulator-demodulator unit, the channel assignment register, the frequency synthesizer, register in the earth station; and those equipments commonly used, regardless of the traffic, are the controller, control data terminal equipment, transmitter-receiver, antenna, and those common for whole systems, such as the satellite and the central control station. And considering the fact that the equipments and installations used in the gateway stations are all necessary, even in the case where the gateway stations are connected with the submarine cables or the like, it is clear that the telephone exchange system according to this invention can provide much more economical and versatile systems than those which have their gateway stations connected through a mesh-type network or semimesh-type network of costly long distance cables, especially in the case where the required quantity of traffic through a cable is substantially less than the capacity of the cable. Within the total numbers of channels furnished by the satellite, paths other than the control channels which are allocated for transmission of the control information between the equipments in the central control station and the earth stations, are not assigned permanently between the particular two stations, but temporarily assigned for these stations only while calls exist between them. Accordingly, the number of channels to be provided by the satellite does not depend on the total sum of the peak traffic between each earth station (namely the total number of trunks in all of the earth stations), but far less than that, because of irregularities of these speech times and also of the difference of the local standard time for those stations. This means that the channels provided by the satellite are utilized at their maximum efficiency.

In the above description regarding the first embodiment of this invention, it has been explained that one control channel is assigned to each earth station for transmission of the control data between each of earth stations and the central control stations. However, this, of course, can be modified such that a plurality of control channels are assigned to an earth station according to the amount of the traffic. Or, utilizing the same procedure applied to the general speech path in the first embodiment of this invention, the usage factors of the control channels are always surveyed and the assignment of the control channels can be increased or decreased in accordance with the usage factors of the control channels. In the first embodiment of this invention above described, it has been also explained that the central control station is provided separately and independently from the earth stations, but this is only for simplification of the explanation and it is also possible to build the central control station in the same building of the largest earth station, and by doing so, the economy of the whole system can be obtained.

Figure 7:
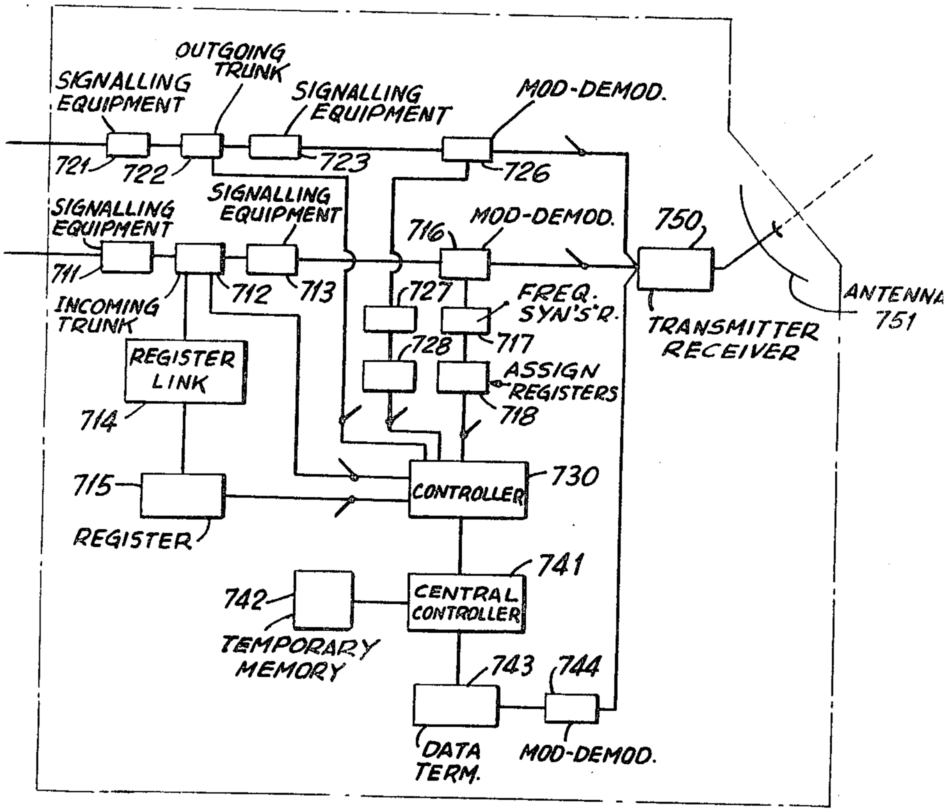
FIG. 7 is a block diagram of the embodiment where the central control station and one of the earth stations is unified.

Referring to FIG. 7, there is shown a block diagram illustrating the connection of the equipments in the embodiment where the central control station is constructed in the same building as an earth station. In the FIG., the unified station is composed of the first signalling equipment 711, the incoming trunk 712, the second signalling equipment 713, the register link 714, register 715, modulator-demodulator 716, the frequency synthesizer 717, the channel assignment register 718, all for the incoming trunk 712 of the earth station, and the first signalling equipment 721, the second signalling equipment 723, the modulator-demodulator 726, the frequency synthesizer 727, the channel assignment register 728, all for the outgoing trunk 722 of the earth station, and also the controller 730 for the earth station. The unified station is also composed of the equipments belonging to the control station such as the central controller 741, the temporary memory 742, the control data terminal equipment 743, the modulator-demodulator unit 744, the transmitter-receiver unit 750, and the antenna unit 751, the last two units being commonly used for the earth station and the control station, and the controller 730 of the earth station is directly connected (without utilizing the control channel) to the central controller 741, thus enabling simplification and economization of the equipments.

Referring to FIGS. 2, 3, 4 and 7, although the receiving information connecting equipments in the originating earth station 201 and also the sending information connecting equipments in the terminating earth station 401 are not indicated in those FIGS. for simplifying the explanation, the functions of those equipments and their interrelations with other equipments will be readily understood.

In the first embodiment of this invention, for the purpose of generalization, the gateway station and the earth station constituting a part of the exchange system according to this invention are indicated as locating in different places and being connected through an interoffice trunk line having respective trunk units at both ends of the line. However, it is clear that these two stations also can be consolidated into one and built in the place and the economization by thus unifying the gateway station and the earth station can be realized and the time spent for the exchange and connection can be reduced.

Figures 8, 10:
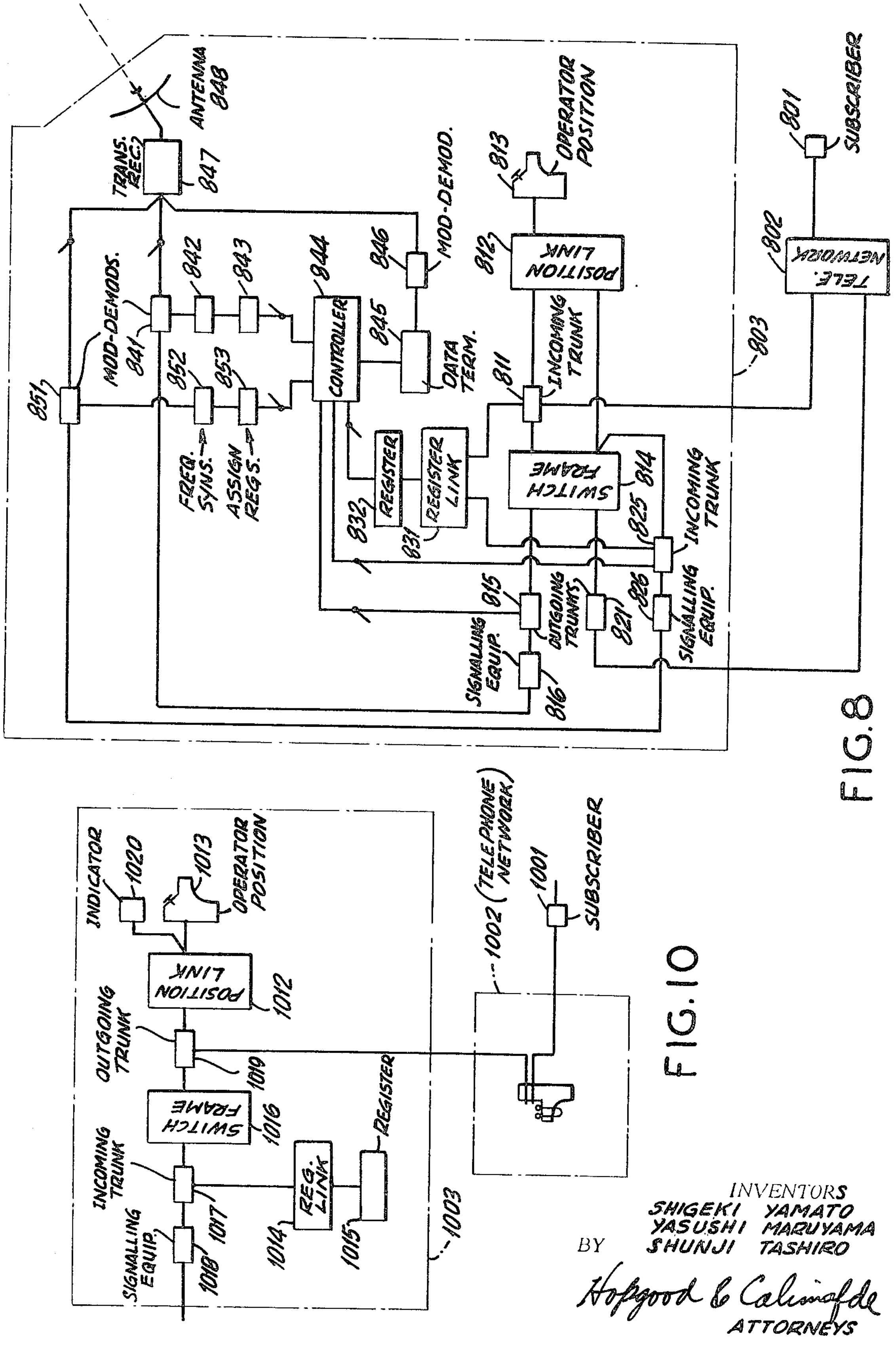
FIG. 8 is a block diagram illustrating a gateway station unified with one of the earth stations.
FIG. 10 is a block diagram of a gateway station where the separate signalling channels of FIG. 9 are utilized.

Referring to FIG. 8, there is shown a block diagram of the first embodiment according to this invention wherein the gateway station and the earth station are unified. The unified station includes the incoming trunk 811 which is connected with the calling subscriber 801 through the domestic telephone network 802, the position link 812, the operator position 813, switch frame 814, the international line outgoing trunk 815, the outgoing trunk signalling equipment 816, the domestic line outgoing trunk 821, which is used for calling up subscriber 801 through the national telephone network 802, the international line incoming trunk 825 and the incoming trunk signalling equipment 826, all inherent to the gateway station, and the outgoing trunk modulator-demodulator 841, the outgoing trunk frequency synthesizer 842, the outgoing trunk channel assignment register 843, the controller 844, the control data terminal equipment 845, the control data modulator-demodulator 846, the transmitter-receiver 847, the antenna 848, the incoming trunk modulator-demodulator 851, incoming trunk frequency synthesizer 852, incoming trunk channel assignment register 853 which are all inherent to the earth station, and also the register link 831, the register 832 which are common to the gateway station and the earth station as explained before. With the unification, the time necessary for transportation of information between the two registers in the gateway station and the earth station, and also the time for sending and receiving supervision signals such as the seizure signal between the two signalling equipments in both stations will be totally eliminated and the connection between the two stations will be much faster.

There are many methods to communicate necessary information between the two exchanges before the connection between them can be established, and in the telephone technique, these methods are generally called signalling systems. In the field of international telephone art, there are several kinds of signalling systems. The purpose of this telephone switching system, according to this invention is to provide an exchange network between the international gateway stations, and signals are communicated between the originating and terminating gateway stations to establish the call line and to reset it upon the completion of the conversations, and signals are also communicated between the exchanging stations constituting the national telephone networks in the originating and terminating countries respectively through the communication paths provided by the exchange or switching system according to this invention. The utilized signals are different by the types and systems in the national networks of concerned countries. However, regardless of the variation in the signalling systems, it is obvious that the signal current can be generated, transmitted and received according to the telephone art in the individual countries through this exchange system, and the controller in this exchange system being aware of the origination and completion of the calls through the opening and closing of the relays also can control the sendout time, the combination and the sequence of the signals through a procedure such as giving earth potential to each pilot line via the relay contacts. In other words, it is obvious that a telephone exchange or switching system in accordance with this invention can be connected with various national telephone networks which utilize their own signalling systems.

In the first embodiment of this invention, one of the typical signalling systems has been explained. But, now to explain the signalling systems in more detail, another example of the signalling system which is also widely used in the internal telephone exchange will be explained. Whenever the register 115 in the originating gateway station receives and stores enough numerical signals about the receiving subscriber from the former switching points to decide that the call should be connected through the telephone or switching system according to this invention, the register 115 starts to select an idle outgoing trunk 117 leading to the corresponding earth station, while continuing to receive further information, and sends out a seizure signal on the interoffice trunk line 104 connected with the idle outgoing trunk 117. The seizure signal actuates an incoming trunk 212 in the earth station 201 to seize and connect idle register 215. After the seizure, the incoming trunk 212 sends back "proceed-to-send" signal on the interoffice trunk line 104. The "proceed-to-send" signal stops sending out of seizure signal from the outgoing trunk 117 in the gateway station. The stop of the seizure signal from the gateway station in turn stops sending back of "proceed-to-send" signal from the incoming trunk 212, and connects the register 215 to the speech path. The stop of the "proceed-to-send" signal starts sending out of the first digit of the numerical signal about the called subscriber from the register 115 in the gateway station. When the first digit of the numerical signal is received and stored in the register 215 in the earth station, "send-next-digit" signal is sent back from the register 215. The "send-next-digit" is sent back from the register 215. The "send-next-digit" signal received in the gateway station stops sending of the first digit from the register 115. The stop of sending of the first digit stops sending back of the "send-next-digit" signal from the register 215 in the earth station. The stop of the "send-next-digit" signal in turn starts to send out the next digit from the register 115 in the gateway station. Repeating these procedures, the numerical signal about the called subscriber is completely transferred from register 115 in the gateway station to the register 215 in the originating earth station. The register 115 which has finished the transferring of all of the numerical signals does not yet reset itself. During these operations, when the register 215 of the earth station receives and stores enough signals to select a terminating earth station, the register 215, while continuing to receive further information, sends out a request for channel assignment to the central controller 315 as explained in detail in the first embodiment of this invention. When the channel number is assigned, a seizure signal is sent out through the assigned channel to seize an idle register 515 in the terminating gateway station 503. When the idle register 515 is seized, the "proceed-to-send" signal is sent back from the gateway station. The originating earth station, upon receiving the "-proceed-to-send" signal from the terminating gateway station 503, stops the seizure signal and the received and stored numerical information until that time is sent out continuously in accordance with the "digit assignment" made by the central controller 315. The register does not reset its operation even after sending out of all the information stored in it, and some other numerical signal which might arrive later from the former switching positions will also be sent to the next switching points, and if "send-next-digit" signal arrives from the next switching points, this also will be transferred to the former switching points. When the register 515 in the terminating gateway station 503 receives and stores enough information to select the next exchange in the national telephone networks, an idle trunk leading to the selected exchange is found out and actuated, in turn selecting and actuating an idle register in the exchange. Here again the first digit of the numerical signal to select the next exchange is sent out, and upon receipt of "send-next-digit" signals, the following digits will be in turn sent out. By these procedures, when the end office to which the called subscriber 501 belongs receives enough numerical signal to find out the called subscriber 501, the number-received signal is sent back to the terminating gateway station. The register 515 at the terminating gateway station 503, upon receiving the number-received signal, stops sending of the numerical signal and starts to send back the number-received signal to the former switching position for a predetermined time period, and after having the speech path established by the incoming trunk 517, the register 515 resets itself. The register 215 in the originating earth station 201, upon receiving the number received signal from the terminating gateway station, relays this signal to the former switching positions and after having the speech path established by the trunk 212, the register 215 resets itself. The originating gateway station 103, upon receiving the number-received signal, sends out category-of-caller signal. When this signal is received at the end office to which the called subscriber belongs, state-of-called-subscriber signals (indicating conditions such as idle, busy or dead line) are sent back to the originating station. The register 115 in the originating gateway station 103, according to the state signals whether the originator of the call is an operator of international switchboard or a subscriber, and according to the state-of-called-subscriber controls the incoming trunk 111 to indicate the state on the operator position 113 by the indicator lamps, or controls the outgoing trunk 117 so that, for instance, audible ringing tones may be sent to the calling subscriber 101, or connects the incoming trunk 111 to a special talkie or service tone circuit to notify the calling subscriber 101 that the connection cannot be made and the reasons therefor. In the last case, the register 115, after resetting all of the international communication circuits following the outgoing trunk 117, resets itself. If the called subscriber 501 responds to the call, the operation thereafter until the completion of the call is as described for the first embodiment of this invention.

In this instance, when a plurality of signalling systems are employed by the national telephone network connected to the telephone switching system of this invention, the register in an earth station may be so arranged that the sending of the signals to and receipt from the next switching position or the terminating gateway station can be effected by any one of said signalling systems, and also the central controller can be so arranged that the central controller has stored previously the whole kinds of the signalling systems and can designate one signalling system in the request for channel assignment to the originating earth station in order to send the signals to and receive the signals from the next switching position. Therefore, with the above arrangements, the telephone switching system can be realized. Or, in the earth station, the register can be provided with outgoing trunks to transfer received signals into other kinds of signals utilized in the terminating gateway networks. Thus, it is clear that the telephone exchange or switching system according to this invention can be composed by well-known techniques in the telephone exchange systems. So that it is adaptable to any of the national networks utilizing any kind of signalling systems.

In the first embodiment of this invention, it has been described that the central controller 315, upon receiving the request for channel assignment from an earth station, examines the using status of the channels which can be allocated for requisition, in the temporary memory unit 316, and if the results of the examination indicate that the channels of the kind which can be allocated for the requisition are all occupied by other calls, the central controller 315 immediately sends back a predetermined control data including a signal or code which indicates that the request cannot be complied, and the earth station receiving this data in turn sends back signals to the operator's desk to require the calling subscriber to give up the call, namely explained as constituting a loss system which is a common practice in the field of telephone exchange technique.

However, the telephone exchange technique also indicates that the channels provided cannot be utilized at their maximum efficiency in this loss system, and if the maximum utilization thereof is required, overloading will occur in the "-common control equipment" such as the registers, the controllers, the central controller and the control data transmission lines, along with the repetition of trial calls by the operator or the calling subscriber. If it is desired that the channels provided by the satellite must carry a larger number of traffics more than those obtained by the above described loss system, the telephone exchange system according to this invention can also be arranged in such a way that the more effective utilization of the channels can be realized without accompanying overwork of the operator (in these cases fully automatic dialing system is not generally used). In other words, it can be so arranged that a request for channel assignment which can not have been assigned to a channel because the whole channels are being used is stored in the temporary memory 316 in order of arrival by means of the central controller 315, and the central controller 315, whenever it knows that undergoing call is finished, picks up the first-arrived request for channel assignment from the temporary memory 316 and assigns this to said just-finished channel, while simultaneously revising the memory stored in the temporary memory 316 in order to meet a new condition. By these procedures, the request for channel assignment in excess are always stored in the temporary memory 316 when the traffic exceeds and the communication channels provided by this invention can be utilized continuously. But in this case the time required for connection of calls, for instance from the time the operator originates the call by dialing to the time the connection is made, is much longer than those in the ordinary telephone exchange, hence making it necessary to provide some counter-measures to eliminate fears on the operator side concerning the progress of the connection, and to protect the operator to give up or repeat the same call. This can be done by notifying the operator of the estimated waiting time required for connection. In other words, the central controller 315 memorizing the maximum number of calls N which can be utilized through this telephone exchange system at one time and also the average holding time, periodically scans predetermined addresses in the temporary memory 316 and finds out the number of waiting calls Q. The central control 315 thereafter calculates the expected waiting time W from the equation $$W=Q.H/N$$

and transmits this waiting time W to the controller in the concerned earth station together with the common control data. From the concerned earth station to the operator position in the gateway station, there is provided a data transmission circuit, and a visible indicator such as a number indicating tube is also provided on the operator position, and the controller in the earth station relaying this information sent from the central control station, indicates it on the operator position so that the operator may be informed. There will also be another case where calls are concentrated in some specific earth stations, occupying all of the outgoing trunks in that station and rendering further connection impossible despite the fact that the channels between the earth stations are not fully occupied. In this case too, the connection through above described procedure to memorize waiting calls can be applied, and the information about the conditions of those trunks showing that all of the trunks are occupied or not, in cooperation with the indicator lamps on the operator position in the gateway station indicating busy or idle conditions of all of the outgoing trunks, can accomplish the same function as described above. If the central controller 315, receiving the request for channel assignment, finds out that all of the channels and also the outgoing trunks in the terminating earth station are occupied, and when trying to store the request in the temporary memory 316, finds out the addresses in the memory are also all occupied, the central controller 316 recommends the operator to give up the call in the same manner described in connection with the first embodiment of this invention. For these purposes, the earth station must receive information about the waiting period and state of the outgoing trunks whether they are busy or idle, considerably frequently for instance every one second so that the operator may be notified of this information all the time. If this information is transmitted in the control data channels assigned between the earth station and the control station, in the same way as other control data, they would occupy considerable amount of channels. But, considering the fact that the data are the same for all of the earth stations, one control information channel can be assigned for this purpose, and by so arranging that the information about these states can be received by all of the earth stations, the economy of the channel can be obtained.

In the first embodiment of this invention, the method has been described wherein the interconnections are consecutively made by extending successively the speech path from a certain switching point to other switching point and the information or signal necessary for said other switching point in order to select the next switching point is transmitted through said speech path. The main purpose of this method is to shorten its required period for connection and improve services for the subscribers. However, this can be done successfully in the case that the domestic telephone lines between the terminating gateway station and subscribers are composed of an automatic exchange system, and the connections are completed by only the international exchange operator in the originating gateway station or the calling subscriber himself. On the other hand, if there exists some manual switchboards in the terminating national lines, the connection period can not be shortened and the procedure as described in which the speech paths are successively connected from the former switching points can not be effective, and the speech path which has been obtained is held wastefully, while the connection in the next switching points are in progress. Although such seized speech path can be used for signal transmission, the wide band transmission path is too good for the transmission of the control information which is ranging only from one to several hundred bits at the maximum. Since the initial construction cost and the maintenance cost of the international communication line is much higher than those of the national network, if some measures are provided to use this high-cost international communication lines only for the speech path, even though the time required for the connection be a little elongated, it would be much effective in economization of the high cost international communication lines, and the telephone exchange system according to this invention can accomplish the above objects. In other words, this can be accomplished in the exchange system according to this invention, by providing a separate control information channel other than the speech path between each earth station and the central control station, and communicating the control information for connection of the originating and the terminating earth stations through these control information channels.

Figure 9:
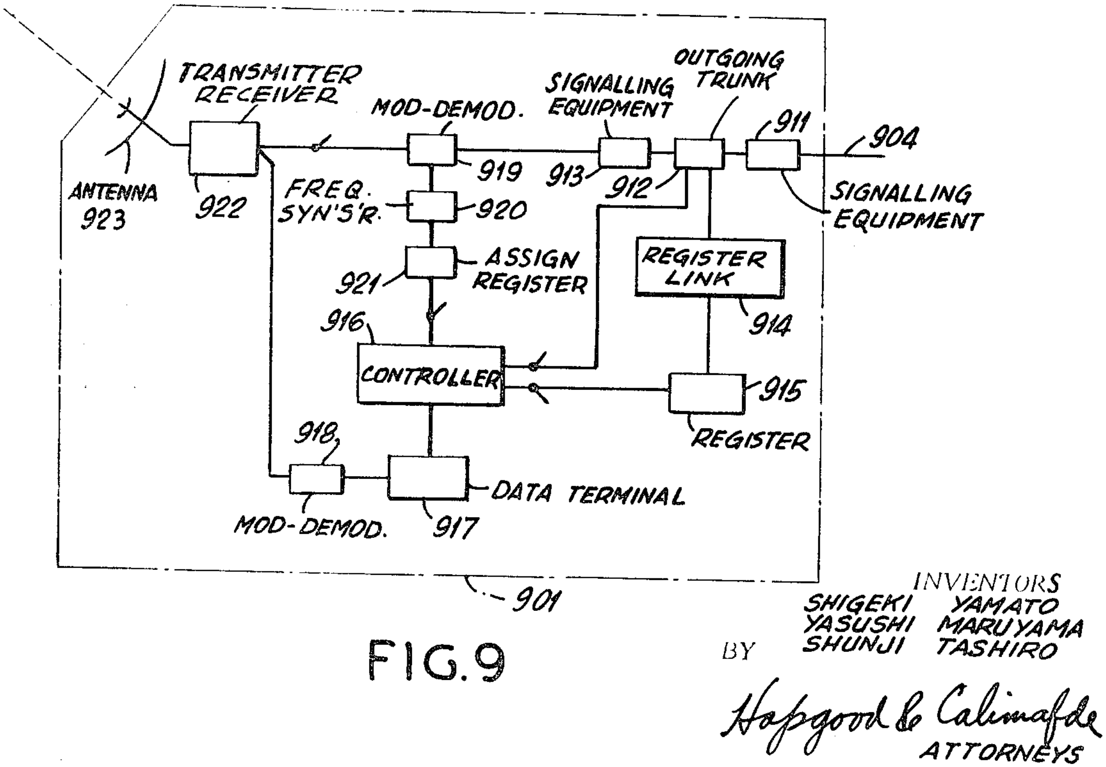
FIG. 9 is a block diagram of an earth station where separate signalling channels are utilized to transfer signals to control the national network.

Referring to FIG. 9, there is shown a block diagram of an earth station constituting a part of telephone switching system according to this invention, where the separate control information channels are provided to establish the speech paths, and in the FIG., other equipment which is not used for the connection of the call lines is omitted. The equipment is so arranged that the outgoing trunk 912 is connected with an idle register 915 through the register link 914 by command of the controller 916, and the register 915 actuated from the outgoing trunk 912 receives the numerical signal to select the called subscriber through an internal line between the controller 916 and the register 915.

Referring to FIG. 4, besides FIG. 9, the units 911, 917, 918, 919, 920, 921, 922 and 923 in FIG. 9 correspond respectively to the first signalling equipment 411, the control data terminal equipment 417, the first modulator-demodulator 418, the second modulator-demodulator 419, the frequency synthesizer 420, the channel assignment register 421, the transmitter-receiver 422 and the antenna 423, all contained in FIG. 4, and the operations and the functions of these corresponding apparatus are completely the same.

Referring to FIG. 10, a typical block diagram of a gateway station and the national networks which are to be connected with the earth station constituting one part of the telephone exchange system according to this invention, and where the connection of the communication lines are accomplished by the connection control informations transmitted through the separate control channel are indicated. In the FIG., those parts which have no relation with receiving calls are omitted, while those apparatus utilized in the gateway station for connecting the communication lines through said control information transmitted in the separate control channels are clearly indicated.

Referring to FIGS. 1, 2, 3, 9 and 10, putting together in the order being described, whole telephone switching systems according to this invention, especially where the connections are accomplished by the connection control informations transmitted through the separate control information channels are illustrated for explanation of the structure and the operation thereof. The first part of the operation from the time the calling subscriber 101 originates the call, connected to the originating earth station 201 through the originating national network 102 and the originating gateway station 103, and until the time the request for channel assignment is sent to the central controller 315 through the operation of the controller 216 in the earth station, are the same as described in the first embodiment of this invention. The central controller 315 knowing from the international number included in the request for channel assignment that the terminating earth station 901 and the terminating gateway station 1003 where the call is connected are so composed that they are connectable through the control information channels, memorizes, in the addresses provided for this purpose of the temporary memory 316, the number of the originating earth station and the equipment serial number of the incoming trunk in the earth station where the demand is originated, both of these numbers having been contained in the request for channel assignment, and then sends back to the originating earth station 201, through the control information channel, a signal including the number of the originated incoming trunk and a predetermined code indicating that the signal is for requisition of further information about the national telephone number of the called subscriber, said number and code being arranged in a predetermined order. The controller 216 in the originating earth station 201 after judging the contents of the sent-back control data and knowing that the signal is a request for the terminating numerical signal, commands the originating incoming trunk 212 to send back an audible signal to acknowledge that the connection is in progress, and also controls the incoming trunk 212 and the connected register 215 to receive the full digits of the terminating international number out of the received terminating numerical signal stored in the register 215 as the same manner described in connection with the reception of the terminating international number and to send this to the central controller 315 after fixing a code which identifies that this is the terminating subscriber's number. The central controller 315, upon receiving the international telephone number, scans the stored memories in the temporary memory 316, and finds out an idle outgoing trunk belonging to the terminating earth station 901, and arranging the number of the outgoing trunk, the terminating numerical signal just received and an additional discrimination code meaning that this is the "reception assignment" in a predetermined format, sends the resultant numerical signal to the terminating earth station 901. The controller 916 in the terminating earth station 901, discriminating that the arrived signal is the "reception assignment," controls the assigned outgoing trunk 912 and connects the outgoing trunk to an idle register 915 through the register link 914. The register 915, when seized by the outgoing trunk 912, receives and stores the terminating numerical signal from the controller 916 through an information line connected between the register 915 and the control unit 916. The outgoing trunk 912 actuates the signalling equipment 1018 in the terminating gateway station 1003 through the interoffice trunk line 904 to operate the incoming trunk 1017 so that the trunk 1017 is connected with a register 1015 through the register link 1014, and the terminating numerical signal stored in the register 915 is transferred and stored in the register 1015. The register 915 is thereafter reset. At the terminating gateway station, judging from the numerical signal stored in the register 1015, an outgoing trunk 1019 leading to the national telephone network 1002, through which the called subscriber 1001 is to be exchanged, is selected and connected with said incoming trunk 1017 through the switch frame 1016 and at the same time both of these trunks are also connected with the operator position 1013 through the position link 1012. The register 1015 then sends out the stored numerical signal to an indicator circuit 1020 through the register link 1014, incoming trunk 1017, switch frame 1016, the outgoing trunk 1019 and the position link 1012, and thereafter the register 1015 is caused to reset itself. The indicator circuit 1020 may be provided corresponding to the operator position 1013, and stores and indicates in a visible form the numerical signal sent from the register 1015. This can be easily realized by, for instance, receiving and storing relays and indicating counter tubes. The terminating operator 1013, knowing the called subscriber from the indicator circuit 1020, connects through the conventional telephone exchange system in the national telephone network 1002 with the called subscriber 1001, and then for instance by operation of key switches, controls the incoming trunk 1017 through the position link 1012, outgoing trunk 1019, switch frame 1016, and send back "answer signal" to the signalling equipment 1018. The outgoing trunk 912 in the earth station receiving the "answer signal" from the next switching position, informs the controller 916 of the reception employing the same manner described several times hereinbefore. The controller 916, discriminating that the outgoing trunk has received the "answer signal," sends back the number of the outgoing trunk together with a code for the "answer signal" to the central controller 315. The central controller 315 selects an idle channel to be assigned for the call from the stored memories in the temporary memory 316, and at the same time, finding out the equipment serial number of the incoming trunk 212 in the originating earth station from the serial number of the outgoing trunk 912 included in the "answer signal," and arranging these two numbers together with the assigned channel number in a predetermined format, sends out the channel assignment to both of the originating and the terminating earth stations. As the result, a speech path is established between the originating and the terminating earth stations, and at this time, the incoming trunk 212 in the originating earth station operates the second signalling equipment 213 so as to send out a signal for the continuity test. This signal is detected by the second signalling equipment 913 and the outgoing trunk 912 in the terminating earth station, and the outgoing trunk 912 operates the second signalling equipment 913 to send back the confirmation signal, and then closes and establishes the call line. The incoming trunk 212 discriminating the establishment of the sending and receiving speech paths by the reception of the confirmation signal, stops sending back the signal such as ringing tone for the former switching point to indicate that the connection is in progress, and establishes the speech path. The originating operator, knowing the completion of the speech path from the cease of the signal such as the ringing tone, can start conversation with the called subscriber. In the telephone-switching system according to the invention as just described, there can be provided on the originating operator position 113, besides the key switches for feeding the numerical signal of the terminating subscriber into the register, keyboard for numbers or letters to be sent into the register (keys for the telex terminal equipment can be used for this purpose) and all of the registers in the originating gateway station, earth station, terminating gateway station can be so composed as they can store, send out and receive not only numerals but also telegraph signals, and the indicator circuit 1020 in the terminating gateway station can also be so composed as to indicate the letters and FIGS., for instance by utilizing telex terminal units, the information about the called subscriber can be sent to the terminating operator in the terminating gateway station through the control channel, not only in the station-to-station call but also in the person-to-person call, and the connection can be established without utilizing speech paths, thus obtaining economization of the communication paths.

In the explanation of the first embodiment of this invention, the control data transmission terminal and the control information transmission paths have not been described in detail because of simplification of the explanation. However, if the time division multiplex communication path is used for a control data path, the modulator and demodulator can be composed with simpler construction. Therefore, the construction of the time division multiplex communication path for the control data and the control data terminal equipment to control said multiplex communication path will now be described in full detail.

In the first embodiment of this telephone exchange or switching system according to this invention, the communication path between the two points is obtained by assigning two carrier waves each time when the demand occurs. The assignment of two carrier waves between the two points to provide a speech path and the clearing of the assigned carrier waves at the completion of the call are performed so rapidly, that the same carrier waves can be assigned and cancelled consecutively according to the time division procedure to many of the earth stations and the central control station, thereby providing a large number of time divided digital channels between these many stations. In other words, utilizing a wide band carrier wave and splitting it into multitude of time divided high-speed digital channels, a large number of low-speed wireless paths can be provided.

Referring now to FIGS. 15—23, an embodiment of the time division multiplex communication path for control data and the control data transmission terminal equipment to control said time division multiplex communication path will be described.

In FIG. 15, the time composition of the time divided high-speed digital channels made of one radio telephone circuit is indicated. The time composition of the time division multiplex circuit is composed of one frame length $To$, the number of the time slots $2n$, time interval of one time slot $t$ and plots as ordinate the space distance L and time T as abscissae. Taking the location of the central control station 1501 as the base line, the position of the earth station 1502 differs by each earth station and also by the fluctuation of the position of the stationary satellite. The position 1503 of the stationary satellite may be varied by its own orbital fluctuation. It is preferred that the first half of the one frame length $To$ is divided into a number of $n$ time slots $10_1$, $10_2$, $10_3$,........ $10_i$,......$10_n$, and these are assigned to transmit control data from the central control station to a number of $m$ earth stations ($n>m$), and the last half of the one frame length $To$ is divided into a number of $n$ time slots $21_1$, $21_2$, $21_3$,.....$21_i$, ....$21_n$, and assigned to a number of $m$ earth stations to transmit control data to the central control station. By these procedures, when the number of the earth stations is not so many and the traffics of the control data are not so plenty, one of the radio telephone circuits would be enough for the transmission of the control data and the number of the radio telephone channels can be increased afterwards when the number of the earth stations and the control data traffics are increased. Thus, it is not necessary to provide two channels for transmission and reception from the beginning. These time slots $10_1$... $10_{i\ n}$, and $21_1$,....$21_i$,....$21_n$, are arranged so that they do not overlap at the position 1503 of the artificial satellite. That is, at the position 1503 of the satellite, the time slot $10_i$ overlaps with the time slot $20_i$ and the time slot $11_i$ overlaps with the time slot $21_i$ respectively (see FIG. 15). The frame synchronization of a number of $m$ earth stations is effected by the transmission of "frame-synchronization signal" from the central control station in the first time slot $10_1$ of each frame length $To$ which a number of $m$ earth stations receive. A number of $m$ earth stations transmit their control data to the central control station in accordance with a predetermined time assignment or the time slot assignment in the $21_1$,....$21_i$,....$21_n$. It is preferable that the aforementioned one frame length $To$ is determined as $To = 888$ ms., considering the propagation period of about 140 ms. between each of earth stations and the satellite, the processing period in each station of about 150 msec. to 200 msec., and also the hereafter described one frame period of the telegraphic circuit of 440 msec. Supposing the number of the time slots $2n = 2 \times 37 = 74$, the time interval of the time slot will be $t = T/2n = 888$ msec./$74 = 12$ msec. Within this 12 msec. if the net control data be decided to 48 bits, and 1 bit for indicating the reception state of control data, 15 bits of redundant bits for error detection to be added to said 49 bits, 2 bits for start pulse and 3 bits for stop pulse, and also 3 bits for guard time are to be added, then the total of 72 bits is to be transmitted within the 12 msec. one time slot, and the transmission speed of this time division high-speed digital channel will be $72/12 = 6000$ bauds, and about 15 kc. bandwidth will be required for this transmission. However, this can be easily realized by one channel of the wide band radio-telephone channel where the frequency difference between each channel is of enough width, considering the mutual modulation and other factors.

Referring to FIG. 16, there is illustrated the detailed construction of the central data transmission terminal equipment 314 in the central control station 301. At first, the control data such as the channel assignment to be sent to an earth station, the address in the temporary memory 1612 corresponding to the time slot assigned to the earth station, and write order to write in said control data into the temporary memory 1612 are all given to the cable pulser circuit 1611 of the central data terminal 314, through the cable pulser circuit 1601 of the central controller 315. The cable pulser circuits 1601 and 1611 are provided for correct transmission and reception of digital informations between two units relatively spaced apart (maximum 150 meters) eliminating the effects of their ground potential differences and the disturbance noises, and these circuits are well known and disclosed, for instance, in "Bell System Technical Jouranl," Sept. 1964, Vol. 43, pages 2043-—2049 by J. B. Connel, L. W. Hussy and R. W. Ketchledge. The write order received by the cable pulser circuit 1611 is sent to the commanding unit 1614.

Referring now to FIG. 17, the commanding unit 1614 controls, at one hand, so that out of the four commanding signals originated at random relation no more than two said commanding signals can be fed into the temporary memory 1612, at one time and, on the other hand, has a function to generate commanding pulses which are most suitable for being received in the temporary memory 1612. The write order sent from the cable pulser circuit 1611 to the commanding unit 1614 resets the third flip-flop 1713 through the third input terminal 1703 and sets the status of the output of the flip-flop 1713 to "1." The scanning counter circuit 1718 is an ordinary binary counter and is counting the output pulses of a 90 kc. pulse generator 1714, and cooperating with the first decoder 1719, constitutes a scanning circuit which performs quaternary counting when the outputs of four flip-flops 1711, 1712, 1713, 1714 are all "0," and, when the output of at least one of the flip-flops becomes "1," stops the quaternary counting to hold the counting position corresponding to the position of the flip-flop the output of which becomes "1." Accordingly, if the output status of the third flip-flop 1713 becomes "1," the output "1" is given to the scanning counter circuit 1718 through the third logic product AND circuit 1723, the first logic sum OR circuit 1720, and the second logic sum OR circuit 1730, and the scanning counter 1718 is self-held and stops at the corresponding position to the third flip-flop 1713, resetting the commanding counter circuit 1728, which was at the last stage, through the first logic sum circuit 1720, the fifth flip-flop 1715, and the fifth logic product circuit 1725, so that the commanding counter circuit 1728 returns to the original position and starts its counting operation. The commanding counter circuit 1728 in cooperation with the second decoder 1729 generates three commanding pulses in a predetermined sequence. These commanding pulses are gated by the third commanding pulse gate circuit 1737 with the output of the third logic product circuit 1723, and given to the temporary memory 1612 through the commanding pulse output terminals 1706, 1707 and 1708. The "transmission order," "reception order" and "read order," which will be hereafter described, are sent to the fourth flip-flop 1714, first flip-flop 1711 and the second flip-flop 1712 respectively through the fourth input terminal 1704, the first input terminal 1701 and the second input terminal 1702, and processed in the same way as the write order sent to the third flip-flop 1713 described above. If two or more of the above described four commands or orders are fed at the same time into the flip-flops 1711, 1712, 1713, and 1714, the one which is sent to the flip-flop corresponding to the counter position held by the scanning counter 1718 is at first processed. When the process of the write order is completed, the commanding counter circuit 1728 reaches the last stage of the counting operation and held at this position through the third logic sum circuit 1740 stopping the counting operation and generation of any commanding pulses thereafter. Preceding the above, the commanding counter circuit 1728 resets the third flip-flop 1713 through the gate circuit 1727 and the tenth flip-flop 1733 at one step before the last stage, and as the result the scanning counter circuit 1718 again starts the scanning and counting operation.

Referring to FIG. 17 together with FIG. 16, the temporary memory 1612 can be easily realized by, for instance, an ordinary magnetic core-type memory unit or the like widely used in electronic computors. In the temporary memory 1612, not only the above described control data but also the data status words indicating the control data state are memorized in an address corresponding to each control data being stored. Thus, as its first step to process said write order the commanding unit 1614 gives a commanding pulse to read out said "data status words" to the temporary memory 1612 through the first commanding output terminal 1706. The temporary memory 1612 reads out the "data status words" in the appointed address through the cable pulser circuit 1611 according to the commanding pulse. By this procedure, the "data status words" are at once transferred to the logic unit 1613. The logic equipment 1613 reads out the "data status word" and if it judges that the control data should be written in the same address of the temporary memory 1612, the judgment is sent to the commanding unit 1614, and simultaneously rewrites the "data status word" to mean that the control data is stored in the address, and sends it to the temporary memory 1612. At the commanding unit 1614, the seventh flip-flop 1717 receives the information from the logic equipment 1613 through fifth input terminal 1705 and inverter circuit 1739, and gives the output "0" to sixth logic product circuit 1726, letting the commanding counter circuit 1728 continue its counting operation and generate commanding pulses to write the converted "data status word" and the control data into the temporary memory 1612, and gives these pulses to the temporary memory 1612 through the second command output terminal 1707 and the third command output terminal 1708 respectively. When the commanding unit 1614 reads the "data status word" and judges that the control data should not be written in the temporary memory 1612, the seventh flip-flop 1717 which received this judgment gives output "1" to the sixth logic product circuit 1726, and this sixth logic product circuit 1726 controls the commanding counter circuit 1728 through the sixth flip-flop 1716 so that it does not generate commanding pulse to write the control data in the temporary memory 1612. The write order is processed in this manner, and the "transmission order," "reception order," and "read order" are also processed in the same way.

Referring to FIG. 18, the processing procedures of said "reception order," "read order," "write order" and "transmission order" are indicated in the functional chart form. Referring to the upper part of FIG. 18 and also FIG. 16, when the control information sent from the earth station to the central control station is received by a receiving equipment 1615, which will be explained later, and from that receiving equipment 1615 the "receiving order" is given to the commanding unit 1614, the "data status word" is at first read out from the temporary memory as in the case of the "write order" just described, and if the logic equipment 1613 judges that the information can be written in the temporary memory, the control data is written in the temporary memory and the reception of the control data is completed. If the logic equipment 1613 judges that the information should not be written in the temporary memory, only a "data status word" indicating the reception was not possible is written into the temporary memory 1612 and the control data itself is not to be written, that is wrong reception. One reason for this wrong reception is that the previously written control data in the address has, by any reason, not yet been transferred to the central controller, and the other reason is in the case that the error detection circuit detects an error as will be later explained. In addition, simultaneously as the control data is received by the receiving equipment 1615, the "receiving status word" indicating the receiving condition of the control data which was sent to the earth station one frame period before, is also received as will be explained later, and the logic equipment 1613 rewrites the "data status word" for the control information which is still memorized in the temporary memory 1612 even after the control data is transmitted to the earth station, to other kind of "-data status word" meaning that the control data is to be retransmitted or to be erased out. Then, "read order" is given from the central controller as in the case of the "write order" just described. The process of the "read order" is also conducted in the same way as described for the "write order." The control data read out by the central controller is processed in the same control unit. The central controller, then, makes out a new control data to be sent to the earth station, and gives "write order" to write this new control data in the temporary memory 1612 to the commanding unit 1614, but these operations are all the same as described above and will not be described further. Next, the transmitting equipment 1617 gives the "transmission order" to the commanding unit 1614. The operation and process of the logic equipment 1613 which judges from the "data status word" of the control data and decides whether the control data will be transmitted or not, are also quite the same as in the case of the other three orders. The transmitting equipment 1617 transmits the control data together with the "reception status word" for the previously received control data from the earth station.

The logic equipment 1613 can be easily constituted by embodying the following logical equations into a circuit, utilizing ordinary binary logic components. These logical equations are expressed in Boolean algebraic form and can be understood easily.

1. $BLK = BLK.RD$
2. $GPC = (GPC + RRC).RD + (BLK + GPC).(WR + TR)$
3. $WRC = (BLK + GPC + WRC).\overline{CKR}.RC + (WRC + BSY).RD + WRC.(WR + TR)$
4. $RRC = (BLK + GPC + WRC).CKR.RC + RRC.(WR + TR)$
5. $BSY = (RRC + BSY).RC + BSY.(WR + TR)$
6. $CPC = CPC.(RC + RD) + (BLK + ALR).TR + CPC.TR$
7.
7. $EDT = EDT.(RD + WR) + (BLK + ALR).TR + (CPC + EDT + RTQ).TR$
8. $ALR = (BLK + EDT + ALK).OAL.RC + ALR.RD$
9. $RTQ = RTQ.OAL.RC + (BLK + EDT + ALR + RTQ).ORT.RC + RTQ(RD + WR)$
10. $SAL = (BLK + GPC + RRC).TR$
11. $SRT = (WRC + BSY).TR$
12. $EXC = (BLK + GPC + WRC).CKR.RC + (RRC + BSY).RD + (BLK + ALR).WR + (CPC + EDT + RTQ)$ For simplifying the explanation, the description about all of these equations are omitted except equation 8, where the "-data status word" will be rewritten to ALR (all right, transmission is completed) exclusively in the case that the read out "-data status word" is BLK (blank), or EDT (end of transmission, waiting for answer), or ALR (all right, transmission is completed) and at the same time when the answer is OAL (all right, answer from other terminal) and the timing is RC (receive order timing), or in the case the read out "data status word" is ALR (all right, transmission is completed) and the timing is RD (read order timing). These RC (receive order timing), RD (read order timing), WR (write order timing), and TR (transmission order timing) are given to the logic equipment 1614, through "timing" output terminals 1751, 1752, 1753, and 1754 as shown in FIG. 17. Within the above "data status words," GPC (gone into processor), WRC (wrong reception), RRC (right reception), BSY (busy) are for the state of the received control data, and CPC (come from processor), EDT (end of transmission, waiting for answer), ALR (all right, transmission is completed) and RTQ (retransmission request) are for the conditions of the control informations to be sent out. In other data status words, CKR (check right) means that the error detecting circuit later described did not detect errors, $\overline{CKR}$ means that the error was detected, OAL means that the other terminal station completed the reception, ORT (retransmission request from other terminal) means that the other terminal station requests retransmission of the control data, SAL (all right, answer to be sent) means the completion of the reception in their own station, and SRT (retransmission request to be sent) means that the control data is requested to be retransmitted. EXC (Execution of Order) in the equation 12 is an information in order to execute the "write order" or "readout order" to be given to the fifth input terminal 1705 in FIG. 17. Thus, the control data written in the temporary memory 1612 from the central controller 315 is, thereafter, read out and transmitted by the transmitting equipment 1617.

Referring to FIG. 19, the transmitting equipment 1617 is composed of transmitting time counter circuit 1911, decoder 1912, redundant bits adding circuit 1915, a temporary memory circuit 1913 consisting of a flip-flop circuit, and a logic sum OR circuit 1917, and has the functions of series-parallel conversion, generation of frame-synchronization signals, transmission of the control data stored in the temporary memory 1913, and addition of the redundant bits for error detection. The transmission time counting circuit 1911 counts the output of the 90 kc. pulse generator 1920, and generates the time pulses to determine the time slots, and also at the first instant of each time slot, gives the "transmission order" to the counting unit 1614 through the commanding output terminal 1901. At the same time, the numbers of the time slots are given to the temporary memory 1612 as the numbers of the addresses, through the address assigning terminal 1902. Thus, at the first instant of the time slot, the control data which is to be transmitted in the time slot is read out with high speed and in parallel into the temporary memory 1913, from the temporary memory 1612, by the control of the commanding unit 1614 and the logic equipment 1613. The transmission time counting circuit 1911, with the cooperation of the decoder 1912, successively sends out time pulses to the logic product AND circuit 1916, and the control data read out in the temporary memory circuit 1913 is successively sent to the flip-flop 1918 through the logic sum OR circuit 1917. The flip-flop 1918 is so arranged that, with the cooperation of a NOR circuit 1919, when the information consecutively arrives from the OR circuit 1917 is "1" continuously sends out "1" on its output, and when the arrived information is "0" continuously sends out "0" on its output. Thus, the control data read out in parallel in binary form in the temporary memory 1913, is converted into timely series binary information through the flip-flop 1918 and sent to the modulator-demodulator. The control data readout in the temporary memory circuit 1913 is added redundant bits for error detection by the redundant bits adding circuit 1915, and said error-detecting redundant bits are also sent to the flip-flop 1918 together with the control data. The redundant bits adding circuit 1915 can be easily composed by adopting "parity check" system for detection and utilizing "exclusive OR" circuit as in the ordinary case. When the transmission time counting circuit 1911 completes counting of one frame length and starts again counting of the first time, slot $10_1$, a selecting circuit 1914 prohibits sending out of the temporary memory circuit 1913, and gives the frame-synchronizing signal P*o* 1921 to logic product AND circuit 1916. The frame synchronizing signal P*o* 1921 is of a pattern consisting of 20 bits of all "1" and so arranged that it can not be used for any other control data. By these procedures, the control data is sent from the central controller 315 to the modulator-demodulator unit 313 through the central station data terminal 314 and the transmission terminal 1602.

Returning to FIG. 15 again, the frame-synchronizing signal sent out from the central control station 1501 in the first time slot $10_1$ of one frame, is relayed by the transponder 1503 of the stationary satellite, and received also by the central station data terminal 314 itself in the first time slot $20_1$ of the receiving frame. By this means, the central station data terminal 314 can decide the time slot $20_1$ from the receiving point of the frame-synchronizing signal P*o* previously transmitted by its own station, and the time deviation of the time slots due to the fluctuation of the stationary satellite can be automatically compensated.

Referring to FIG. 20, this FIG. is used for detailed explanation of the receiving frame-synchronizing unit 1616. The receiving frame-synchronizing unit 1616 is composed of frame-synchronizing signal-detecting circuit 2011, receiving time-slot-counting circuit 2012 which completes its one sequence of counting in every one frame and other logic circuits, and has functions such as deciding the time for the receiving time slots, readjustment of the receiving frame synchronization by every one frame, and detection and correction of the erroneous synchronization. The frame-synchronizing signal-detection circuit 2011 is always supervising its supervision terminal 2001, and when it detects the frame-synchronizing signal immediately sends its output "1" to the first logic product AND circuit 2013 and the second logic product AND circuit 2014. The frame-synchronizing signal-detection circuit 2011 may be easily composed of the ordinary logic product AND circuits. For detection of the frame-synchronizing signal P*o* which consists of the 20 bits of all "1," the information given from the receiving equipment 1615 in parallel form, should be received by an AND circuit having 20 input terminals. The second AND circuit 2014 receives the "check right" signal from the receiving equipment 1615 through the first input terminal 2002 and gives its output "1" to the third AND circuit 2016. The fourth AND circuit 2015 is given reception timing or position of each time slot through the second input terminal 2003 from the receiving equipment 1615 which is explained later, and, therefore, at the first time slot $20_1$ of the receiving frame, the third AND circuit 2016 judging that it is receiving frame-snychronizing signal correctly, forces the receiving time-slot-counting circuit 2012 to set at the counting position for the reception timing of the first time slot $20_1$ of the receiving frame, through the second OR circuit 2017. By this way, the synchronization of the frame is ordinarily checked for each frame. The first AND circuit 2013, in cooperation with an inverter 2021 etc., when the frame-snychronizing signal-detecting circuit 2011 receives the frame-synchronizing signal in another time slot than the first time slot $20_1$ of the receiving frame by any reason, judges that the frame synchronization is corrupted and gives the output of "1" to the second OR circuit 2019. Simultaneously, the fifth AND circuit 2018, in cooperation with the inverter 2022 etc., when the frame-synchronizing signal-detecting circuit 2011 does not receive the frame-synchronizing signal by any reason at the first time slot $20_1$, judges that the frame synchronization is corrupted and gives the output of "1" to the second OR circuit 2019. The second OR circuit 2019 gives its output "1" to the flip-flop 2020 at the time that the frame synchronization is judged to be corrupted, and the flip-flop 2020 continuously produces "1" for its output. Said flip-flop 2020 holds, through the first OR circuit 2017, the receiving time slot counting circuit 2012 at the counting position of the first time slot $20_1$ of the receiving frame, and inhibits the counting operation of the receiving time slot counting circuit 2012. This prohibition continues until the next frame-synchronizing signal is correctly received, and at the time when the same frame-synchronizing signal is correctly received, the prohibition is released by the reset of the flip-flop 2020 through the third AND circuit 2016 and the like. By the release of the prohibition, receiving time-slot-counting circuit 2012 again starts counting operation, and the resumption of the synchronization is completed. The receiving time-slot-counting circuit 2012 gives, through the address output terminal 2004, the address corresponding to the time slot where said reception order is processed in the temporary memory 1612, to the temporary memory 1612, and through the time slot assignment terminal 2005, also gives the receiving equipment 1615 the timing of the time slot.

Referring to FIG. 21, there is explained the details of the receiving equipment 1615. The receiving equipment 1615 comprises primarily receiving bits-counting circuit 2111, decoder 2112, a temporary memory circuit 2113 composed of a flip-flop circuit, the error detection circuit 2114 etc., and as a whole, has the function to temporarily store the control data received timely in series form in the spatially parallel form, function to give the receive order to the commanding unit 1614, function to detect errors etc. The receiving bits-counting circuit 2111, after receiving one control data, is self-held at the last stage of the counting and stops counting operation. Next, when the start pulse of the control data from the modulator-demodulator 313 appears on the input terminal 2103 in timely series form, said start pulse sets the first flip-flop 2115. The first AND circuit 2116, by the fact that the receiving bits-counter circuit 2111 is held at the last stage and also that the first flip-flop 2115 is set, resets the receiving bits-counter circuit 2111 to the first stage, through the second flip-flop 2117. Thus, the receiving bits-counter circuit 2111 released from the self-held state, counts the fundamental pulse of the 90 kc. pulse generator 2123 through an OR circuit 2122. The repetition period of said fundamental pulse is one-fifteenth bit of the control data received in timely series form (if the transmission speed of the control data is assumed to be 6000 bauds, the repetition frequency of said output pulse is 90 kc.).

Referring to FIG. 36 together with FIG. 21, the time relation between the control data pulse shown in FIG. 36A and the fundamental pulse shown in FIG. 36B is indicated. The timing relation between the two pulses may be at random. The received bits-counter circuit 2111, in cooperation with the decoder 2112, counts the fundamental pulse as said above, and extracts the fundamental pulse nearest to the middle point of the start pulse, namely the eighth fundamental pulse from the rising-up instant of the start pulse, and gives this to the second AND circuit 2118. The second AND circuit 2118 at this instant discriminates the state of the start pulse of the control data through the first flip-flop 2115, and if by any reason the input of the input terminal 2103 becomes zero and the first flip-flop 2115 has been reset through inverter 2121, judging that this is not an ordinary start pulse but noise, forces the received bits-counting circuit 2111 through the third flip-flop 2119 to set at the last stage and to self-hold through OR circuit 2122 and to stop counting. In the ordinary case, the start pulse becomes "1" at said instant and the receiving bits counter 2111, in cooperation with the decoder 2112, continues counting and extracts the nearest fundamental pulse to the middle point of each bit of the control data (this pulse is called sampled pulse), and said sampled pulse is successively given to the temporary memory circuit 2113 through a gate circuit 2120. The gate of the gate circuit 2120 is opened or closed by the output of the first flip-flop 2115, and thus the control data is consecutively stored in the temporary memory circuit 2113. The receiving bits-counter circuit 2111, when it reaches the last stage of the counting, self-holds and stops its counting through the OR circuit 2122, and also gives the output "1" to the third OR circuit 2114. When the input of the time slot assignment terminal 2103 is "1" at that instant, the third AND circuit 2124 gives the "receive order" to the commanding unit 1614 through the commanding terminal 2102 as described before. The error detection circuit 2114 is the circuit to detect errors in the control data stored in the temporary memory circuit 2113, and the detection circuit supervises the control data and the redundant bits included in the control data for detecting errors, and the detected results are given to a logic equipment 1614 through the output terminal 2101. The error detection circuit 2114, when the "parity check system" is adopted, can be easily realized by utilizing "exclusive OR" circuit as in the ordinary case.

Again referring to FIG. 15, in the data transmission, there is always accompanied by errors with a certain probability. Since the error in the control data causes misconnection of traffic in the telephone exchange or switching system according to this invention, there must be some sort of measures to detect and correct errors. For this purpose of error detection and correction, there are many kinds of systems such as "no feedback system," "message feedback system," "detection feedback system," and so on. However, it will be advantageous for the control data transmission terminal equipment according to this invention, to utilize the "detection feedback system." A control data transmitted from the data terminal of an earth station in the time slot $21_i$ is received in the central station data terminal, where the aforementioned error detection is performed, and the results are stored in the temporary memory 1612 in the form of "data status word" which is thereafter transmitted in the time slot $10_i$ in pair with the time slot $21_i$. The control data transmitted in the time slot $10_i$ from the central station data terminal, is received in the data terminal of the earth station assigned to use the time slot $10_1$, and after the error is detected as described above, the results are stored in the temporary memory of the earth station in the form of "data status word" as in the case of the central station data terminal, and transmitted in the time slot $21_i$ which makes a pair with the time slot $10_i$. The central station data terminal reads out the results of the error detection sent from the data terminal of said earth station, and if it indicates the "right reception," said control data stored in the temporary memory 1612 is erased, and if it indicates the "wrong reception" said control data is retransmitted as described in the explanation for the logic equipment 1613. By these measures, the errors in the control data can be detected and corrected. The control data thus correctly received by the receiving equipment 1615 is controlled and processed by the commanding unit 1614, logic equipment 1613 and the receiving frame-synchronizing unit 1616, and the results are stored in the temporary memory 1612. Said control data stored in the temporary memory 1612 is read out to the central controller 315 through cable pulser circuits 1611 and 1602, when the "read order" generated at a predetermined period from the central controller 315 is processed as in the case of "write order" previously described. Thus through the cable pulser circuit 1611 in the central station data terminal, the control data from the central controller 315 to the earth station and from the earth station to the central controller 315 are relayed without error.

Referring to FIG. 22, the earth station data terminal (in the first embodiment, this unit is explained as the originating data terminal 217 and the terminating data terminal 417) can be composed as the central station data terminal 314. In the earth station data terminal 2201, the cable pulser circuits 2204 and 2211, temporary memory 2212, logic equipment 2213, commanding unit 2214, receiving equipment 2215 and receiving frame-synchronizing unit 2216 are all quite the same as those units in the central station data terminal 314 explained with reference to FIG. 16. In the transmitting equipment 2217, counting of the time slot is not necessary because the transmitting time determining unit 2218 gives the transmitting time required for the transmitting equipment 2217, and the frame-synchronizing signal is also not sent out, but otherwise are the same as the transmitting equipment 1617 described in the central station data terminal 314.

Returning to FIG. 15, the earth station data terminal 2201 receives the control data transmitted in the time slot $10_i$ from the central station data terminal 314, and transmits its control data into the time slot $21_i$, which is in pair with the time slot $10_i$, to the central station data terminal 314. The control data sent from said earth station data terminal 2201 in said time slot $21_i$ is relayed by the transponder of the stationary satellite and received also by the data terminal 2201 of said earth station in the time slot $11_i$. In this case, at the data terminal 2201 of said earth station, the time difference between the time when the control data from the central data terminal is received in time slot $10_i$ and the time when the control information sent out from said earth station and relayed back by the transponder of the stationary satellite in the time slot $11_i$, will be just one-half frame length because the time slots used in the earth station data terminal make a pair. On the other hand, when the transmitting time slot $21_i$ is adjusted for each frame so that the time difference between the time slot $10_i$ when the data terminal 2201 of the earth station receives the control data transmitted from the central data terminal 314 and the time slot $11_i$ when the control data transmitted by said earth station and relayed by the transponder of the stationary satellite is again received by said earth station may become one-half of one frame period, the fluctuation of the time slot due to the movement of the stationary satellite is automatically corrected.

Referring to FIG. 23, there is shown a detailed composition of the transmission time determining unit 2218. The transmission time determining circuit 2218 is composed of temporary memory circuits, consisting of flip-flops 2311, 2320 and 2321, comparators 2313, 2315 and 2326, adders 2314, 2322 and 2324, etc., and, as a whole, effects determining transmission time slot and reception time slot, alteration of the time slot assignment, etc. For simplifying the explanation, assume that the time slot number $i$ which is assigned to the earth station to which the transmission time determining unit 2218 belongs, is already memorized in the temporary memory 2311, and also that the first flip-flop 2312 is set to "1" position. Also assume that the only one time slot is assigned to the earth station. At first the determination of the receiving time slot will be explained. The pattern of the time slot number $i$ memorized in the first temporary memory circuit 2311, and the pattern from the time slot counter which is given, through the first input terminal 2302, from the receiving time slot counter 2301 of the receiving frame-synchronizing unit 2216, are compared by the first comparator 2313, and the comparator 2313 gives the output "1" to the first AND circuit 2316 at the time when the pattern of the both of the cases coincides with each other, namely when the receiving time slot counter circuit 2301 counts the time slot number $i$. The first AND circuit 2316 judging from the output "1" of the first flip-flop 2312 that the time slot is the correct one to be assigned, gives the "time slot assignment order" to the receiving equipment 2215 through the time slot assignment terminal 2303. It is obvious that the assignment is done at the time which coincides with the time slot $10_i$.

Continuing the reference to FIG. 23, the determination of the transmitting time will be explained. As is clear from FIG. 15, at the earth station, the control data is received in the time slot $10_i$ and transmitted in another time slot $21_i$ which is located several time slots later than the $10_i$, and the time interval between the time slots $10_i$ and $21_i$ is in ordinary case not integer multiple of the time slot width. Referring also to FIG. 24, and supposing the minimum counting unit in the receiving time slot counter 2301 is $dt$, and also the transmitting time instant in, for instance, the time slot $21_i$ is delayed by $k.dt$, the receiving time instant in the time slot $11_i$ is also delayed by $k.dt$. Therefore, when the height of the stationary satellite deviates and it is detected that the receiving time instant of the time slot $11_i$ is advanced by $k.dt$, the transmitting time instant at the time slot $21_i$ should, of course, be delayed by $k.dt$. In FIG. 23, the first adder 2314 adds number of time slots between the time slot $10_i$ and the time slot $21_i$ (13 slots in FIG. 24) to the number $i$, and the second adder 2322 and the third adder 2324, which form a pair, adds or subtracts the pattern $Pj$ counted in the time slot of the receiving time-slot-counting circuit 2301, at the transmitting time instant, in the time slot $21_i$ of one frame before, which is memorized in the third temporary memory circuit 2321, to or from the pattern of said number $k$.

Referring to FIG. 24, assume that $Pl$ designates pattern given by the pattern generator 2318, which generates the same pattern as that counted in the time slot of the receiving time-slot-counting circuit 2301, at the ordinary receive-completed time instant, in the time slot $10_i$ (the pattern generator 2318 can be obtained by opening or grounding 10 contacts according to the pattern $Pl$), and also that $Ph$ designates the pattern counted in the time slot counter of the receiving time-slot-counting circuit 2301, through the second input terminal 2304, at the time instant when the control information transmitted from the earth station is completely received in the time slot $21_i$ by their own earth station, and the relation between $Pl$ and $Ph$ be given by:

$$P.k=P1-Ph$$

Further assume that C1 designates the shifting number given by the third adder 2314 through the third flip-flop 2325, and C2 designates the shifting number given by the second adder 2322 through the second flip-flop 2323. Then when $C1 = 1$, the produce $P.k > 0$ and this means that the reception in the time slot $21_i$ is completed later by the time interval $k.dt$, and in this case, the output of the second adder 2322 is subtracted by the output of the third adder 2324 by the amount of $k$. As for the C2, when $C2 = C1 = 0$, it results $P.k + Pj < 0$ and in this case the first time instant of the time slot $21_i$ for the transmission must be advanced by one time slot (in FIG. 24, from time slot $10_i + 13$, to the time slot $10_i + 12$), and this is performed by the procedures where, referring to FIG. 23, the logic circuit 2319, cooperating with the fourth adder 2329, the fourth temporary memory circuit 2328 and fifth temporary memory circuit 2330, controls the selecting circuit 2331 and gives "−1" pattern to the fourth adder 2329. And if $C2 = 1$ and $C1 = 0$, or $C2 = 0$ and $C1 = 1$, then $P.k + Pj > 0$ and in this case, the first time instant of the transmitting time slot $21_i$ must be shifted backward by one time slot (in FIG. 24, from time slot $10_i + 13$ to time slot $10_i+14$) and this can be done through the fourth adder 2329 and the like as in the case of C2 = C1 = 0. The patterns −1, 0, +1, etc. can be obtained by opening or grounding 10 contacts respectively as described above. These results are summarized in the table below. When the binary addition and subtraction are performed by means of "nine's complement," there are some cases where " 1" must be added to the last digit, but this is omitted in the case of FIG. 23.

| C1 | C2 | Pi | Pj | Alteration of the time slot at the time instant of Pj |
|---|---|---|---|---|
| 0 | 0 | +0 | +1 | −1 |
| 0 | 1 | +0 | +1 | 0 |
| 1 | 0 | +1 | +0 | 0 |
| 1 | 1 | +1 | +0 | +1 |

Continuing reference to FIG. 23, the output of the first adder 2314 is compared with the output of the counting portion of the receiving time slot counter 2301 at the second comparator 2315, and the output of the second adder 2322 is compared, through the second temporary memory circuit 2320, with the output of the counting portion of the receiving time slot counter circuit 2301 at the third comparator 2326, and gives the second logic product AND circuit 2317 the transmitting time instant (in FIG. 12, the time instant for $10_i+13$ and P*j*). The second logic circuit 2317, from the fact that the output of the first flip-flop 2312 is "1," judging that the time slot at this instant can be used for the assignment, gives the "transmission time assignment order" to the transmitting equipment 2217 through the transmitting time assignment terminal 2305. By these procedures, the transmission time is determined, and the comparators and the adders used in the explanation can be easily realized by utilizing "exclusive OR" circuits as in the case of the ordinary electronic computors and the electronic telephone exchange system.

Still referring to FIG. 23, in the above explanation, it was assumed that the time slot number *i* had been memorized in the first temporary memory circuit 2311, and also that the first flip-flop 2312 was set to "1." However, if these are controlled by the central controller 315, the assignment and release of the time slots and also, as described later, increase or decrease of the number of the time slots according to the traffic of the control data can be conveniently performed. As described before, the central station 301 is transmitting the frame-synchronizing signal to each of the earth stations in the time slot $10_1$, and the single time slot $10_1$, which is received by whole earth stations, are also available for said assignment and release of the time slots. Also, as described before, it was assumed that the date carried in one time slot was 48 bits, so that if 20 bits out of said 48 bits in the time slot $10_1$, were utilized for the frame-synchronizing signal, then the rest of 28 bits could be used for the assignment and release of the time slots. Now assume that the central controller 315 has decided to release the time slot assigned to a certain earth station. The central controller 315, utilizing said 28 bits in the time slot $10_1$, transmits the earth station number and the "release order" of the time slot assigned to said earth station, through the central station data terminal 314. The earth station data terminal receiving the station numbers, in the same manner as in detecting the frame-synchronizing signal, and detecting its own station number, reads out the information contained in the time slot $10_1$, and, if it finds out the "release order," resets the first flip-flop 2312 of the transmitting time determining unit 2218. Thus by setting and resetting the first flip-flop 2312 through the set and reset terminals 2306 and 2307 respectively, the assignment and the clearance of the time slots can be performed. In the above explanation, it was described as only one time slot is assigned to an earth station. However, it is clear that a plurality of the time slots can be assigned to an earth station by providing a plurality of circuit components such as the first temporary memory 2311, the first adder 2314, first and second comparators 2313 and 2315, the first flip-flop 2312, the first and second logic product AND circuits 2316 and 2317 in the transmission time determining unit 2218. When such plurality of time slots are assigned to one earth station, as the traffic in each earth station increases or decreases by the local time difference and by geographical reasons, it will be convenient if a time slot assigned to an earth station can be cleared and reassigned to another earth station. This can be accomplished by the same measure as the assignment and release of the time slots. That is, assume that the central controller 315 releases a time slot *i* assigned to the first earth station and decided to assign it to the second earth station. The time slot *i* assigned to the first earth station can be released as described before, and the central controller 315, then by using the above described 28 bits in the time slot 10, transmits the station number of the second earth station, the time slot number *i* newly assigned to said earth station, and the assignment order through the central station data terminal 314. The earth station data terminal of the earth station detects the station number of the own station by the same manner as detecting the frame-synchronizing signal, and reads out the data received in said time slot $10_1$, memorizing the newly assigned time slot number *i* in the first temporary memory circuit 2311 through the third input terminal 2308, and sets the first flip-flop 2312 by the "assignment order." By this procedure, the clearing, assignment and alteration of the time slot can be performed. The first temporary memory circuit 2311 gives the time slot numbers to the temporary memory 1612 for its address numbers, through the address assignment terminal 2309. In addition, if it is so arranged that the earth station, which is commanded through the first time slot $10_1$ in one frame length, sends back the answer to the central control station 301 through the time slot 21, which is in pair with said $10_1$, then the above described clearing, assignment and alteration of the time slot can be assured.

In the above explanation, the time division multiplex path system utilized one channel in a frequency band, but if the traffic increases more, a plurality of channels may also be utilized in synchronized condition. In this case, the data terminal in the earth station should be of the type that the plurality of the time division multiplex channel can be handled by the single unit of the data terminal. And the central controller should control the timing of the time slots so that the time slots belonging to a plurality of channels do not overlap in the earth station at one time, namely, during one time slot in one earth station, only one channel of the time division multiplex channel system is received at one time. Also, the time slot assignment must be done not only by the time slot number but also by the channel number of the time division multiplex channel. This time division multiplex channel system can be used also in the telegraphic communication, as described hereafter, and in this case the time division multiplex channels may be so composed that one time division multiplex channel used for the telegraphic communication and the other time division multiplex channel used for the control data are synchronized with one another and the central controller suitably assigns time slots so that the time division multiplex channels may be used for both of the above purposes without specifically determining time division multiplex channel for telegraphic communication or the control data link.

Next, the second embodiment of this invention for the telegraph exchange system utilizing the time division multiplex channels according to this invention will be explained with reference to FIGS. 25—31. While the telephone exchange or switching system employs the "line switching system," the telegraph exchange system generally uses the message switching system, so that the embodiment will be explained about the message switching system.

Referring to FIG. 25, the typical example of the necessary components for the explanation of the second embodiment within the national telegraphic networks are illustrated, and these are exactly the same as the telegraph exchange system using "button type relay system" which is installed in Osaka gateway station for the Kokusai Denshin Denwa Company, Ltd. Now, assume that a telegrapher has requested a telegraph office (hereinafter originating office) to send an international telegraph, and it was also judged that said originating office should transmit said telegraph to the other office located in the destination areas (hereinafter terminating office) to be connected by the telegraph exchange system according to this invention, the operator of the originating office punches the contents of the telegram on a tape by means of the keypunch board in the regular format, and sends it by the line transmitter 2501. The sent-out message is generally received, through the national telegraphic network 2502 operated in tape relay system, by the typing reperforator 2512 equipped in the international gateway telegraph office 2503 (hereinafter originating gateway station). The operator at the board 2511, confirming reception of more than one telegram, reads the address written on the tape and goes into connecting operation. That is, when it is judged that the telegraph should be connected through the telegraph exchange system according to this invention, the operator pushes the circuit connecting push button provided for this purpose and releases it after the "call lamp" has been switched on. By this operation, the incoming trunk 2514 advances the incoming rotary switch 2515 to position *a*. This in turn starts outgoing rotary switch 2516 through the starting line 2517, and the outgoing trunk 2519, if the intraoffice reperforator 2521 in the outgoing position is not busy, thereby rotating the rotary switch to the position *b*, and the incoming and outgoing positions are connected by the seizure line 2518. At the outgoing position, the serial number adder 2520 will generate a serial number, which is received and punched by the intraoffice reperforator 2521. Next, the intraoffice transmitter 2513 in the incoming position starts to transmit automatically and the telegram will be received and punched by the intraoffice reperforator 2521 in the outgoing position. There are more than 10 of these line feed codes or blank codes (hereinafter ending code) at the end of the telegram, and when the intraoffice transmitter 2513 sends these codes to the incoming trunk 2514, the incoming trunk counts this and disconnects the incoming and outgoing positions at the 10th code, which in turn switches off the lamp provided on the board. After the completion of reception of more than one telegram at the intraoffice reperforator 2521 in the outgoing position, the transmitter 2522 automatically starts transmission and sends the message on the interoffice trunk line 2504.

Referring to FIG. 26 in conjunction with FIG. 25, the earth station 2601 (hereinafter originating earth station) which is one component of this invention is connected with the originating gateway station 2503 through the interoffice trunk line 2504. The call originated on the interoffice trunk line 2504 constitutes the input to the telegraph exchange system according to this invention. The connecting operations as described above starting from the originating telegraphic call to the originating earth station 2601 through the interoffice trunk line 2504, are only exemplary and for simplification of the explanation, and one of the ordinary exchange operations has been described. However, it is evident that any other switching operation normally practiced will not at all influence the performance of the telegraph exchange system according to this invention. The telephone exchange system explained in the first embodiment was of a four-wire speech path, but the telegraph exchange system cited in the second embodiment is of a two-wire system.

Referring to FIG. 26, at the originating earth station 2601, one telegraph is received at first with the reperforator 2611 of the incoming position, then the needle of the waiting number indicator 2612 advances one step in response to the ending code suffixed to the message of said telegraph, and the intraoffice transmitter 2613, according to the indication of the waiting number indicator 2612, transmits only the serial number prefixed to the message of said telegraph and stops temporarily its transmission. The serial number comparator 2614 compares the serial number normally consisting of one or several digits, but in any case, the serial number comparator 2614 temporarily stores the given serial number after confirming the correctness of the serial number of said telegraph. Next, the incoming trunk 2615 connects the serial number comparator 2614 to one idle register 2617, through the register link 2616, and transfers and stores in said register 2617, the incoming trunk line number which has been fixed and stored in the serial number comparator 2614 and also the serial number stored in the manner described before. After that, the incoming trunk 2615 controls the intraoffice transmitter 2613 to resume the transmission, and also to store the national code of the terminating country in said register 2617. Depending upon the country to which the originating earth station 2601 belongs, the national code does not always follow directly the serial number in the message, and in such case, a part of the message transmitted by the intraoffice transmitter 2613, before the national code, must also be stored in the register 2617. At any rate, the intraoffice transmitter 2613 again stops its operation, after it completed the transmission of sufficient information (in ordinary case, the national code only) for identifying the earth station in the destined area where the telegraph should be relayed. The register 2617 having stored said data in it, controls the incoming trunk 2615, through the register link 2616, and gives a predetermined voltage to one of the control lines connecting between the incoming trunk and the control unit 2620. The controller 2620 which is constantly keeping supervision over the voltage on these control lines reaching from the entire incoming trunks 2615, from the positions and the voltages on the control lines, recognizes said register 2617 in said operating condition, and also recognizing the number of the incoming trunk, controls said register 2617 through the control line which connects the control unit and the incoming trunk 2615, the incoming trunk 2615 and also the register link 2616, and receives the coded information stored in the register 2617 through the information line connecting the register 2617 and the controller. Then, the controller 2620, after adding this incoming trunk number and terminating country code with the serial number, station number of the originating earth station, discrimination code showing that the information pertains to a newly originated call, and also another discriminating code showing it is a telegraph call and arranging all of them in a predetermined format (hereinafter request for channel assignment just as in the case of the telephone exchange system), and sends this to the originating data terminal 2621. This originating data terminal 2621 is exactly the same as the originating data terminal 217 used in the preceding explanation for the telephone switching system. Further, the modulator-demodulator 2623, the transmitter-receiver 2624 and the antenna 2625 are all exactly the same as the first modulator-demodulator 218, the transmitter-receiver 222 and the antenna 223 respectively shown in FIG. 2. This request for channel assignment is transmitted to the central control station 301, shown in FIG. 3 and its process is exactly the same as those explained before with the embodiment of the telephone switching system. The only difference is that the kind of channels to be assigned for this telegraphic call is an idle time slot constituted on the time division multiplex channels, and that the only data required for the central control station 301 to select the destination is the national code, since the telegraphic exchange system herein described is constituted with the message switching system.

Referring to FIGS. 26, 3 and 27, the central controller 315 arranges the number of the time slot, the outgoing trunk number in the terminating earth station, the incoming trunk number in the originating earth station and the above described serial number in a predetermined format (hereinafter channel assignment to the terminal earth station) and sends this information to the controller 2719 through the wireless channel assigned for this purpose, the antenna 2724 of the terminating earth station 2701, the transmitter-receiver 2723, the modulator-demodulator 2722 and the terminating data terminal 2720, all in the exact same manner as in the case of the first embodiment. The controller 2719 reads out the received channel assignment to the terminal earth station and discriminates the required outgoing trunk 2716, and for the purpose of assigning the assigned time slot to the outgoing trunk 2716, gives the number of the time slot and the number of the outgoing trunk 2716 to the time-slot-assigning unit 2718, and also gives the number of the above mentioned originating incoming trunk and the serial number to the serial number comparator 2712. The controller 2719 after confirming that these operations are performed properly, sends the central control station 301 a signal to indicate that the preparation for reception of the telegram is completed (hereinafter terminating channel assignment answer signal) through the terminating data terminal 2720, modulator-demodulator 2722, transmitter-receiver 2723, antenna 2724 and the channel assigned for the purpose in the wireless channel. If the intraoffice reperforator 2715 is unable to receive information for any reason, the controller 2719 recognizes this through the outgoing trunk 2716, and must immediately notify the central control station about this inability of reception as the terminating channel assignment answer signal. At the central control station 301, the central controller 315 reads out said channel assignment answer signal, and if the content of this signal indicates inability of reception, it will select another idle outgoing trunk and sends to the controller 2719 of the terminating earth station 2701 a new terminating channel assignment information. On the other hand, if the content of the terminating channel assignment answer signal indicates that the preparation for reception has been completed, the central controller 315 arranges the number of the time slot, the new channel assignment order, and the number of the incoming trunk in the originating earth station, in a predetermined format (hereinafter originating channel assignment data) and gives this information to the controller 2620 in the originating earth station 2601 through the channel assigned for this purpose, the antenna 2625, the transmitter-receiver 2624, the modulator-demodulator 2623, the originating data terminal 2621. The controller 2620 reads out given originating channel assignment data and after discriminating the incoming trunk 2615, gives the number of the incoming trunk 2615, the number of the time slot and the new assignment order to the time slot assigning unit 2619, for the purpose of assigning the allocated time slot to the incoming trunk, and at the same time, starts the register 2617 through the incoming trunk 2615.

Referring to FIG. 28, there is illustrated the time slot assigning unit 2619 in the originating earth station 2601. The illustrated one is an embodiment of the time slot assigning unit 2619 comprising mainly the magnetostrictive delay line memories 2821 and 2822, the temporary memories made of the flip-flops, 2811, 2812, and 2823, the clock counter circuit 2823, etc. and it is obvious that the same device can be constructed utilizing magnetic core stores. Explaining in more detail with FIG. 28, when the controller 2620 in the originating earth station 2601 gives the above-mentioned number of the incoming trunk, new assignment order and the time slot number on the input terminals 2802, 2803 and 2805 of the time slot assigning unit 2619 respectively, and these are stored in the trunk number memory 2811, order storing unit 2812, and the time slot number memory 2813, the clock counter circuit 2823 completes its one cycle with the same period as that of one frame of the time division multiplex channel, and is operated by continuous feeding of pulses generated by a pulse generator (not shown) to the input terminal 2807 of the clock counter circuit 2823. The frame synchronization of the clock counter circuit 2823 is achieved by applying frame-synchronizing signal supplied from the data terminal in the same earth station to the frame-synchronization terminal of the clock counter circuit 2823, as in the case of the data terminal. The first comparator 2820 compares the content of the time slot number memory 2813 with the output of the clock counter circuit 2823 and at the instant when the two values coincide, gives the output of "1" to the first inhibit gate 2819. In other words, said output "1" is produced at the instant of the time slot given by the controller 2620 in the originating earth station 2601, through the time slot number memory 2813. The order storing unit 2812, when the new assignment order is given to the input terminal 2803, stores said order and gives the output "1" to the first inhibit gate 2819. The magnetostrictive delay line memories 2821 and 2822 possess a delay time equivalent to one frame period mentioned previously, and their storing capacities are equivalent to the number of the time division multiplex channel i.e. the number of time slots. The magnetostrictive delay line memory 2821 to be used for storing status of time slots (hereinafter time slots status memory) is the memory unit of one bit, and indicates the time slot is busy when the output is "1" and not busy when the output is "0." Since the newly assigned time slot was not busy until that time, the time slot status memory 2821 delivers output "0" at the instant of said time slot, and delivers "1" to the first inhibit gate 2819. Accordingly, the first inhibit gate 2819 will have on its three inputs all "1" at the instant of said time slot, thereby giving the selection circuit 2818 the output "1," and the selection circuit 2818 in turn gives the trunk number stored in the trunk number memory 2811 to the input terminal of the magnetostrictive delay line memory 2822 for storing the trunk number. The first inhibit gate 2819 simultaneously gives OR circuit 2814 the output "1," and the OR circuit 2814 gives the second inhibit gate 2815 the output "1," the output of the third inhibit gate 2816 being normally "1," so the second inhibit gate 2815 giving to the time slot status memory 2821 the output "1." Thus, the fact that the time slot is in busy status is stored in the memory unit 2821. At the sequential instant exactly one frame period after the instant of said time slot, the output of the time slot status memory 2821 is "1," and the selecting circuit 2818, at this time, inhibits the trunk number stored in the trunk number memory 2811, and sends the output of the magnetostrictive delay line memory 2822 for storing the trunk number, that is, the trunk number which was written in the memory 2822 one frame period before, to the input terminal of said 2822. The time slot status "1" is again written in the time slot status memory 2821 through OR circuit 2814, and thus the trunk number which is assigned to said time slot thereafter repeats previously mentioned circulations. Accordingly, at the instant of said time slot in each one frame period, the time slot assignment unit 2619 gives the trunk number to the multiplex speed converter through the trunk number assigning terminal 2806. In the above explanation, it was postulated that the time slot assignment unit 2619 cannot be burdened with two or more time slot assignment orders of the time slot clear orders later described, during one frame period, and this can be easily attained by the controller. If it is desired to process two of the above mentioned orders during one frame period, a plurality of circuits or equipments other than the magnetostrictive delay line memories 2821 and 2822 and the clock counter circuit 2823 should be provided.

Referring now to FIGS. 26 and 27, the time slot assigning units 2619 and 2718 are respectively located at the originating earth station 2601 and the terminating earth station 2701, having the same construction, and they are fed by the controller 2620 and the controller 2719 with the information regarding the incoming trunk number, new assignment order and the time slot number; and the outgoing trunk, new assignment order and the time slot number respectively. The time slot assigning units 2619 and 2718 give thus assigned incoming trunk number and outgoing trunk number to the multiplex speed converter 2618 and 2717 at the sequential instants of respectively assigned time slots as described before, and the former unit actuates the modulator 2622 at the instant of said time slot.

Referring to FIG. 29, there is illustrated one embodiment of multiplex speed converter 2618 in the originating earth station 2601, mainly comprising the temporary memory 2913, receiving allotter 2916, concentration allotter 2918 and decoder 2919. The function of this unit 2618, is having the message input terminal 2902 connected with the previously described incoming trunk and receiving the messages to be sent from the originating earth station, and also by that, the time slot assignment terminal 2903 receives the time slot assignment data from the time slot assigning unit, to concentrate the messages to be sent in the assigned time slot, and to send out to the modulator 2622 through the multiplex channel 2904.

Referring also to FIG. 26, when the register 2617 is started by the controller 2620 through the incoming trunk 2615, the information stored in said register, namely, the incoming trunk number previously described, the serial number of the telegraph, the information sent from the intraoffice transmitter 2613 before the national code is received in some type of messages and stored in the register 2617, and the terminating nation code, are altogether sent to the multiplex speed converter 2618, and then the register 2617 is reset at the same time that the intraoffice transmitter 2613 is actuated and resumes the transmission. The transmission line that connects the register 2617, the intraoffice transmitter 2613 and the multiplex speed converter 2618 may be either of multiwire type or single-wire type, but in this explanation, a single-wire type will be considered.

Referring again to FIG. 29, in the multiplex speed converter 2618, when the first pulse is received at the message input terminal 2902, the sampling pulse generator 2915 is started and generates sampling pulses of a predetermined interval corresponding to the intraoffice transmission speed. The sampling pulse generator 2915 is of the same composition with the receiver 1615 in the data terminal, and generates sampling pulses at the center of each bit counted from the rising up point of the start pulse of one word (in the international practice, one word comprises one unit of the start pulse, five units of the information bits and 1.4 units of the stop pulse). The sampling pulse generator 2915 confirming first that the start pulse indicated by the first pulse in said sampling pulse row is "1," sends this sampling pulse train to the sampling gate 2911 and the receiver allotter 2916. By controlling the receiving allotter gate 2912, the receiving allotter 2916 proceeds to store the information bits which are sampled by the sampling gate, in the predetermined position of the temporary memory 2913.

Although it is not used in this embodiment of the telegraph exchange system, but in the telex system or the like, the supervisory signal must be transmitted in a coded form. However, in the five-unit code, entire combinations of the code are used for message words, and no spare combinations for the supervisory signal are left. Therefore, if it is desired to transmit the supervisory signal in coded form in the time division multiplex channel used for the telegraphic circuit in this invention, a six-unit code will be used, and by making its sixth unit to "1" leaving the first five units in the conventional five-unit code form, the supervisory signal must be discriminated from the message words whose sixth unit is "0."

Referring again to FIG. 29, the sampling pulse generator 2915 continuously supervises the sixth unit to see if it is "0" or "1." If the sixth unit of the input signal arriving from the message input terminal 2902 through the sampling gate 2911 is "0," it judges that the input code is the message code in the five unit. On the other hand, if the sixth unit of the input is "1," it judges that the input code is the supervisory code in which the supervisory signal is converted into a code form whose sixth unit is "1," and after confirming the stop pulse following the sixth unit, the message codes and supervisory codes are accurately stored in the temporary memory 2913.

Referring to FIG. 30, an example of waveform of one word of message to be transmitted is shown by A and the corresponding sampling pulse by B. C indicates the time relation between each word and the time slot in a case several words are transmitted in succession, while D represents a certain time slot. E shows the time relation with the time slot involved in the case where the message is converted again into a low-speed message at the terminating earth station. FIG. 30 indicates a case where the message C in 50 bauds is transmitted with three words in one time slot in a frame, and one frame of this telegraphic channel is decided as $$To/2=3 \text{ words}\times 7.4 \text{ bits}\times 20 \text{ m.sec.}=444 \text{ m.sec.}$$

Therefore, taking the multiplicity of the multiplex channel as 111, the width of one time slot will be 4 msec. Transmitting in this 4 msec., 3 words × 6 bits = 18 bits of information bits, 1 start pulse bit for the entire 18 bits, 2 bits for the stop pulse, and 3 bits for the guard time, in all 24 bits, the transmission speed V of the multiplex channel will be:

$$V=24/4=6000 \text{ bauds}$$

This can be easily realized utilizing a channel having about 15 kc. frequency band. Shown in the above was a case where 3 words in a lump were transmitted, but it is of course possible to shorten its frame length and transmissions by every one word or every one bit. However, if the frame length and the width of the time slot are shortened, considering the guard time for each slot, the transmitting capacity of this multiplex channel will be decreased.

Referring to FIG. 29 and also FIG. 30, when the incoming trunk number is delivered from the previously mentioned time slot assigning unit 2619, through the time slot assignment terminal 2903, to the decoder 2919 at the instant of the time slot to be assigned, the decoder 2919 immediately reads out said incoming trunk number, and gives the starting circuit 2917 corresponding to the incoming trunk a time slot pulse whose pulse width is equal to the width of the time slot (in this example 4 msec.). This is shown by D in FIG. 30. The starting circuit 2917 receives from the receiving allotter 2916 an information about what number of words are stored in the temporary memory 2913 (hereinafter stored words information), and comparing these with said time slot pulses, judges that what number of words can be sent in the next time slot (hereinafter transmitted words information). In FIG. 30 C, the first word stored in M1 and the second word stored in M2 of the temporary memory 2913 are shown to be transmitted in a time slot of the second frame as shown in FIG. 30 D. Thereafter, the starting circuit 2917 delivers the concentrating allotter 2918 said "transmitted words information" and the time slot pulse of the second frame. The concentrating allotter gate 2914 controlled in accordance with the transmitted words information of the concentrating allotter 2914 sends out start pulse, information bit, and stop pulse to the multiplex channel 2904 at the instant of the time slot pulse in the second frame with a transmission speed of 6,000 bauds. In FIG. 30, only first and second words are transmitted in the time slot of the second frame. In the same manner, the third and fourth words are transmitted in the time slot of the third frame, and the first, second, and third words stored in M1, M2, M3 in the temporary memory 2913 are transmitted in the time slot of the fourth frame.

Continuing the reference to FIG. 29, in the above explanation, the transmission speed of the message to the input terminal 2902 of the multiplex speed converter 2618 was assumed to be 50 bauds exactly, but according to the recommendation of C.C.I.T.T., a fluctuation less than ± 0.75 percent is allowed. Consequently, if the transmission speed is very fast, it will cause an overflow of, in the worst case, $$1\times\frac{0.75}{100}=0.0075$$

word per word. However, the fluctuation of transmission speed (6,000 bauds in this example) in this multiplex transmission can be sufficiently minimized by the use of crystal oscillators or the like, and hence considered negligible. In the case of 0.0075 overflow per word, if one more "one word memory" is added to the temporary memory 2913, even if the message is transmitted from message input terminal 2902 to multiplex speed converter 2618 with the continuous transmission speed of (50 + 0.75 percent) bauds, the temporary memory 2913 will not overflow within the limit of 1/0.00075 = 133 words.

Consequently, with reference to FIG. 26, the incoming trunk 2615 only needs to control the register 2617 and the intraoffice transmitter 2613 so as not to transmit continuously more than 133 words, i.e. to provide a quiescent time equal to one word transmission time after transmission of every 133 words. On the other hand, if the transmission speed of input message is slow, say (50 — 0.75 percent) bauds for instance, there will be no problem because the multiplex speed converter 2618 automatically sends out one word blank for every 133 words. The concentration speed of the multiplex speed converter 2618 is in the above example 444 msec. for three words, i.e. 50 bauds, but by adjusting this value to be (50 + 0.75 percent) bauds so as to agree with the worst transmission speed of (50 + 0.75 percent) bauds for the input message, there will be no input message overflow at the multiplex speed converter 2618 in the originating earth station 2601. In this case, however, the message overflow in the multiplex speed converter 2717 in the terminating earth station 2701 becomes a problematical amount, so that this would not be the solution. The concentration speed of the multiplex speed converter 2618 may take a value other than 50 bauds, say 100 bauds, the same as the normal intraoffice transmission speed or else, but in any case, there will be no problem at all if this value is agreeable with the speed of intraoffice transmitter 2613 of the originating earth station 2601 shown in FIG. 26 and also of the intraoffice reperforator 2715 of the terminating earth station 2701 of FIG. 27.

Again referring to FIG. 26, when the time slot assignment unit 2619 starts the multiplex speed converter 2618 and the modulator 2622 at the time instant of the time slot designated by the controller 2620, the multiplex speed converter 2618 sends to the modulator 2622, after the speed conversion in said manner, the message which was beforehand transmitted by register 2617 and intraoffice transmitter 2613 having been started by the controller 2620 through incoming trunk 2615. The modulator 2622 permits transmission of the carrier wave only while the instant of the time slot which was started, and modulates said message which was speed-converted, and then sends out to the wireless channel 2602 through the transmitter receiver 2624 and the antenna 2625. This modulated message is received by the entire earth stations belonging to this particular telegraph exchange system.

Again referring to FIG. 27, when the time slot assignment unit 2718 starts multiplex speed converter 2717 at the instant or time position of the time slot designated by controller 2719 in said manner, the multiplex speed converter 2717 receives in said time slot the message demodulated by demodulator 2721 through antenna 2724 and transmitter-receiver 2723, and then performs speed conversion. It is evident that this multiplex speed converter 2717 of the terminating earth station 2701 may be of the same composition as the embodiment on multiplex speed converter 2618 in the originating earth station 2601 shown in FIG. 29. The message speed-converted by the multiplex speed converter 2717 is reperforated by the intraoffice reperforator 2715.

Referring to FIG. 26, again, when the intraoffice transmitter 2613 completes transmission of one message, the incoming trunk 2615 recognizes the completion of the transmission by the end code of the message, and while sending back the release or clearance-guard signal to the intraoffice transmitter 2613, gives the clear-forward signal to the controller 2620. The controller 2620 always supervises the voltages of all the control lines, and recognizes from the position and voltage of the control lines, said incoming trunk 2615 requesting for release and also the equipment number of the incoming trunk 2615, and then gives said incoming trunk number and clearing signal to the time slot assignment unit 2619 so as to clear the time slot assigned to said incoming trunk 2615.

Referring to FIG. 28, when the controller 2620 in the originating earth station 2601 gives said incoming trunk number and the clearing signal to each of the input terminals 2802 and 2804 of the time slot assignment unit 2619, the order memory 2812 gives "1" to the third inhibit gate 2816, and the second comparator 2817 gives "1" to the other input terminal of said third inhibit gate 2816 at the instant when the output information of the trunk number memory 2811 agrees with the output information of the magnetostrictive delay line memory 2822 memorizing the trunk number i.e. at the instant of the time slot which should be released. As the result, at this instant the third inhibit gate 2816 gives the output "0" to the second inhibit gate 2815, and the latter gives "0" to the time slot information memory 2821. In this manner, an idle status of the time slot is memorized.

Returning to FIG. 26, the controller 2620 directs through the control line the particular incoming trunk 2615 to release. The incoming trunk 2615 directed to release after ceasing the sending out of the clear-guard signal. The controller 2620, after having directed the incoming trunk 2615 to release, arranges in a predetermined format the information such as the equipment number of the incoming trunk 2615, the station number of the originating earth station, and an identification code indicating that the information pertains to clearing of the telegraphic call (hereinafter originating clear signal), and sends this to the central control station 315 in quite the same manner as previously explained in connection with the channel-assigning data. On the other hand, referring to FIG. 27, at the terminating earth station 2701, the outgoing trunk 2716 after recognizing the completion of reception by the reception of the end code in the message, gives the controller 2719 the clear-forward signal. The controller 2719 gives the outgoing trunk number and the clear order to the time slot assigning unit 2718, in order to clear the time slot assigned to the outgoing trunk 2716, in the same manner as was explained in the case of the originating earth station 2701, and the time slot assigned is cleared in the time slot assigning unit 2718 in the same manner as described before. Thereafter, the controller 2719 compiles the terminal clearing signal in the same manner as described for the originating earth station, and transmits them to the central controller 315. The central controller 315, after recognizing that this telegraphic call has been cleared from the "originating clearing signal" and the "terminating clearing signal," rewrites the corresponding memories for this time slot within the status memories stored in the temporary memory 316 to "blank," so that it can be used for other communications. As for the memories for the incoming and outgoing trunks in the originating earth station and the terminating earth station, the central controller 315 rewrites them to "-blank" after the expiration of the guard time provided for relays of their own and related apparatuses, so that they are available for other communications.

Referring to FIG. 27, at the terminating earth station 2701, when a telegraph call is received in the intraoffice reperforator 2715, the needle of the waiting number indicator 2714 is advanced one step by the end code on the telegraphic message, and then the line transmitter 2713, being directed by the waiting number indicator 2714, transmits the number of the incoming trunk in the originating earth station 2601 and the serial number of the message both prefixed on the message of said telegram, and ceases temporarily. The serial number comparator 2712 compares said incoming trunk number and said serial number with the incoming trunk number and the serial number previously given by the controller 2719 and stored in the comparator 2712 itself, and when they are confirmed to be correct, it actuates the serial number adder 2711. The serial number adder 2711, thus actuated, sends out another serial number particular to the interoffice trunk line 2703 connecting the terminating earth station 2701 and the terminating gateway terminating station (not shown). The line transmitter 2713, thereafter, sends out the message following the serial number on said trunk line 2703, and ceases the transmission after detecting end code of the message. At the terminating gateway station, the reperforator can receive the message and process the telegraph exactly in the same manner as explained above. If the serial number comparator 2712, while comparing the incoming trunk numbers and the serial numbers, detected a disagreement, it immediately gives alarm indication and halts the process thereafter. Since the serial number comparator 2712 is simultaneously indicating the incoming trunk number and the serial number, which were previously given by the controller 2719 and stored in itself, on the discharge tube numeral indicator or the like, the operator can see this and judge the originating station and take adequate measure such as request for retransmission if necessary, through the operator's channel. As for the nature of the fault which has happened, the operator judges it by checking the tapes stored between the intraoffice reperforator 2715 and the line transmitter 2713 and also from said numbers stored in the serial number comparator 2712. Since the numbers stored in the serial number comparator 2712 were previously given from the controller 2719 and as explained before, are transmitted between the central control stations and each earth station through the control data terminals having a function of error-free transmission, hence the percentage of errors contained in the control information is far less than those contained in the messages. Therefore, by these procedures any fault such as mistransmission or dropping out of telegrams in the exchange system according to this invention can be prevented.

In the embodiment above explained, one telegraph was switched and transmitted from one originating earth station 2601 to one terminating earth station 2701, but a function such as so-called broadcast telegraph, can also be easily added to this embodiment. Heretofore, the broadcast telegraphs have been utilized mainly by news agencies and newspaper companies for sending correspondence, and by government agencies for exchanging information. Their transmission were mainly by shortwave wireless circuits, and were transmitted in given times in particular directions, and their receiving sides were not single but plural. The conventional telegraph exchange system utilizing the shortwave wireless circuits are fundamentally employing so-called point-to-point systems, by which the telegraphs are exchanged from one originating station to another terminating station on a one by one basis. So, the broadcast telegraph is a special existence among the shortwave wireless circuits, and sometimes requires a plurality of antennas for broadcasting into different directions.

However, the telegraph exchange system according to this invention is not fundamentally the one in which two stations are connected one-by-one with a fixed circuit, but it possesses a function to establish a required connection through a circuit (in the embodiment previously described, through a time slot) between the two stations at any time it is required. In another viewpoint, a telegraph transmitted form a certain originating earth station according to this invention, can be received by all the earth stations belonging to the exchange system, but in the ordinary case, being received by a particular earth station assigned by the central control station. Accordingly, by adding slightly more functions required to both central control station and originating earth station, a broadcast telegraph circuit can be constructed, and furthermore, without using any special equipment, the broadcast telegraph circuit connecting any number of stations at any required time can be realized. For instance, a call originator requests a certain subscribed office (originating office) to transmit an international telegraph, and said originating office, judging that it is to be transmitted to a plurality of subscribed offices in a plurality of areas (hereinafter plural terminating office) through the exchange system according to this invention, the operator of the originating office perforates the telegraph in the predetermined form on the tape with a keypunch board. In this case, differing from the telegraph to be transmitted to a single terminating earth station (hereinafter telegraph terminating a single country) as explained before, it is requested to add a code designating that the telegraph is to be transmitted to a plurality of earth stations, and also the country codes to indicate a plurality of terminating countries. The intermediate switching system, starting from the originator, the national network, the international gateway station and to the originating earth station 2601, may be as those described in the embodiment above, or may be other type of ordinary exchange system. However, it is obvious that the operation of the exchange system according to this invention is not effected by these intermediate switching systems. Further, the process on the telegraphic call at the originating earth station 2601 is exactly the same as the process in the case of a telegraph terminating to a single country, except that an identification code showing said message is to be transmitted to a plurality of terminating countries, and a plurality of terminating country codes are added to the request for channel assignment made by the controller 2620. Moreover, the steps in the transmission of the request for a channel assignment signal from the originating earth station 2601 to the central control station 301, is also exactly the same when a telegraph terminating in a single country is made. The central controller 315 selects one idle time slot for this call, and sends or receives the terminating channel assignment information and the terminating channel assignment answer to or from plural terminating earth stations, the same as the processes in the case of the telegraph terminating in a single country. At each of the terminating earth stations 2701, the process on this call is exactly the same as the process on the telegraph terminating to a single country. The central controller 315 receives and reads the terminating channel assignment answer from all terminating earth stations, and after confirming that all said signals show "proceed-to-send," delivers to the originating earth station 2601 the originating channel assignment information exactly the same as that for the telegraph terminating to a single country. The subsequent process for the telegraphic call in the originating earth station 2601, and the clearing process on the particular call at each of the terminating earth stations are exactly the same as in the case of the telegraph terminating to a single country. Thus, the plural terminating earth stations 2701 can simultaneously receive the telegraph transmitted from a single originating earth station 2601 by using a single time slot as its communication path, and in this manner, it is possible to constitute broadcast telegraphic circuits among random earth stations at the required time.

Referring to FIGS. 3 and 26, when the central controller 315 becomes aware of, from the contents of the temporary memory 316, the channels of the category designated by the request for channel assignment are all busy, the central controller 315 does not process telegraphic calls until the channels become idle, and by this, the initiation of subsequent telegraphic calls is automatically restrained. Of course, for the use of an emergency telegraphic call, the central controller 315 can easily reserve a special channel. On the other hand, in case the central controller 315 discovers that outgoing trunks of the designated terminating earth station are all occupied, the central controller 315, at first, postpones processing of said call and when said outgoing trunk is still occupied, even after the predetermined time duration, the central controller 315 compiles the originating incoming trunk number which is contained in the request for channel assignment previously received, and a code predetermined for indicating that the requested connection is not available, in a predetermined format, and sends it back to the controller 2620 of the originating earth station 2601 in the method equivalent with that which was explained several times with other control data. The controller 2620, by controlling the incoming trunk 2615, causes it to transmit the said telegraph to the ordinary overflow position (not shown) so that the telegraphic calls following that particular call can be processed promptly. On said telegraph transmitted to the overflow position, an action such as retransmission may be taken by the operator in the originating earth station 2601.

As may be understood from the explanation above, it will be evident that the telegraph exchange system utilizing an artificial satellite as just described, can produce the same effectiveness as that processed by the telephone exchange system utilizing the same artificial satellite in accordance with this invention which was previously described.

In this embodiment, for the mere purpose of simplifying the explanation, a structural arrangement, where including a number of earth stations and a single central control station independent with those earth stations, is described. However, it is of course possible to install the central control station in the same building of a certain earth station as in the case of the telephone exchange system according to this invention, and by doing so, an overall economy of the system can be obtained.

In the embodiment hereinbefore described for simplification, the gateway station and the earth stations which are the elements of this invention, have been described as they are located at different places and they are interconnected by means of the interoffice trunk lines. However, if both of said stations are located at the same place, much economy will be obtained by unifying the functions of said gateway stations and the earth stations.

With reference to FIG. 31, there is illustrated a block diagram of one example of the case where the originating gateway station and the originating earth station are combined. The component equipments of the combined station 3103 comprise, as the inherent equipments for the originating gateway station, the typing reperforator 3112 which receives the telegraph transmitted from the line transmitter 3101 in the originating office through the national telegraph network 3102; the board 3111; the intraoffice transmitter 3113; the incoming trunk 3114; the incoming rotary switch 3115; the outgoing rotary switch 3116; the outgoing trunk 3119; the serial number adder 3120; and the intraoffice reperforator 3121, and as the inherent equipments for the originating earth station, the waiting number indicator 3123; the intraoffice transmitter 3122; the incoming trunk 3124; the register link 3125; the register 3126; the multiplex speed converter 3127; the time slot assignment unit 3128; the controller 3129; the control data transmission terminal 3130; the modulator 3131; the modulator-demodulator for the control data 3132; the transmitter-receiver 3133; and the antenna 3134; and in this case, one typing perforator, one line transmitter and one serial number comparator are eliminated. Therefore, the time required to relay a telegraph from an originating gateway station to an originating earth station is shortened and the comparison of serial numbers can be omitted. It is also apparent that the same combination or unification can be accomplished between the terminating earth stations and the terminating gateway stations.

In the second embodiment, description of the receiving equipment in the originating earth station 2601, and the sending equipment in the terminating earth station 2701 are omitted for simplification, but the functions and the mutual relations of these apparatuses will be readily understood.

In the second embodiment, one frame was taken to be 444 msec. but when the intraoffice transmitter operating 7.5 bits per word is employed, it will be appropriate to take one frame $$To/2 = 3 \text{ words} \times 7.5 \text{ bits} \times 20 \text{ m.sec.} = 450 \text{ m.sec.}$$

In this case, one frame $To$ of the control data channel described before will be properly decided as $$To = 450 \text{ m.sec.} \times 2 = 900 \text{ m.sec.}$$

when considering the process time of the control data at each station, transmission time of the electromagnetic waves, and necessary time for the error detection. In general it would be better to put $To$ as $$To = \text{bit numbers of one word} \times \text{time length for 1 bit} \times N$$

and the natural integer N will be decided so that the $To$ becomes larger than four times the maximum propagation time of electromagnetic wave between any of the earth stations and the stationary satellite.

Referring now to FIGS. 32 to 35, there is indicated the third embodiment for the Telex exchange system using the time division multiplex channel. While the ordinary telegraph exchange system utilizes the message switching system, the Telex exchange system uses the line exchange system, the same as the telephone exchange system. Accordingly, the third embodiment for the Telex system is similar to the first embodiment of the telephone exchange system rather than the second embodiment for the telegraph exchange system. The significant difference of the third embodiment from the first embodiment for the telephone exchange system is that the latter uses a frequency division multiplex channel, though the former uses a time division multiplex channel. Thus, in the third embodiment for the Telex exchange system, how to transmit the supervisor signal and the selecting signal, both of which are not used in the second embodiment of the telegraph exchange system, will be a problem.

Figure 32:
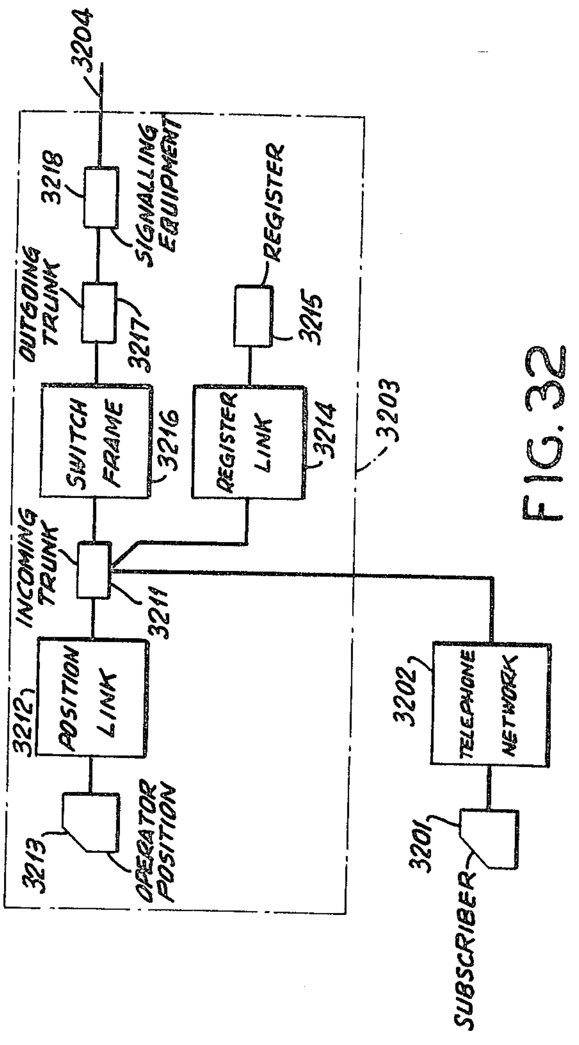

Referring to FIG. 32, there is shown for explanation, one example of the basic portion of a domestic Telex network used in one country, which can be easily constructed by ordinary practice. Assume that a certain subscriber 3201 (hereinafter called subscriber) wants to communicate with a subscriber in the designated area (hereinafter called subscriber) through the Telex exchange system according to this invention. Also assume that the semiautomatic exchange system is adopted in which a foreign exchange operator intervenes who is in the country to which the calling subscriber belongs. The calling subscriber, by dialing a certain number, is connected with the incoming trunk 3211 of the international Telex gateway station 3203 (hereinafter originating gateway station) through the national Telex network 3202, and further through the position link 3212, connected with the idle operator-position 3213. The operator at the operator-position 3213 accepts the calling subscriber's 3201 request and exchanges the connection, that is, connects the incoming trunk 3211 by the operation of the keyboard, with an idle register 3215 through the register link 3214. The register 3215 sends back the preceed-to-select signal to the operator-position 3213 through the register link 3214, and by means of, for instance, printing on the printer at the operator-position 3213, notifies the operator concerning the state of "ready for reception" for the selecting signal. When the operator knows that the register 3215 is ready for reception, immediately the numerical signal is sent out to select the called subscriber (consisting of international and national numbers of the called subscriber) by dialing, and it is stored in the register 3215. From this and other stored numerical signals, it is judged that the call should be connected through the Telex system according to this invention, the incoming trunk 3211 is connected with a proper idle outgoing trunk 3217 through a switch frame 3216. The outgoing trunk 3217 controls signalling equipment 3218 and sends out the call signal onto the interoffice trunk line 3204, to acknowledge to the next switching position the existence of a call.

Figure 33:
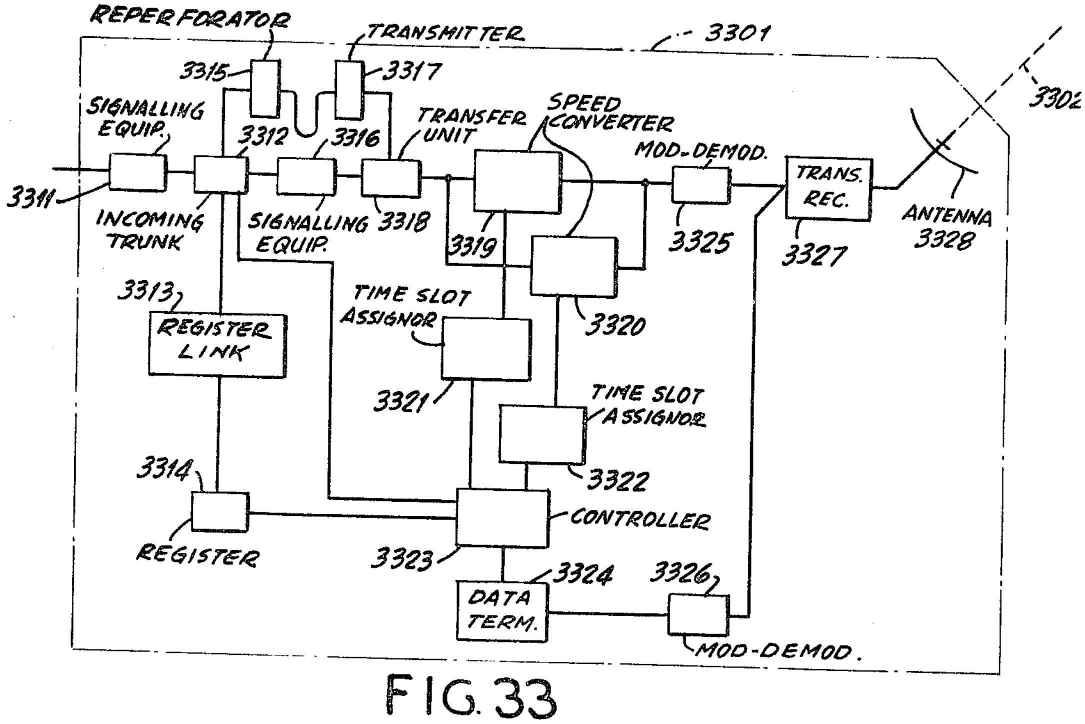

Referring to FIGS. 32 and 33, the earth station 3301, which constitutes one component of the Telex exchange system according to this invention (hereinafter originating earth station) is connected with said originating gateway station 3203 through the interoffice trunk line 3204, and the call arrived on this interoffice trunk line 3204 provides the input to the Telex exchange system according to this invention, and the exchanging operations from the time the calling subscriber 3201 originates the call until the time the call is connected to the originating earth station 3201 through the interoffice trunk line 3204, is described only as an example for simplification, and the operation of the Telex exchange system according to this invention is not influenced in any extent by the type of these ordinary exchanging operations. In the telegraph exchange system described in the second embodiment, the communication path was explained as the two-wire system, but in this embodiment for the Telex exchange system, the communication paths are again the four-wire type as in the case of the first embodiment for the telephone exchange system.

Referring to FIGS. 32, 33, at the originating earth station 3301 the signalling equipment 3311 detects the call signal from the former switching point, that is, the originating gateway station 3203, controls the incoming trunk 3312 and connects this to an idle register 3314 through a register link 3313. Then the incoming trunk 3312 controls the signalling equipment 3311 so that it sends back the proceed-to-select signal on the interoffice trunk line 3204. In the originating gateway station 3203, the proceed-to-select signal is detected by the signalling equipment 3218, which in turn controls the register 3215, through the outgoing trunk 3217 and the incoming trunk 3211, so that the register 3215 sends out the numerical signal stored in the register 3215, which is required for the selection of the called subscriber, over the interoffice trunk line 3204 and further to the next switching point. In the originating earth station 3301, the numerical signal sent from the former switching point is received in the register 3314 which has been connected with the incoming trunk 3312. On the way of this reception, when the register 3314 receives enough information to select the terminating earth station (in general cases, the international number of the called subscriber), through which the call should be exchanged, continuing to receive the rest of the numerical signal on one hand and on the other hand, the register 3314 controls the incoming trunk 3312, through the register link 3313, and gives a predetermined voltage to one of the control lines connecting the incoming trunk 3312 and the controller 3323. The controller 3323 always supervises these voltages on all of the control lines connected with all of the incoming trunks such as the incoming trunk 3312, and from the voltage and position of this control line, discriminates that the register 3314 is in the state above described and also the incoming trunk line number, controls the register 3314 through the control line connecting the controller 3323 and the incoming trunk 3312 and also through the incoming trunk 3313 and the register link 3312, and receives the numerical signal stored in the register 3314 through an information line connecting between the register 3314 and the controller 3323. Thereafter, the controller 3323, after adding the station number of the originating earth station and an identification code for the newly originated call to the incoming trunk number and the numerical signal for the called subscriber, and arranging all of these in a predetermined format (hereinafter request for the channel assignment), gives this to the originating data terminal 3324. This originating data terminal 3324 is exactly the same as the originating data terminal 217 used for the telephone exchange system previously explained, and also the first modulator-demodulator 3326, the transmitter-receiver 3327 and the antenna 3328 are all exactly the same as the first modulator-demodulator 218, transmitter-receiver 222 and the antenna 223 shown in FIG. 2. Further, the first time slot assigning unit 3321 and the first multiplex speed converter 3319 are exactly the same as the time slot assigning unit 2619 and the multiplex speed converter 2618 respectively which are used for the explanation of the second embodiment for the telegraph exchange system and shown in FIG. 26, and the second time slot assigning unit 3322 and the second multiplex speed converter 3320 are the same equipment as the time slot assigning unit 2718 and the multiplex speed converter 2717 shown in FIG. 27 respectively. Furthermore, the procedure in which the request for channel assignment is sent to the central control station shown in FIG. 3 and processed there, is quite the same as explained in the first embodiment for the telephone exchange system. However, the kind of the communication path to be assigned for the call, in this embodiment for the Telex exchange system, is the two idle time slots provided in the time division multiplex channel.

Referring to FIG. 3, together with FIG. 33, the central controller 315 which adds said incoming trunk line number received within the request for channel assignment in the originating earth station, to the time slots numbers, and the number of digits to be sent to the terminating gateway station, arranges these in a predetermined format (hereinafter channel assignment to the originating earth station), and sends out this data to the controller 3323 in the originating earth station, through the assigned path in the wireless channels, the antenna 3328 in the originating earth station 3301, the transmitter-receiver 3327, the first modulator-demodulator 3326, and the originating data terminal 3324 as in the case of the first embodiment of this invention. The controller 3323 reads out the given channel assignment to the originating earth station, discriminates the designated incoming trunk 3312, controls the incoming trunk 3312 through the control line connected to the incoming trunk 3312 in order to send out the call signal, which will be later described, from the second signalling equipment 3316. And on the other hand, the controller gives to the register 3314 connected to the incoming trunk 3312, an information about the digit numbers of the numerical signal to be sent to the terminating gateway station, and also, for the purpose of allocating the assigned time slot number $(i, j)$, to the incoming trunk 3312, gives the information including the time slot number $i$, the incoming trunk number, and the new assignment order to the first time slot assignment unit 3321, and further gives the information including the time slot number $j$, the incoming trunk number and the new assignment order to the second time slot assignment unit 3322. The time slot assignment units 3321 and 3322, as explained before with reference to FIG. 28, gives the incoming trunk number respectively to the multiplex speed converter 3319 and 3320 at the instant or time position of the assigned time slot. The second signalling equipment 3316 has the function to convert various kinds of supervisory signals into predetermined and corresponding supervisory codes, and also in the reverse way, convert from the various kinds of supervisory codes to the corresponding supervisory signals, and this equipment can be easily realized by means of the ordinary signaller, coder and decoders. The supervisory codes, as described hereinbefore, can be made of the six-unit code in which the sixth unit is always "1." The supervisory codes which correspond to the call signal (hereinafter called code) sent out from the second signalling equipment 3316 are conveyed through the transfer unit 3318 to the multiplex speed converter 3319, and at the multiplex speed converter 3319, they are transferred to high-speed codes at the instant of the time slot assigned in a manner as explained in the second embodiment for the telegraph exchange system in conjunction with FIG. 29, and transmitted to the stationary satellite 351, through second modulator-demodulator 3325, transmitter-receiver 3327, antenna 3328 and the wireless channel 3302, and again through the wireless channel 352 transmitted back to the terminating earth station 3401.

Figure 34:
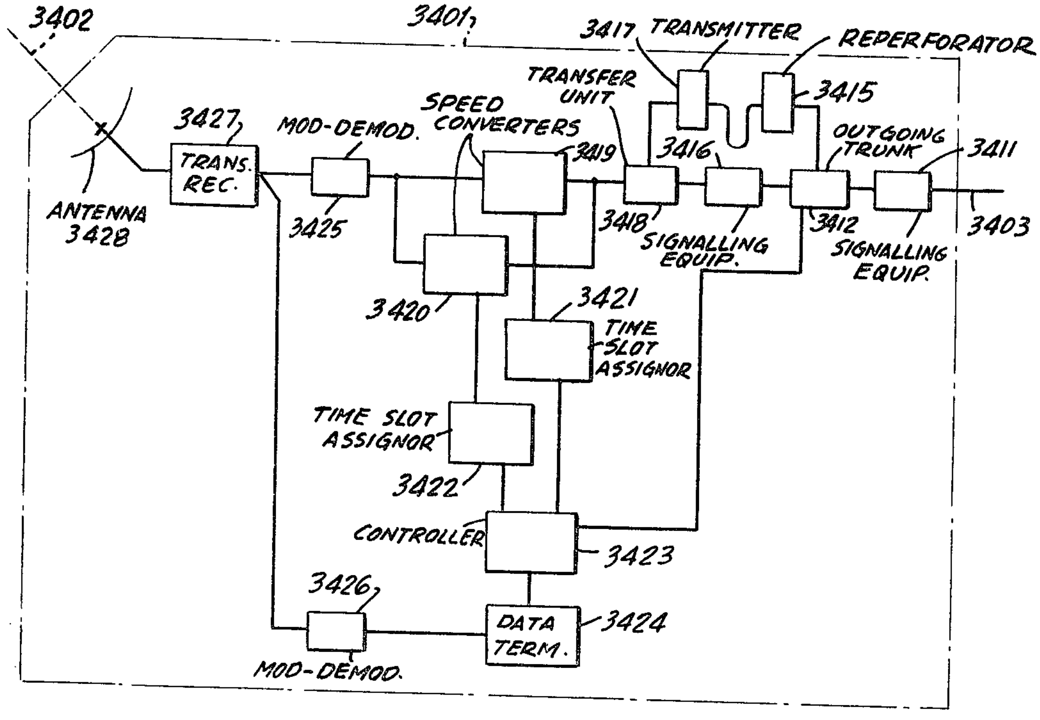

Referring to FIG. 34 together with FIG. 3, the central controller 315, as described above, arranges the two time slot numbers and the outgoing trunk number in the terminating earth station in a predetermined format (hereinafter called channel assignment to the terminating earth station), and this is sent to the controller 3423 through a communication path assigned for this purpose in the wireless channels, the antenna 3428 of the terminating earth station 3401, the transmitter-receiver 3427, the first modulator-demodulator 3426, the terminating data terminal 3424 etc., as in the case of the first embodiment. The controller 3423 reads out the channel assignment to the terminating earth station recognizing the particular outgoing trunk 3412, and for the purpose of assigning two time slots $(i, j)$ to said outgoing trunk, gives the time slot number $j$, the outgoing trunk number and the new assignment order to the first time slot assigning unit 3421, and also the time slot number $i$, the outgoing trunk number and the new assignment order altogether to the second time slot assignment unit 3422. The time slot assignment units 3421 and 3422, as described before, give the multiplex speed converters 3419 and 3420 the outgoing trunk number respectively at the instant of the assigned time slot. Then the call code sent out from originating earth station 3301 is received by the second multiplex speed converter 3420 in the terminating earth station 3401 at the instant of the time slot $i$, through the antenna 3428, the transmitter-receiver 3427, the second modulator-demodulator 3425, and after being speed converted, arrives to the second signalling equipment 3416 through the transfer unit 3418. The call code is further converted to the call signal at the second signalling equipment 3416, and the call signal is then sent over the interoffice trunk line 3403 through the outgoing trunk 3412 and the first signalling equipment 3411.

Referring to FIGS. 33 and 34 together with FIGS. 35 and 32, the call signal transmitted from the second signalling equipment 3316 in the originating earth station 3301, converted by means of the second signalling equipment 3416 in the terminating earth station 3401 and fed into the interoffice trunk line 3403 connecting the terminating earth station 3401 and the terminating gateway earth station 3503 is detected by the signalling equipment 3511 in the terminating gateway station 3503 and further actuates the incoming trunk 3512. The incoming trunk 3512 seizes one idle director 3514 through the register link 3513 and the director 3514 in turn seizes one idle register 3518 through the director link 3517 and thereafter operates the signalling equipment 3511 to send out the proceed-to-select signal. The proceed-to-select signal which arrives through the interoffice trunk line to the terminating earth station 3401, then passing through the first signalling equipment 3411, outgoing trunk 3412, is converted into proceed-to-select code by the second signalling equipment 3416, and the converted proceed-to-select code in conveyed to the first multiplex speed converter 3419 through the transfer unit 3418 to be converted into a high-speed signal at the instant of the assigned time slot *j*, and arrives to the originating earth station 3301 through the second modulator-demodulator 3425, the transmitter-receiver 3427, the antenna 3428 and the wireless channel 3402, and thereafter demodulated by the second modulator-demodulator 3325, speed-converted at the instant of the time slot *j* in the second multiplex speed converter 3320 and detected by the second signalling equipment 3316. Summarizing those above mentioned, through the telegraph and telephone exchange system in accordance with this invention, four-wire communication paths are provided between the incoming trunk 3312 in the originating earth station 3301 and the incoming trunk 3512 in the terminating gateway station 3503. Furthermore, when the second signalling equipment 3316 in the originating earth station 3301 detects the proceed-to-select signal sent from the terminating gateway station 3503, it controls the register 3314 through the incoming trunk 3312 and the register link 3313 and let it give numerical signal about the called subscriber which has been prepared to be sent to the terminating gateway station to the register 3518 of the terminating gateway station 3503 through said communication path and reset itself. The register 3314 has a function of ordinary dialing signal conversion, stores the dialing signals, and converts them to selection codes to send them out. At the terminating gateway station 3503, the incoming trunk 3512 is connected with outgoing trunk 3516 through the switch frame 3115 in accordance with ordinary Telex exchanging practices, and this is also connected with the called subscriber 3501 through the national Telex network 3502 in the terminating country. The register 3518 has an ordinary dialing code converting function to store the selecting code, converts them to dial signals and sends them out. When the called subscriber 3501 responds to the call and the call-connected signal is sent out, the signal is detected at the incoming trunk 3512 in the terminating gateway station 3503 through the national Telex network 3502, conveyed by the signalling equipment 3511 to the second signalling equipment in the originating earth station 3301 through the established communication path, and again by the first signalling equipment 3311, sent to the operator-position 3213 through the interoffice trunk line 3204, signalling equipment 3218 in the originating gateway station 3203, the outgoing trunk 3217, the switch frame 3216, the incoming trunk 3211 and the position link 3212, and printed out in the operator-printer. At this time, by the operation of the originating operator, said call-connected signal from the called subscriber is also transmitted to the calling subscriber 3201, and printed out in the calling subscriber's printer. Thus, the calling subscriber and the operator, after confirming, from the printed call-connected signal particular to the called subscriber, that the connection has been established correctly, starts transmission of message. Operations as above described are entirely the same as those in the international Telex exchange system and by no means specific to the telegraph and telephone exchange system according to this invention. Also, in the process of this call, transmission of a recall signal by which the originating operator demands intervention of auxiliary operator in the terminating gateway station, or a clearing signal which indicates reset of the called subscriber, and relevant control operations accompanying these are all similar to those in the ordinary international Telex exchange system and have no relation with the telegraph and telephone exchange system according to this invention as explained in the first embodiment of this invention. Preceding this operation, when the incoming trunk 3312 in the originating earth station 3301 receives the call-connected signal from the called subscriber 3501, the incoming trunk 3312 immediately switches the line so that the message from the calling subscriber is received in the reperforator 3315. The transfer unit 3318, after the message is received in the reperforator 3315, immediately starts the intraoffice transmitter 3317 and at the same time connects the intraoffice transmitter 3317 with the first multiplex speed converter 3319. Furthermore, the transfer unit 3318 controls the intraoffice transmitter 3317 so that it does not send out more than a predetermined number of words as previously explained in the second embodiment of this invention. Also in the terminating earth station 3401, when the outgoing trunk 3412 receives the call-connected signal from the called subscriber 3501, it immediately switches the circuit so that the message from the called subscriber 3501 can be received in the reperforator 3415. The transfer unit 3418, after the message is received in the reperforator 3415, immediately starts the intraoffice transmitter 3417 and also connects the intraoffice transmitter 3417 with the second multiplex speed converter 3420. Furthermore, the transfer unit 3418 controls the intraoffice transmitter 3417 so that it does not send out more than a predetermined number of words as was explained in the second embodiment of this invention.

Referring to FIG. 32 again, when the calling subscriber terminates his call, the connections in the national Telex network 3202 are successively reset from the former switching positions. The incoming trunk 3211 in the originating gateway station 3203 detects the reset of the former switching positions, urges the operator to reset next switching positions by the glow of the reset lamp on the operator-position 3213. When the operator indicates his intention to reset by the operation of the keyboard, this in transferred in the form of clearing signal to the incoming trunk 3312 of the originating earth station 3301, through the incoming trunk 3211, the outgoing trunk 3217 and the interoffice trunk line 3204. At the same time, connections in the relevant equipments to the call in the originating gateway station 3203 and also their interconnections are all reset, except the outgoing trunk 3217, to be used for other calls. At this stage, the clearing signal arrived on the interoffice trunk line 3204 constitutes the input for clearing operation of this Telex exchange system according to this invention and the operations starting from the reset of the calling subscriber 3201 to the arrival of the reset signal on the interoffice trunk line 3204, are described about one of the ordinary examples for simplification, and the operation of the Telex system according to this invention is not influenced by use of any other type of ordinary practices.

Referring to FIGS. 33 and 34, the clearing signal received on the interoffice trunk line 3204 is detected by the first signalling equipment 3311 in the originating earth station 3301, and notifies the incoming trunk 3312 of the reception. The incoming trunk 3312 controls the first signalling equipment 3311 to send back the clear confirmation signal continuously, operates, at the same time, the second signalling equipment 3316 to send out the clearing code, and then gives a predetermined voltage to one of the control lines connecting the incoming trunk 3312 and the controller 3323. The controller 3323 is always supervising all of these control lines and from the position and the voltage of the particular control line, discriminates that the incoming trunk 3312 is demanding to be reset and also the equipment number, resets the time slot $(i, j)$ assigned to this incoming trunk 3312, as explained in the second embodiment of this invention, and then directs the incoming trunk 3312 to reset through the control line. The incoming trunk 3312 thus directed to reset, discriminates that all relevant equipments in the originating gateway station are reset, from the vanishment of the clearing signal sent out from the originating gateway station 3203, stops sending out of the clear confirmation signal from the first signalling equipment and resets itself. The controller 3323, after directing the incoming trunk 3312 to reset, arranges the station number of the originating earth station and a discrimination code to indicate for the clearing signal in addition to the equipment number of this incoming trunk 3312 in predetermined format (hereinafter clearing signal to the originating earth station) and sends this signal to the central controller 315 in the same manner as described hereinbefore for the request for channel assignment. On the other hand, in the originating earth station 3301, preceding the reset of the time slot $(i, j)$, the clearing signal sent from the second signalling equipment 3316 is detected by the second signalling equipment 3416 in the terminating earth station 3401, whereby the outgoing trunk 3412 knows the reset of said call and sends out the clearing signal to the first signalling equipment 3411, and at the same time gives a predetermined voltage to a particular control line connecting between the outgoing trunk 3412 and the controller 3423. The controller 3423 recognizes that this outgoing trunk 3412 is demanding to be cleared and also the equipment number, from the voltage and the position of the control line, resets the time slots $(i, j)$ assigned to the outgoing trunk 3412, and then directs said outgoing trunk 3412 to reset itself through the control line. The outgoing trunk 3412 being directed to reset, stops sending out the clearing signal to the next switching position or the terminating gateway station 3503. The controller 3423, on the other hand, arranges the terminating release information as described in the originating earth station and sends this information to the central controller 315. The central controller 315 discriminates the release of call from said information from the terminating and originating stations, rewrites the time slot status memories of the two time slots assigned previously to the call into "blank" to be used for other calls, and also rewrites the status memories for the incoming and outgoing trunks in the originating and terminating earth stations into blank after some guard time for the incoming and outgoing trunks themselves and the relays or the like in their related equipments to be used for other purpose.

Referring to FIGS. 34 and 35, the clearing signals issued from the first signalling equipment 3411 in the terminating earth station 3401, is detected by the signalling equipment 3511 in the terminating gateway station 3503 through the interoffice trunk line 3403, whereby the incoming trunk 3512 can know the reset from the former switching positions and controls the signalling equipment 3511 to send back the clear confirmation signal and at the same time resets the switch frame 3515, the outgoing trunk 3516, the national Telex network 3502 in the terminating country, namely all of the connections about the called subscriber 3501. The incoming trunk 3512 thereafter by perceiving the resets of all related equipment and also from the stop of the clearing signal on the interoffice trunk line 3504 that all of the related equipment in the terminating earth station 3501 are reset, controls the signalling equipment 3511 so that it stops sending back of the clear confirmation signal and then resets itself. The resetting procedures of the next switching positions after the incoming trunk 3512 in the terminating gateway station 3503 have no relation with the Telex exchange system according to this invention and can be replaced with other types of ordinary practices.

Referring to FIG. 35, there is illustrated the case where the national Telex network 3502 is of so-called "end-to-end" signalling equipment system, and when the called subscriber 3501 is busy, the director 3514 by detecting that the called subscriber 3501 is busy by the reception of the busy signal from the called subscriber after the full digits of the called subscriber's number have been sent out from the register 3518, connects the incoming trunk 3512 with the service code sender 3519 through the register link 3517. The register 3518 is reset after it sends out the called subscriber's number. The service code sender 3519, by the direction of the director unit 3514, sends out a service code OCC which is ordinarily used to indicate "busy" condition of the called subscriber to the operator position 3213. In the same way, if the director unit 3514 receives a busy signal on the way of sending out the called subscriber's number from the register 3518 as described before, the director unit 3514, by judging that the trunk in the national Telex network 3502 is busy, at first resets the register 3518 and then connects the incoming trunk 3512 to the service code sender 3519 through the register link 3517, and controls the service code sender 3519 so that it sends out ordinarily used service code NC indicating that the trunk is "busy," to the operator position 3513. Or, if no signal is returned during a predetermined period after full digits of the called subscriber's number are transmitted, the service code DER indicating that the equipment of the called subscriber is out of order, and if in the case that the director unit 3514 judges that there is no such subscriber corresponding to the called subscriber's number, another service code NP indicating no corresponding number, is sent out from the service code sender 3519 to the operator-position by the control of the director unit 3514. In the case that the national Telex network 3502 is of so-called "link-by-link" signalling equipment system, the equipment such as the director unit, the service code sender unit, etc. are to be provided in the national Telex network, but anyhow, these are the problems only for the national Telex networks, and there is no relation to the Telex exchange system according to this invention.

Referring to FIGS. 3 and 33, when the central controller 315 finds out in the temporary memory 316 that the time slots to be assigned to a particular request for channel assignment are all occupied by other calls, or finds out that all of the outgoing trunks in the terminating earth station are "busy," the central controller 315 arranges the originating incoming trunk number contained in the request for channel assignment and a code indicating that the request for channel assignment is not possible, in a predetermined format, and sends this to the controller 3323 of the originating earth station 3301, in a manner several times explained for other control data. The controller 3323 controls the incoming trunk 3312 and sends back said NC code from the first signalling equipment 3311. The procedures to reset all of the equipments thereafter are all the same as those explained before about the first embodiment of this invention.

As is clear from the above explanation, the Telex exchange system utilizing an artificial satellite according to this invention, which is composed as described above, has the same effectiveness as that of the telephone exchange system utilizing an artificial satellite according to this invention.

In this embodiment, for simplification it is described as the central control station is constructed independently with other earth stations. However, as in the case of the telegraph and telephone exchange system according to this invention, it is possible to construct the central control station within the same building of one of the earth stations, and by doing so economization of the whole system can be obtained.

Also in this embodiment, it is explained that a gateway station and an earth station constituting one component of the Telex exchange system according to this invention are located each in different places and they are connected by an interoffice trunk line, but it is also clear that those two stations can be constructed in one place and economization also can be obtained by this unification as in the case of the telephone exchange system according to this invention.

In the third embodiment just described, explanation about the equipment to be used for receiving operation in the originating earth station 3301, and also the equipment to be used for sending operation in the terminating earth station 3401 are omitted for simplifying explanation, and the function and the interrelation of this equipment will be easily understood.

In the embodiment, it is explained as the operator sends out the subscriber's number by dialing, but this is of course possibly done by the teleprinter code, and by providing matching between these equipments, they are easily connected with the Telex exchange system according to this invention.

In this embodiment, it is also explained as utilizing "link-by-link" signalling equipment system, but "end-to-end" signalling equipment system can of course be utilized as in the case of the first embodiment. In this case, the director unit 3514, the service code sender 3519, etc., installed in the terminating gateway station 3501 in this embodiment, will be installed in the originating gateway station 3201, and thus installed director unit in the originating gateway station 3201 will supervise whole exchange operations in the next switching positions. Also in this case, after the incoming trunk 3211 has seized the director, by the demand of the operator in the operator position, the director unit seizes the register through the register link as it was explained in the terminating gateway station 3501 of this embodiment. But in this case, it is possible that the incoming trunk 3211 sends back so-called call confirmation signal to the request originating operator at the instant of the director's seizure, and thereby notifying the operator as by the glow of the indicator lamp, then at the instant of the register's seizure, sending back said proceed-to-select signal to the operator position 3213 and as by printing it on the printer, notifies the operator of the ready status for reception of the selecting signal, thereby sending back the answer signal in two steps. However, these are conventional practices in the Telex exchange system and constitute no part of this invention.

While the principles of the invention have been described in connection with specific apparatus, it is to be clearly understood that this description is made only by way of example and not as a limitation to the scope of the invention as set forth in the objects thereof and in the accompanying claims.

We claim:

1. A multiaccess satellite communication system including a stationary satellite relay station, and a single central control earth station and a plurality of earth stations each associated with an exchange network, said satellite relay station having a transponder having its transmission communication capacity divided into a plurality of communication channels assigned in common to communications between said plurality of earth stations and fewer number of control channels individually assigned to communications between the central station and the respective earth stations of the plurality; each of the earth stations of the plurality being associated with a respective exchange network and comprising means responsive to a call from a subscriber in the associated exchange network to produce an address signal, means for transmitting the address signal to the central station through the satellite relay station in a preassigned one of the control channels, means for receiving a communication channel designation signal transmitted from the central station through the satellite relay station in one of the control channels, means responsive to the reception of the communication channel designation signal for transmitting in one of the communication channels specified by said signal the information signal of the subscriber's call to another earth station specified by the address signal through the satellite relay station, and means for receiving an information signal transmitted from said another earth station through the satellite relay station in one of the communication channels specified by the central station; and said central station comprising means for receiving the address signal, means for storing data concerning the busy and idle status of the respective communication channels, processing means responsive to the reception of said address signal for producing the communication channel designation signal on the basis of stored data in said storing means and for changing the stored data in said storing means, and means for transmitting the communication channel designation signal to the earth station which transmitted the address signal to the central station.

2. A multiaccess satellite communication system according to claim 1 wherein the communication channels are also used by the central station in common with the plurality of earth stations; said central station further comprising an associated exchange network, means responsive to a call from a subscriber in the exchange network associated with the central station for producing a second address signal, means responsive to the second address signal for deriving a second communication channel designation signal from said storing means, means for transmitting the information signal of the subscriber's call to one of the plurality of earth stations specified by said second address signal through the satellite relay station in one of the communication channels specified by said second communication channel designation signal and means for receiving an information signal incoming from said one earth station through the satellite relay station in one of the communication channels specified by the central station.

3. An earth station for use in a multiaccess satellite communication system including a stationary satellite relay station having a transponder mounted therein, a central control earth station and a plurality of earth stations having respective associated exchange networks, said control station and said plurality of earth stations within the service area of the satellite relay station, said transponder having its transmission capacity divided into a plurality of communication channels assigned in common to communications between said plurality of earth stations and a fewer number of control channels assigned to communications between said central station and said plurality of earth stations comprising means responsive to a call from a subscriber in its associated exchange network to produce an address signal, means for transmitting said address signal to said central station through the satellite relay station in one of the control channels preassigned thereto, means for receiving a communication channel designation signal from the central station through the satellite relay station in said preassigned control channel, said communication channel designation signal being specified on the basis of stored data concerning the busy and idle status of the respective communication channels of the plurality, means for transmitting information signal from the subscriber to another earth station through said satellite relay station in one of the communication channels specified by the communication channel designation signal, and means for receiving an information signal incoming from said another earth station through the satellite relay station in one of the communication channels specified by a communication channel designation signal received from the central station.

4. A central control earth station for use in a multiaccess satellite communication system including a stationary satellite relay station having a transponder mounted therein, a central control earth station and a plurality of earth stations having respective associated exchange networks, said control station and said plurality of earth stations being within the service area of the satellite relay station, said transponder having its transmission capacity divided into a plurality of communication channels assigned in common to communications between said plurality of earth stations and a fewer number of control channels assigned to communications between said central station and said plurality of earth stations; said central control station comprising means for receiving an address signal incoming from one of the plurality of earth stations through said satellite relay station in one of the control channels, said address signal indicating another earth station to which a communication from said one earth station is to be initiated, means for storing information concerning busy and idle status of the respective communication channels of the plurality, information processing means responsive to the reception of the address signal to produce a communication channel designation signal on the basis of the information in said storing means and to change the stored information in said storing means, and means for transmitting said communication channel designation signal to said one earth station through the satellite relay station in said control channel.

5. A central control earth station for use in a multiaccess satellite communication system including a stationary satellite relay station having a transponder mounted therein, a central control earth station and a plurality of earth stations having respective associated exchange networks, said control station and said plurality of earth stations being within the service area of the satellite relay station, said transponder having its transmission capacity divided into a plurality of communication channels assigned in common to communications between any earth stations and a fewer number of control channels assigned separately to communications between the central station and said plurality of earth stations; said central station comprising an exchange network, means responsive to a call from a subscriber in the exchange network for producing of first address signal, means for receiving a second address signal incoming from one of the plurality of the earth stations through the satellite relay station in one of the control channels, each of said address signals indicating another earth station to which a communication is to be initiated, means for storing information concerning busy and idle status of the respective communication channels of the plurality, information processing means responsive to said address signal or to said another address signal to produce a communication channel designation signal on the basis of the information in said storing means and to change the stored information in said storing means, means for transmitting the communication channel designation signal to said another earth station other than the central station and said one earth station through the satellite relay station in said control channel, and means for effecting a communication with one of the plurality of earth stations through the satellite relay station in one of the communication channels specified by the communication channel designation signal.